(12) United States Patent
Ritter

(10) Patent No.: US 11,593,250 B2
(45) Date of Patent: Feb. 28, 2023

(54) RESPONSIBLE DEVELOPMENT PROCESS AND DEFINITION OF INTEGRATION PATTERNS AND SEMANTICS

(71) Applicant: SAP SE, Walldorf (DE)

(72) Inventor: Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 17/023,823

(22) Filed: Sep. 17, 2020

(65) Prior Publication Data
US 2022/0083449 A1    Mar. 17, 2022

(51) Int. Cl.
G06F 11/36    (2006.01)

(52) U.S. Cl.
CPC ...... *G06F 11/3608* (2013.01); *G06F 11/3664* (2013.01); *G06F 11/3684* (2013.01); *G06F 11/3688* (2013.01); *G06F 11/3692* (2013.01)

(58) Field of Classification Search
CPC ............ G06F 11/3608; G06F 11/3664; G06F 11/3684; G06F 11/3688; G06F 11/3692
See application file for complete search history.

(56) References Cited

U.S. PATENT DOCUMENTS

| | | | | |
|---|---|---|---|---|
| 7,653,689 | B1 * | 1/2010 | Champagne | H04L 67/1063 709/227 |
| 2009/0083643 | A1 * | 3/2009 | Beringer | G06F 3/0481 715/762 |
| 2013/0074046 | A1 * | 3/2013 | Sharma | G06F 11/3672 717/126 |
| 2016/0019032 | A1 * | 1/2016 | Ritter | G06F 16/25 717/114 |
| 2016/0285698 | A1 * | 9/2016 | Ritter | G06Q 10/00 |
| 2017/0270036 | A1 * | 9/2017 | Alex | G06F 11/3684 |
| 2020/0349061 | A1 * | 11/2020 | Bonas | H04L 45/566 |

OTHER PUBLICATIONS

Jamjoom, Hani, Dan Williams, and Upendra Sharma. "Don't call them middleboxes, call them middlepipes." Proceedings of the third workshop on Hot topics in software defined networking. 2014. (Year: 2014).*

(Continued)

*Primary Examiner* — S. Sough
*Assistant Examiner* — Joanne G Macasiano
(74) *Attorney, Agent, or Firm* — Buckley, Maschoff & Talwalkar LLC

(57) ABSTRACT

According to some embodiments, methods and systems may be associated with enterprise application integration. A formalization platform may facilitate definition of Enterprise Integration Patterns ("EIP") using a formal representation and defined execution semantics. The formalization platform may also execute model checking to find errors in the formal representation. An implementation platform may receive information from the correctness platform and translate the formal model generated by the correctness platform. The implementation platform may also configure implementation parameters of the translated formal model and simulate the EIP patterns to provide experimental validation. A correctness platform may receive information from the formalization platform and evaluate correctness of the EIP patterns defined via the formalization platform.

9 Claims, 41 Drawing Sheets

(56) References Cited

OTHER PUBLICATIONS

Sarker, Zaheduzzaman, Varun Singh, and Colin Perkins. "An evaluation of RTP circuit breaker performance on LTE networks." 2014 IEEE Conference on Computer Communications Workshops (INFOCOM WKSHPS). IEEE, 2014. (Year: 2014).*

Ritter, Daniel. Application integration patterns and their compositions. Diss. University of Vienna, May 27, 2019. (Year: 2019).*

Weigold, Manuela, et al. "Pattern views: Concept and tooling for interconnected pattern languages." Symposium and Summer School on Service-Oriented Computing. Springer, Cham, 2020. (Year: 2020).*

Umapathy, Karthikeyan, and Sandeep Purao. "Designing enterprise solutions with web services and integration patterns." 2006 IEEE International Conference on Services Computing (SCC'06). IEEE, 2006. (Year: 2006).*

* cited by examiner

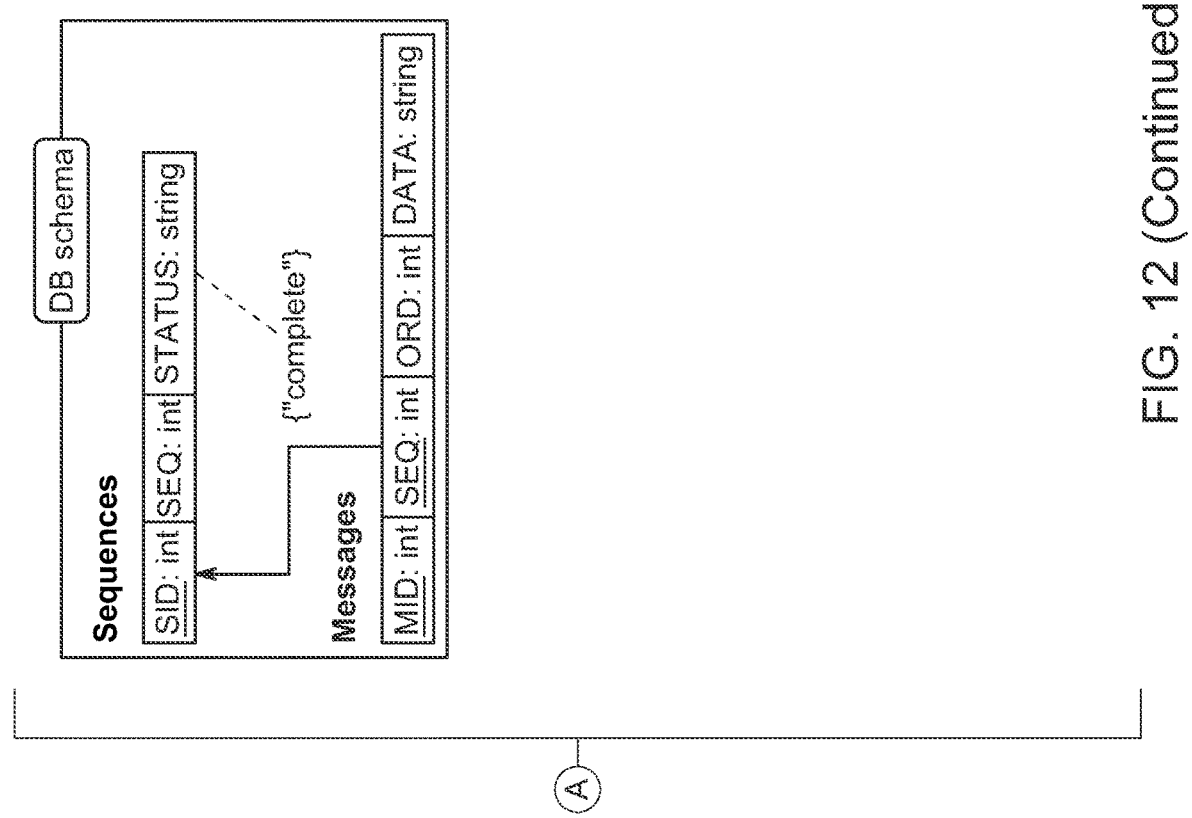
FIG. 12 (Continued...)

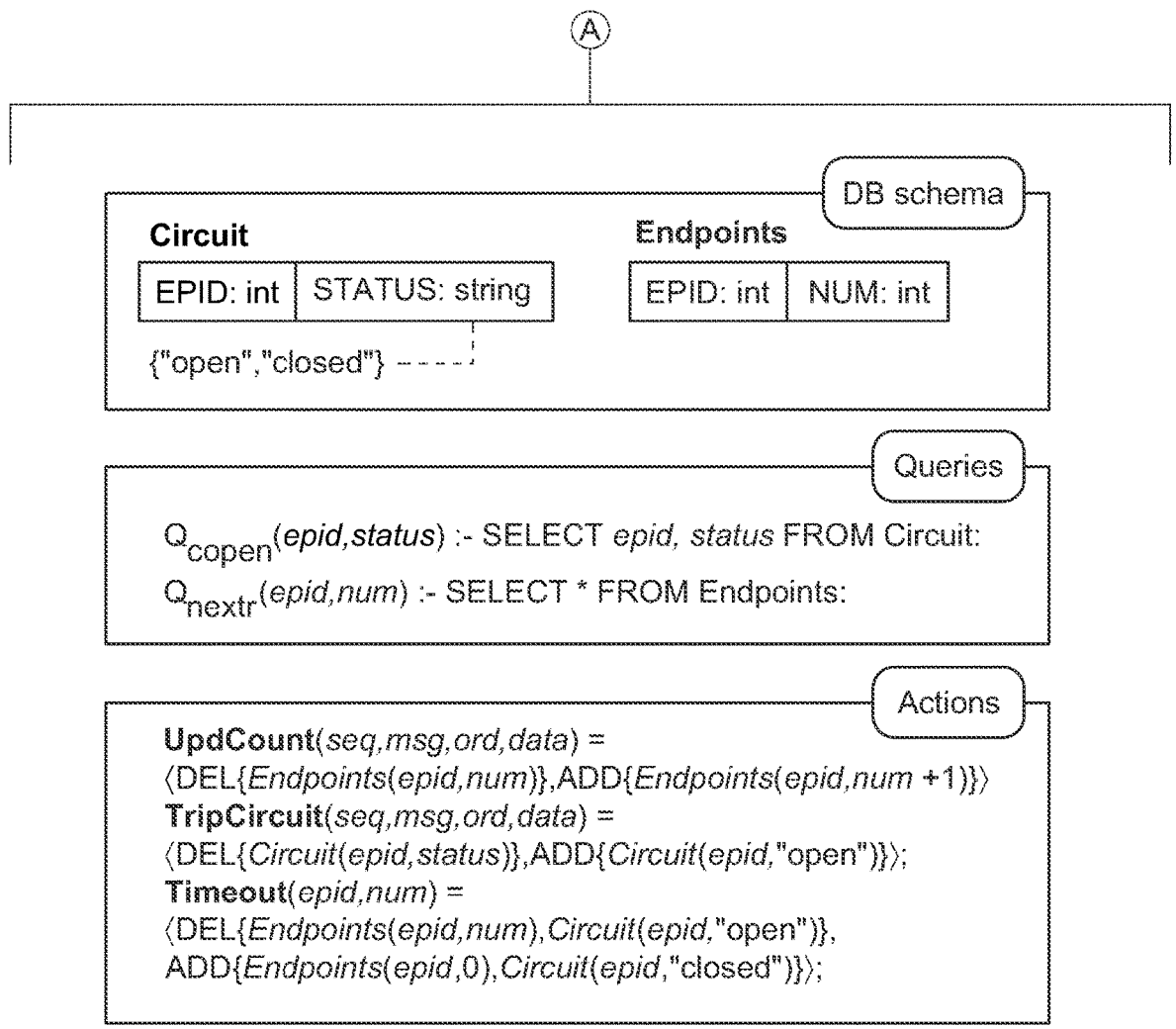
FIG. 13 (Continued...)

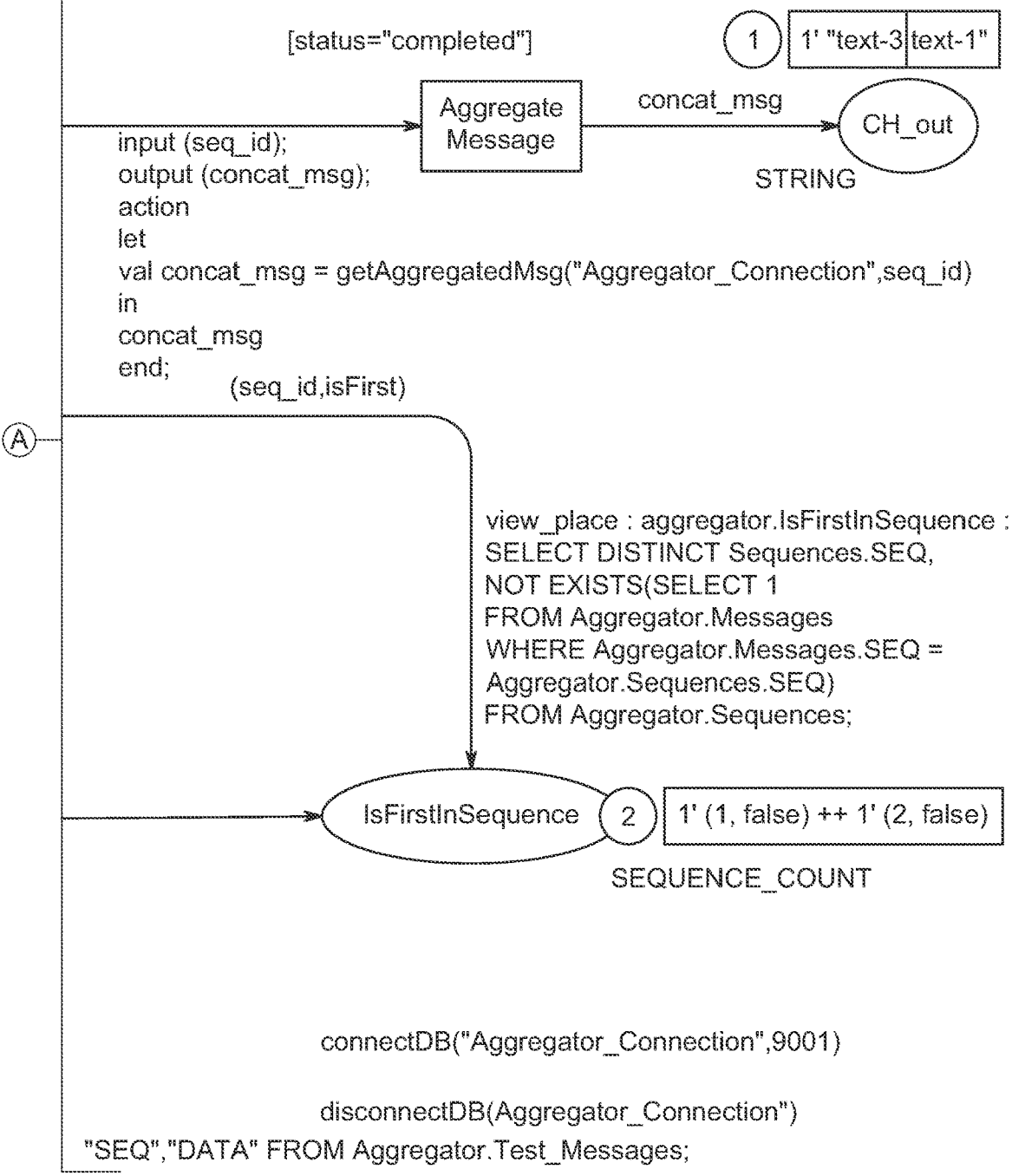
FIG. 24 (Continued...)

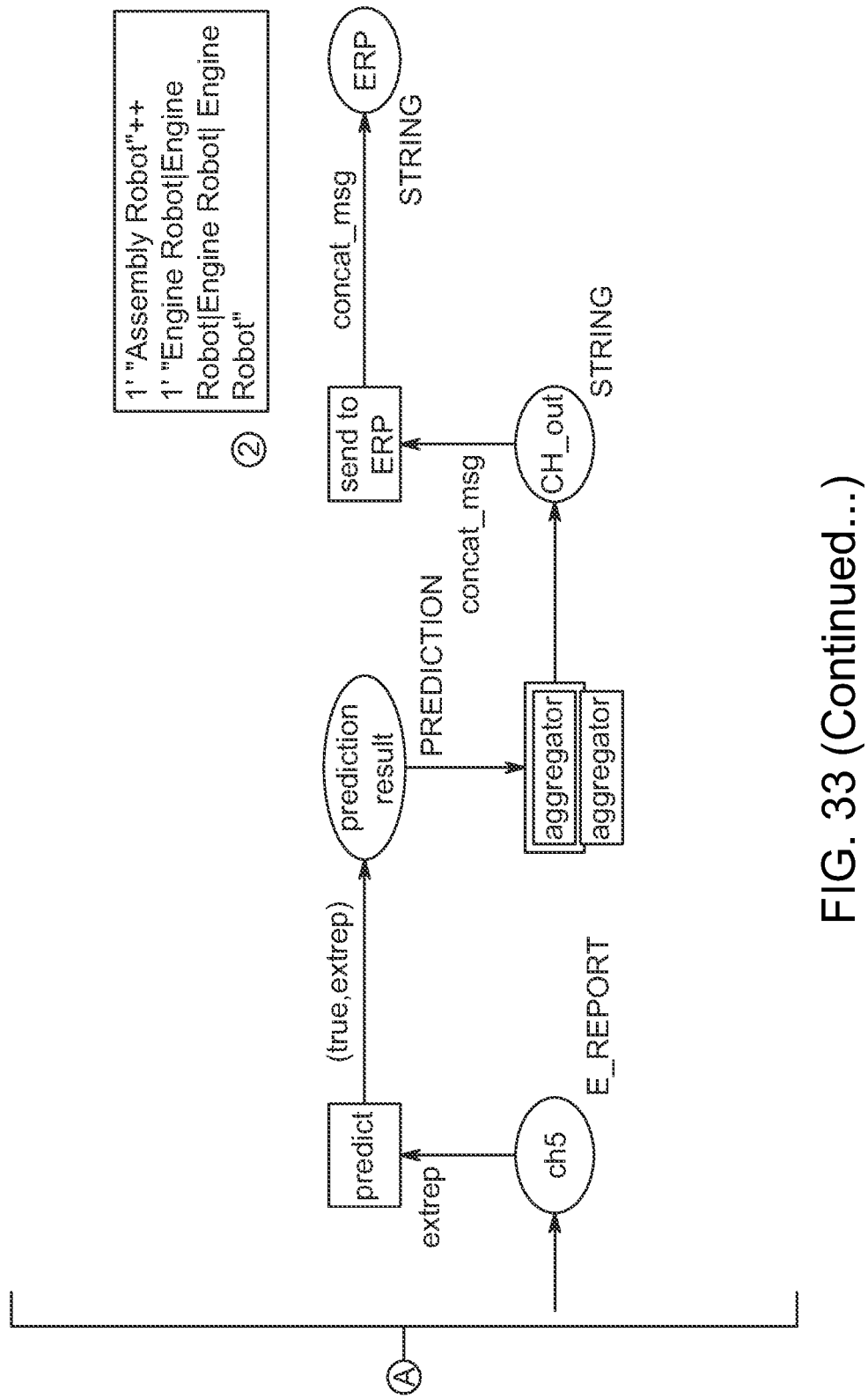
FIG. 33 (Continued...)

| IPCG IDENTIFIER 3602 | DATA SPECIFICATIONS 3604 | RUNTIME BENCHMARKS 3606 | OPTIMIZATIONS 3608 | STATUS 3610 |
|---|---|---|---|---|
| IPCG_101 | SCHEMA | LATENCY | EARLY-AGGREGATION | IN PROCESS |
| IPCG_102 | MAPPING, SCHEMA | THROUGHPUT | MERGE PARALLEL | COMPLETED 6/6/2025 |
| IPCG_103 | CONFIG | LATENCY | COMBINE SIBLINGS | HALTED |
| IPCG_104 | SCHEMA | LATENCY, THROUGHPUT | REDUCE REQUESTS | IN PROCESS |

*FIG. 36*

RESPONSIBLE DEVELOPMENT PROCESS AND DEFINITION OF INTEGRATION PATTERNS AND SEMANTICS

BACKGROUND

Recent business, technology, and social trends (e.g., business networks, cloud and mobile computing, and social media) lead to a modularization and distribution of business applications and devices. This may increase the importance of applications and business processes. Due to increased distribution, the resulting integration scenarios or programs not only become increasingly complex but are largely a composition of integration patterns that serve as an abstraction of the complex underlying integration semantics. Note, however, that the execution semantics of the integration patterns are only described textually and not formally defined. The missing formal semantics can result in the following types problems:

- unclear (or proprietary) vendor-specific execution semantics (e.g., different behavior of a content-based router on different platforms);
- no formal analysis (e.g., verification and model checking);
- difficult, manual identification of design flaws and functional errors within patterns; and
- incompatible pattern implementations (e.g., a user cannot be sure that the pattern behaves the same on all platforms).

These problems may hinder the ability of a user, creator, and/or vendor of an integration solution to precisely define required integration semantics and lead to costly manual validation (e.g., exhaustive testing) and bug fixing of already productive solutions. It is currently not possible to responsibly develop integration solutions. Besides the financial costs of development and validation, the speed of development (e.g., a lack of semantics leading to a steep learning curve) and damages to the platform vendors reputation (e.g., dissatisfaction with faulty integration logic) can have a major impact on Integration as a Service ("IaaS") cloud platform vendors.

It would therefore be desirable to provide responsible development based on formally defined integration semantics (which can be verified) in a secure, automatic, and efficient manner.

SUMMARY

According to some embodiments, methods and systems may be associated with enterprise application integration. A formalization platform may facilitate definition of Enterprise Integration Patterns ("EIP") using a formal representation and defined execution semantics. The formalization platform may also execute model checking to find errors in the formal representation. An implementation platform may receive information from the correctness platform and translate the formal model generated by the correctness platform. The implementation platform may also configure implementation parameters of the translated formal model and simulate the EIP patterns to provide experimental validation. A correctness platform may receive information from the formalization platform and evaluate correctness of the EIP patterns defined via the formalization platform.

Some embodiments comprise: means for facilitating, by a computer processor of a formalization platform, definition of Enterprise Integration Patterns ("EIP" or "eip") using a formal representation and defined execution semantics; means for executing, by the formalization platform, model checking to find errors in the formal representation; means for translating, by an implementation platform, the formal representation generated by the correctness platform; means for configuring, by the implementation platform, implementation parameters of the translated formal representation; means for simulating, by the implementation platform, the EIP patterns to provide experimental validation; and means for evaluating, by a correctness platform, correctness of the EIP patterns defined via the formalization platform.

Some technical advantages of some embodiments disclosed herein are improved systems and methods to provide trustworthy application integration in a secure, automatic, and efficient manner.

BRIEF DESCRIPTION OF THE DRAWINGS

FIG. 36 is portion of an application integration data store in accordance with some embodiments.

DETAILED DESCRIPTION

Figure 1:
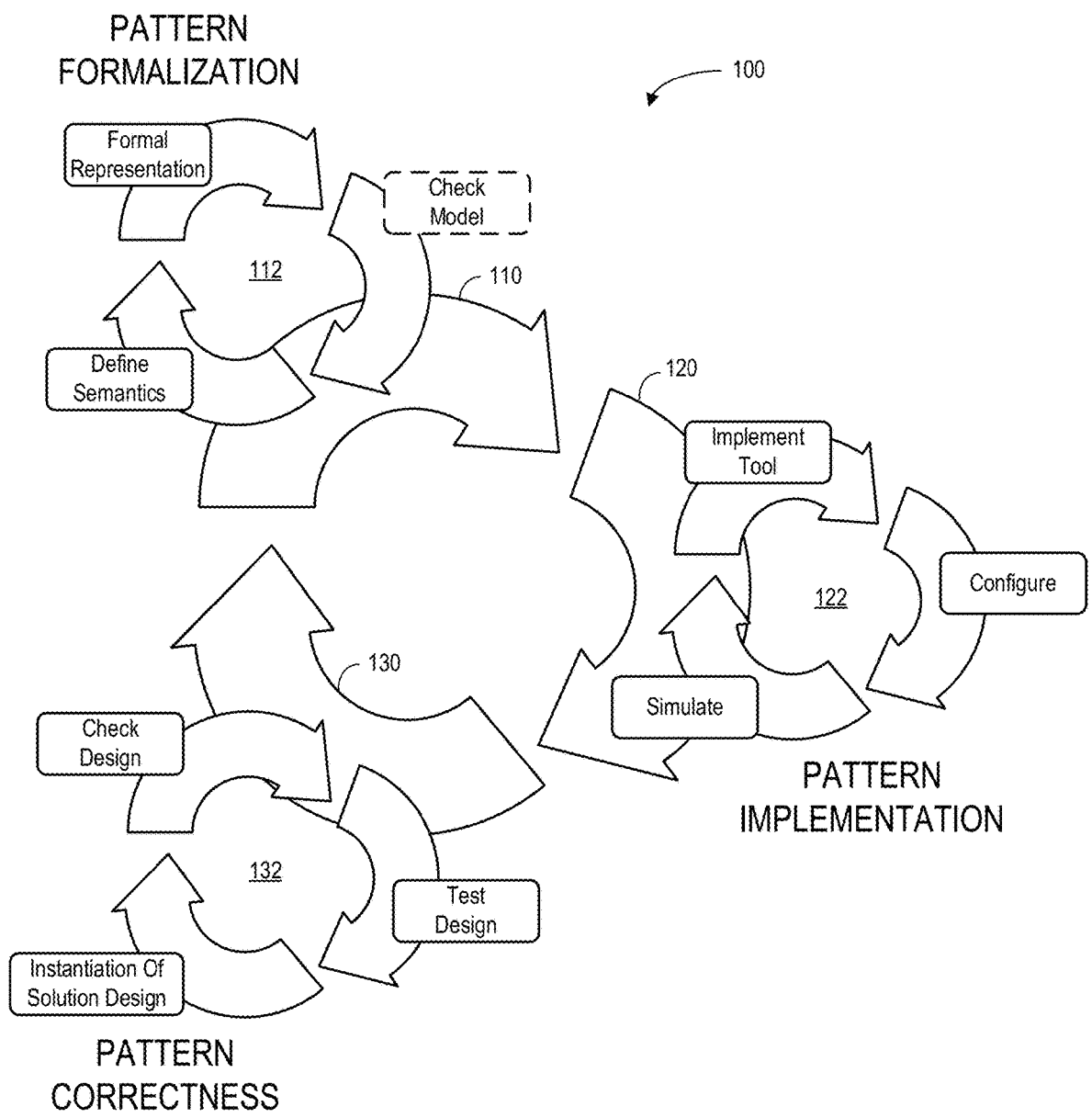
FIG. 1 is an information flow diagram associated with a responsible integration pattern formalization process and semantics according to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Enterprise Application Integration ("EAI") constitutes a cornerstone in enterprise IT landscapes that are characterized by heterogeneity and distribution. Starting from established Enterprise Integration Patterns ("EIPs") such as a content-based router and aggregator, EIP compositions may be built to describe, implement, and/or execute integration scenarios. The EIPs and their compositions may need to be correct at design and runtime in order to avoid functional errors or incomplete functionalities. However, current EAI system vendors use many of the EIPs as part of their proprietary integration scenario modeling languages that are not grounded on any formalism. This renders correctness guarantees for EIPs and their composition impractical. Thus, some embodiments described herein may provide responsible EAI based on the formalization, implementation, and correctness of EIPs. For this, requirements on an EIP formalization are collected and based on these requirements an extension of eip-net (i.e., timed eip-net) is proposed, fully equipped with execution semantics.

With the growing number of cloud and mobile applications, the importance of EAI has increased. Integration scenarios—essentially compositions of EIPs and their recent extensions—describe typical concepts in designing messaging systems as used for EAI (e.g., the communication between these applications). Due to the increasing heterogeneity of endpoints and their distribution, trust into productive integration solutions becomes even more important. This, in turn, may require means for a responsible development of integration solutions ("responsible programming") to avoid design flaws such as functional errors or incomplete functionality, starting with the EIPs.

However, the current EAI system vendors use many of the EIPs as part of their proprietary integration scenario modeling languages. These languages are not grounded on any formalism and, hence, may produce models that are subject to the design flaws, e.g., functional errors. Due to the missing formal definition, currently the detection and analysis of these flaws are typically performed manually. This results in huge effort and potentially increased mistakes. Hence, EIPs may be considered as a set of informal design solutions than a formal language for modeling and verifying correctness of integration patterns. As a result, EAI vendors are left with their own proprietary semantics which may not allow for responsible development. One attempt towards formalization of some EIPs uses Colored Petri Nets ("CPNs"). Although the CPN colors abstractly stand for data types and CPNs support the control flow through control threads (i.e., tokens) progressing through the net, carrying data conforming to colors, they cannot be used to model, query, update, and reason on requirements inherent to the extended EIPs such as persistent data or timings.

To overcome these limitations, a responsible development of integration solutions, i.e., solutions that can be thoroughly tested for their correctness at design time, may require formalization of its pattern foundations. Therefore, embodiments may follow a responsible pattern formalization process that allows for the following four objectives: (i) formalization; (ii) realization of EIPs; (iii) simulation of the EIP realizations; and (iv) validation and verification. FIG. 1 shows this process 100 with its three main steps: pattern formalization 110, pattern implementation 120, and pattern correctness 130.

The pattern formalization 110 may be associated with several sub-processes 112 (e.g., define semantics, formal representation, and check model). For example, the formalization of a pattern starts with capturing and defining its semantics. With a thorough understanding of the pattern and its variations, it can be formally represented. The resulting formal pattern model can be analyzed and verified (i.e., model checking). With model checking capabilities, errors in patterns can be found and either their semantics or formal representation is revisited.

The pattern implementation 120 may also be associated with several sub-processes 122 (e.g., implement tool, configure, simulate). For example, if model checking is not possible or difficult, the formal patterns can be implemented, configured, and simulated in a suitable tool. The simulation not only bridges the model to implementation gap but may allow for an experimental validation of a pattern.

Similarly, the pattern correctness 130 may be associated with several sub-processes 132 (e.g., check design, test design, instantiation of solution design). Note that the correctness of a pattern can be decided according to its semantics, when put into the context of a dedicated, scenario-specific configuration, a test design, which specifies the desired properties like the expected output of a pattern simulation, for a given input. This test design may then be instantiated and checked during the simulation of the pattern. Any flaws found during this step can result in another round of formal or implementation adjustment.

Figure 2:
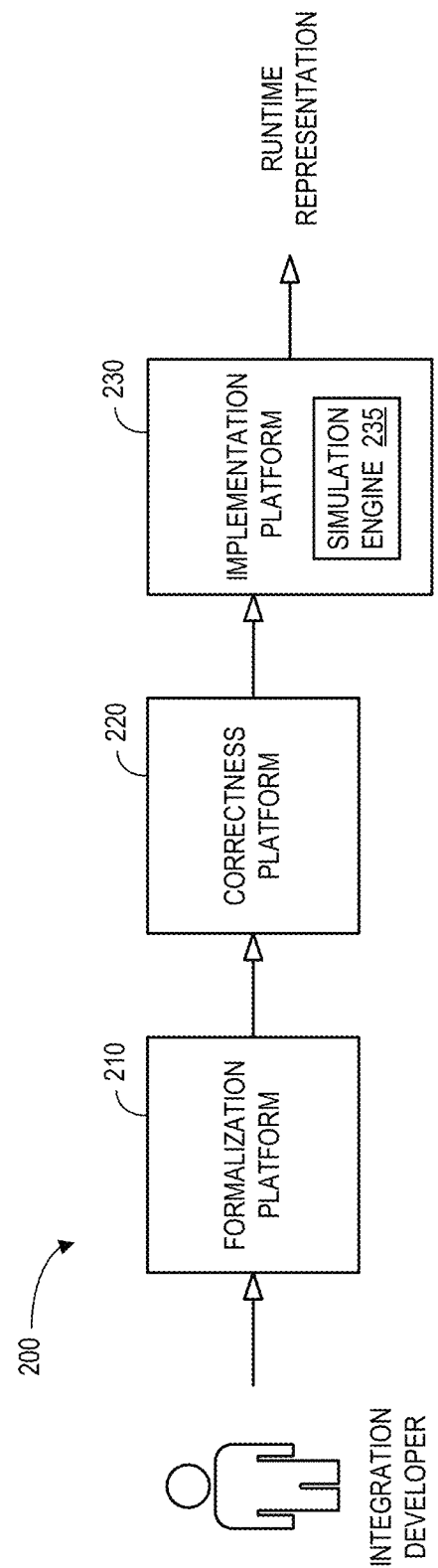
FIG. 2 is a high-level block diagram of a system in accordance with some embodiments.

FIG. 2 is a high-level block diagram of a system 200 in accordance with some embodiments. The system 200 includes a formalization platform 210 that might interact with an integration developer. The formalization platform 210 may provide an output to a correctness platform 220 which, in turn, provides an output to an implementation platform 230 to create a runtime representation. In some embodiments, the implementation platform 230 includes a simulation engine 235. The simulation engine 235 may, for example, simulate EIP patterns to provide experimental validation after executing a test simulation for each EIP pattern multiple times, producing multiple test results, using a variety of EIP pattern input conditions (e.g., looking for situations in which an EIP pattern hangs up or otherwise fails and is thus shown to be incorrect). The process might be performed automatically or be initiated via a command from a remote operator interface device. As used herein, the term "automatically" may refer to, for example, actions that can be performed with little or no human intervention. Note that the formalization platform 210, correctness platform 220, and/or implementation platform 230 may be associated with one or more libraries, a cloud or on-premise operating environment, software engines and similar components to execute various functions, etc. These computing digital platform mas be associated with an environment in which any of the software described herein is executed and may include hardware elements, an operating system, a web browser and associated API, other software, etc.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The platforms 210, 220, 230, including those associated with the system 200 and any other device described herein, may store information into and/or retrieve information from various data stores (e.g., a data storage device), which may be locally stored or reside remote from the platforms 210, 220, 230. Although a single formalization platform 210, correctness platform 220, and implementation platform 230 are shown in FIG. 2, any number of such devices may be included in the system 200. Moreover, various devices described herein might be combined according to embodiments of the present invention. For example, in some embodiments, the formalization platform 210, correctness platform 220, and/or implementation platform 230 might comprise a single apparatus. The system 200 functions may be performed by a constellation of networked apparatuses, such as in a distributed processing or cloud-based architecture.

An operator or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how optimization rules are applied) and/or provide or receive automatically generated recommendations or results from the system 200.

Figure 3:
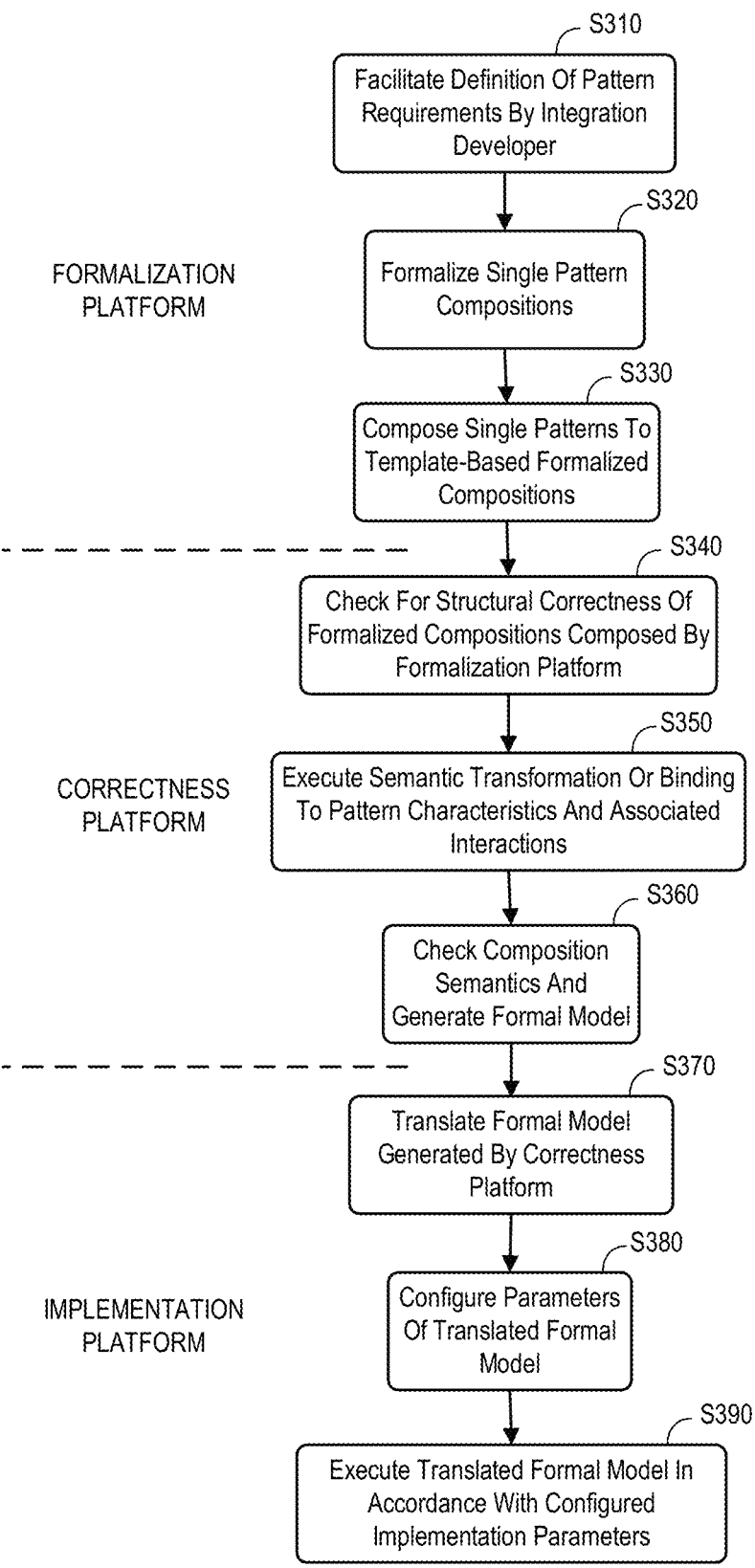
FIG. 3 is a method according to some embodiments.

FIG. 3 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a formalization platform may facilitate definition of pattern requirements by an integration developer. At S320, the formalization platform may formalize single pattern compositions. At S330, the formalization platform may compose single patterns to template-based formalized compositions.

At S340, a correctness platform may check for structural correctness of the formalized compositions composed by the formalization platform. At S350, the correctness platform may execute a semantic transformation or binding to pattern characteristics and associated interactions. At S360, the correctness platform may check composition semantics and generate a formal model.

At S370, an implementation platform may translate the formal model generated by the correctness platform. At S380, the implementation platform may configure parameters of the translated formal model. The implementation platform may then execute the translated formal model in accordance with the configured implementation parameters at S390.

Note that existing approaches do not fully support a responsible development and hence the following research questions are formulated to guide the design and development of an EIP formalization living up to previously set forth objectives (i) through (iv). Several questions may be appropriate:

Q1 Which EAI requirements are relevant for the formal definition of EIPs? To which extent are they met by existing approaches?

Q2 How to design an EIP formalization to meet relevant EAT requirements and objectives (i) through (iv)?

Q3 How to realize the EIPs and real-world integration scenarios?

Q4 How to accomplish correctness testing and simulation of EIP realizations?

A formalization of EIP may be based on eip-nets as a database-centric extension of CPNs (including atomic transactions). Note that CPNs have been extended by EAI requirements such as persistency and time, resulting in so called "timed eip-nets." With timed eip-nets, a responsible development of integration solutions becomes possible. The following example leverages timed eip-nets to illustrate selected EIPs and their requirements associated with a formalization.

Figure 4:
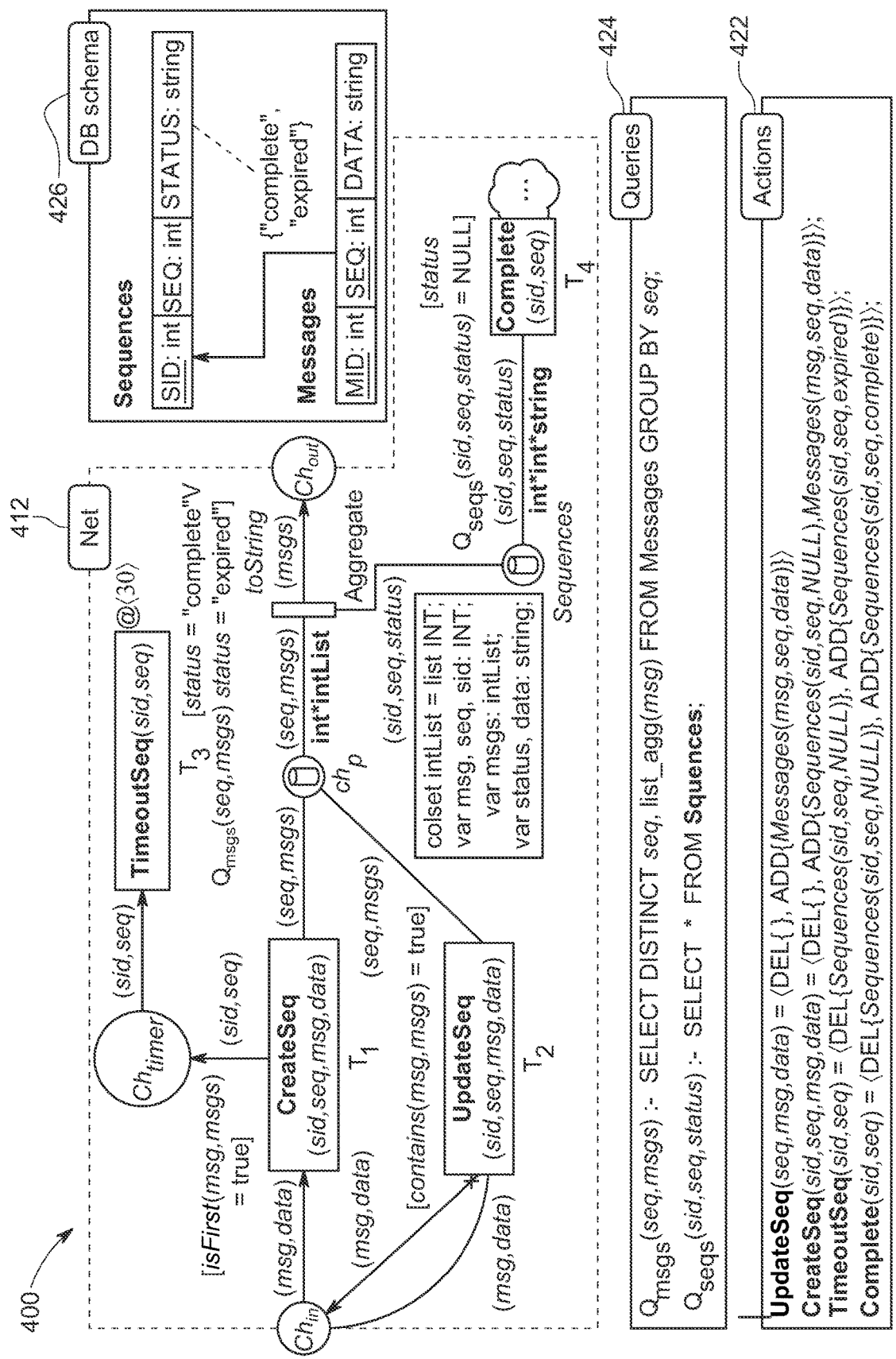
FIG. 4 illustrates an aggregator pattern variant as a timed eip-net in accordance with some embodiments.

FIG. 4 specifies semantics of a commonly used stateful aggregator 400 pattern as timed eip-net including a net 412, actions 422, queries 424, and a DataBase ("DB") schema 426. Here, the aggregator 400 collects messages in a persistent storage that is accessed via a special view place $ch_p$, and then aggregates them based either on the completion condition (e.g., sequence status is complete, modeled via Aggregate transition) or on time-out of 30 time units (e.g., sequence status is expired, modeled via transition T3). To collect messages and assign them to correct sequences, the net 412 correlates every incoming msg token to those in place $ch_p$, that, in turn, stores pairs of sequences and lists of messages that have been already collected. If the message is the first in a sequence, new entries, one containing information about the message and another containing data about the referenced sequence, are added to tables called Messages and Sequences, respectively. This is achieved by firing transition $T_1$ and executing action 422 CreateSeq attached to it. Otherwise, a message is inserted into Messages by firing $T_2$ and executing UpdateSeq.

However, the update by UpdateSeq fails if a message is already in the database or a referenced sequence has already been aggregated due to a timeout (i.e., status is expired). In this case, the net 412 switches to an alternative roll-back flow (a directed arc from $T_2$ to $ch_{in}$) and puts the message back to the message channel $ch_{in}$. Note that a cloud symbol is used to represent a subnet (which denotes a configurable model part). In the aggregator case, even though the sequence completion logic is defined depending on a specific pattern application scenario and always must be realized in the designated subnet, such a subnet must contain a transition $T_4$ that executes an update that changes a given sequence state.

Some embodiments described herein may be associated with a collection of EAI requirements on EIP formalization including a comprehensive assessment and elaboration on the selection of existing approaches, i.e., petri nets (Q1). Based on this, a formalism, i.e., Coloured Petri Nets, may be selected and equipped with missing EAI requirements, most prominently persistency and time, into timed eip-nets (Q2). An instructive catalog of pattern realizations may be provided (Q3). And embodiments may test the correctness of formal EIP realizations based on their execution traces at different levels in the formalism (Q4).

EIP formalization requirements might be derived by an analysis of pattern descriptions based on integration pattern catalogs and extensions. The reoccurring characteristics found may allow for a categorization of patterns to systematically pinpoint relevant EAI requirements into general categories (with more than one pattern). Most of the patterns require (combinations of) data flow, control flow, and transacted resource access. While the control flow denotes the routing of a message from pattern to pattern via channels (i.e., ordered execution), the data flow describes the access of the actual message by patterns (including message content, headers, and/or attachments). Notably, most of the patterns can be classified as control only (e.g., wire tap) and data only (e.g., splitter) or as their combination (e.g., message filter), which stresses on the importance of data-aspects of the routing and transformation patterns. In addition, resources denote data from an external service not in the message (e.g., data store). The EIP extensions add new categories such as combinations of data and {time, resources} (data-time such as message expiration, data-resources such as encryptor) and control and time (e.g., throttle). For instance, the motivating example in FIG. 4 is classified as data Tx.-resources.-time. The different categories may be disjoint with respect to patterns.

In Table I, assume that the control requirement REQ-0 "control flow" is inherently covered by any PN approach, and thus in CPN and eip-net. However, there are two particularities in the routing patterns that may be capture in requirement REQ-1 "Msg. channel priority, order": (a) the ordered evaluation of Msg. channel conditions or guards of sibling PN transitions, required for the content-based router pattern, (b) the enablement or firing of a PN transition according to a ratio for the realization of a load balancer. In both cases, neither execution priorities nor ratios are trivially in CPN or eip-net. Furthermore, other patterns in catalogs may have data and/or message format aspects, which require an expressive CPN token representation (e.g., for encodings, security, complex message protocols), for which a second requirement REQ-2 "data, format" may be added to allow for the formal analysis of the data. Although CPNs and eip-nets have to be severely restricted (e.g., finite color domains, pre-defined number of elements) for that, eip-nets promise a relational representation that can be formally analyzed.

Patterns with time-related requirements may be captured as REQ-3 "time": (a) Timeout: numerical representation of fixed, relative time (i.e., no global time); (b) Expiry date: discrete point in time according to a global time (i.e., based on existing message content); (c) Delay: numerical, fixed value time to wait or pause until continued: e.g., often used in a redelivery policy; (d) Message/time ratio: number of messages that are sent during a period of time. Consequently, a quantified, fixed time delay or duration semantics is required.

Patterns with resources REQ-4 "(external) resources" require: (a) Create, Retrieve, Update, Delete ("CRUD") access to external services or resources, and (b) transaction semantics on a pattern level. Similarly, exception semantics may be present patterns as REQ-5 "exceptions", which require compensations and other post-error actions. Consequently, a PN definition that allows for reasoning over these timing and structured (persistent) data access is required.

In Table I, formalization requirements may be covered ("✓"), partially covered ("(✓)"), or not covered "-" by CPN and eip-net for various requirements ("REQ"):

TABLE I

Formalization Requirements

| ID | Requirement | CPN | eip-net |
|---|---|---|---|
| REQ-0 | Control flow (pipes and filter) | ✓ | ✓ |
| REQ-1 | (a) Msg. channel priority | (✓) | (✓) |
|  | (b) Msg. channel distribution | — | (✓) |
| REQ-2 | Data, format including message protocol with encoding, security | (✓) | ✓ |
| REQ-3 | (a) Timeout on message, operation | — | — |
|  | (b) Expiry date on message | — | — |
|  | (c) Delay of message, operation | — | — |
|  | (d) Msg./time ratio | — | — |
| REQ-4 | (a) CRUD operations on (external resources) | — | ✓ |
|  | (b) Transactional semantics on (external) resources (including roll-back | — | ✓ |
| REQ-5 | Exceptions, compensation similar to roll-backs in REQ-4 | — | ✓ |

Table 1 summarizes the formalization requirements for timed eip-nets by setting the coverage of the CPN and eip-net approaches into context text. While CPNs provide a solid foundation for control (REQ-0) and a simple data flow representation (REQ-2), eip-nets extend it towards more complex data structures—message protocols (REQ2), and add CRUD operations (REQ-4(a)), transactional semantics (REQ4(b)), and exception handling (REQ-5), suitable for working with external, transactional resources. In CPNs, message channel distributions cannot be represented, and priorities require explicit modeling, leading to complex models. Embodiments may build upon the CPN approach by subsequently defining CPNs for the persistency and time-related requirements (REQ-3(a)-(d)) and provide (less complex) realizations for message channel priority execution (REQ-1(a)) and load balancing (REQ-4(b)).

When facing the problem of formalizing multi-perspective models that suitably account for the dynamics of a system (i.e., the process perspective) and how it interacts with data (i.e., the data perspective), several design choices can be made. In the Petri net tradition, most formal models striving for this integration approaches the problem by enriching execution threads (i.e., tokens) with complex data. Notable examples within this tradition are data nets and v-nets, Petri nets with nested terms, nested relations, and XML documents.

While all the approaches treat data subsidiary to the control-flow dimension, the EIPs require data elements attached to tokens being connected to each other by explicitly represented global data models. Consequently, they do not allow for reasoning on persistent, relational data such as tree or graph structured message formats.

Figure 5:
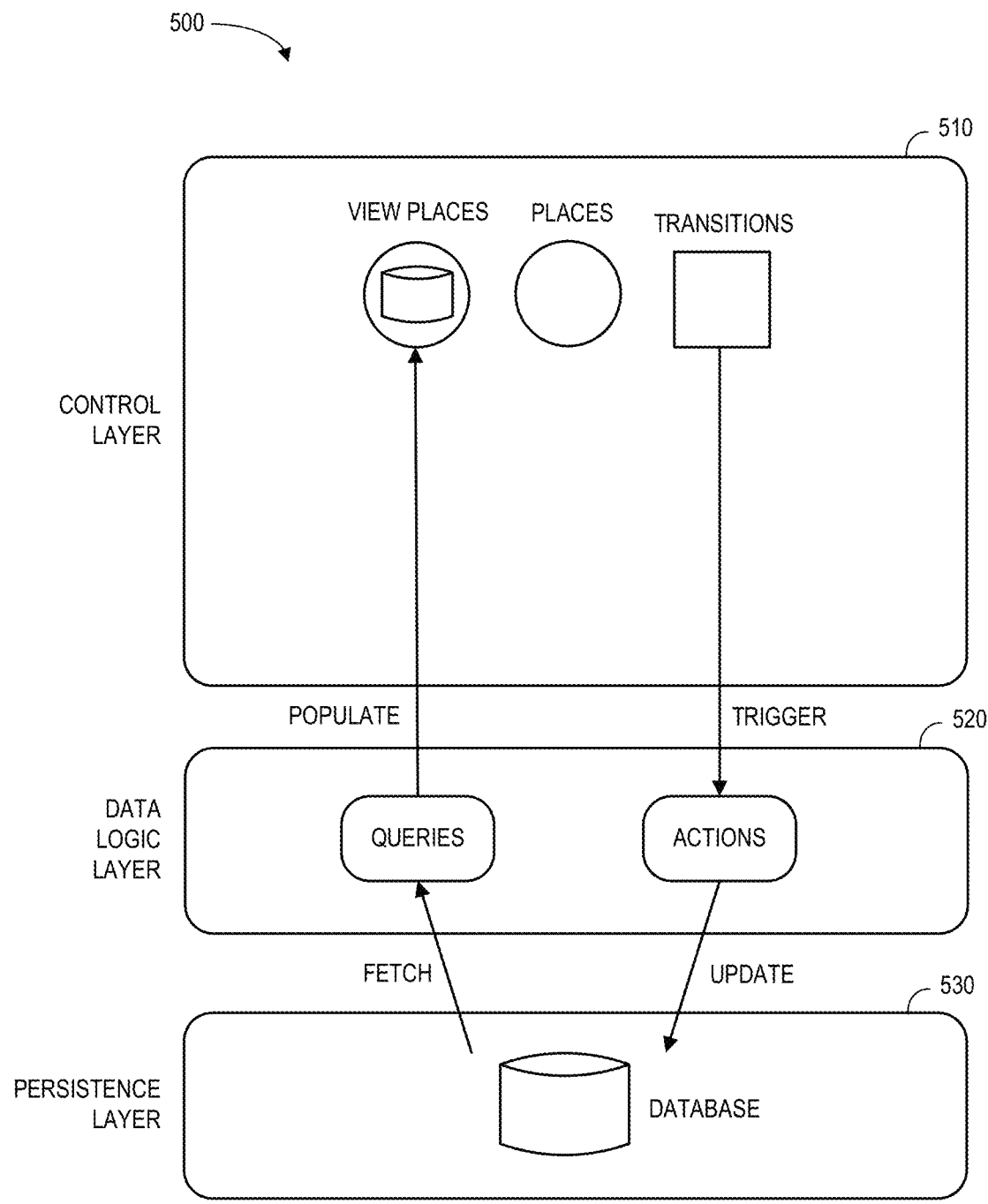
FIG. 5 illustrates conceptual components of eip-nets according to some embodiments.

The recently proposed framework of eip-nets aims at conceptually establishing this connection through a formal model 500 that consists of three layers as illustrated in FIG. 5: a control layer 510, a data logic layer 520, and a persistence layer 530. On the one hand, an eip-net separately represents persistence storage (constituted by a full-fledged relational database with constraints) and control (captured as a CPN with additional, specific constructs). On the other hand, it explicitly handles their interplay through a data logic intermediate layer, which provides the control layer 510 with queries and database operations (such as trigger, update, read, bind). Updates are transactional, that is, are only committed if the resulting instance of the persistence layer 530 satisfies the database constraints. The control 510 layer is informed about the outcome of an update and can consequently compensate in case of a roll-back.

Embodiments may use CPNs as a foundation of timed eip-nets for the main reason of control and data flow, support and add on the persistency side: (i) ability to represent relational data (REQ-2: "data", "format"); (ii) built-in support for transactional CRUD operations (REQ-4); (iii) exception handling and corresponding compensation mechanism (REQ-5). In addition, since eip-nets are based on CPNs, it is possible to lift existing simulation techniques from CPNs to eip-nets.

A "eip-net" may be defined as a tuple $(\mathcal{D}, \mathcal{P}, \mathcal{L}, \mathcal{N})$, where:

$\mathcal{D}$ is a type domain—a finite set of data types, each of the form $D=(\Delta_D, \Gamma_D)$, where $\Delta_D$ is the value domain of D, and $\Gamma_D$ is a set of domain-specific (rigid) predicates.

$\mathcal{P}$ is a $\mathcal{D}$-typed persistence layer, i.e., a pair $(\mathcal{R}, E)$, where $\mathcal{R}$ is a $\mathcal{D}$-typed database schema, and E is a finite set of first-order $FO(\mathcal{D})$ constraints over $\mathcal{R}$.

$\mathcal{L}$ is a $\mathcal{D}$-typed data logic layer over $\mathcal{P}$, i.e., a pair (Q, A), where Q is a finite set of $FO(\mathcal{D})$ queries over $\mathcal{P}$, and A is a finite set of actions over $\mathcal{P}$. Each action in A is parameterized and uses its parameters to express a series of insertions and deletions over $\mathcal{P}$.

$\mathcal{N}$ is a $\mathcal{D}$-typed control layer $\mathcal{L}$, i.e., a tuple (P, T, $F_{in}$, $F_{out}$, $F_{rb}$, color, query, guard, act), where: (i) $P=P_c \uplus P_v$ is a finite set of places partitioned into control places $P_c$ and so-called view places $P_v$, (ii) T is a finite set of transitions, (iii) $F_{in}$ is an input flow from P to T, (iv) $F_{out}$ and $F_{rb}$ are respectively an output and roll-back flow from T to $P_c$, (v) color is a color assignment over P (mapping P to a Cartesian product of data types), (vi) query is a query assignment from $P_v$ to Q (mapping the results of Q as tokens of $P_v$), (vii) guard is a transition guard assignment over T (mapping each transition to a formula over its input inscriptions), and (viii) act is an action assignment from T to A (mapping some transitions to actions triggering updates over the persistence layer).

Input and output/roll-back flows contain inscriptions that match the components of colored tokens present in the input and output/roll-back places of a transition. Such inscriptions consist of tuples of (typed) variables, which then can be mentioned in the transition guard as well as in the action assignment (to bind the updates induced by the action to the values chosen to match the inscriptions), and also, in case of the output flow, the inscriptions may contain rigid predicates. Specifically, given a transition t, one may denote by InVars(t) the set of variables mentioned in its input flows, by OutVars(t) the set of variables mentioned in its output flows, and by Vars(t)=InVars(t)∪OutVars(t) the set of variables occurring in the action assignment of t (if any). Fresh variables FreshVars(t)=OutVars(t)\InVars(t) denote those output variables that do not match any corresponding input variables, and are consequently interpreted as external inputs. While input inscriptions are used to match tokens from the input places to InVars(t), the output expressions that involve rigid predicates operate over OutVars(t). In case of numerical types, these expressions can be used to compare values, or to arithmetically operate over them. An eip-net that employs matching output inscriptions only may be called "plain" (i.e., does not use expressions).

Intuitively, each view place is used to expose a portion of the persistence layer in the control layer, so that each token represents one of the answers produced by the query attached to the place. Such tokens are not directly consumed, but only read by transitions, to match the input inscriptions with query answers. A transition in the control layer may bind its input inscriptions to the parameters of data logic action attached to the transition itself, thus providing a mechanism to trigger a database update upon transition firing (and consequently indirectly change also the content of view places). If the induced update commits correctly, the transition emits tokens through its output arcs, whereas if the update rolls back, the transition emits tokens through its rollback arcs.

The terms message and (eip-net, CPN) token will be used synonymously. Recall the execution semantics of eip-nets. A state of an eip-net captures at once a state of the persistence layer (i.e., an instance of the database), and that of the control layer (i.e., a net marking, where the content of view places must be compatible with that of the database instance). More technically, in each moment (called snapshot) the persistence layer is associated to a database instance I, and the control layer is associated to a marking m aligned with I via query (for what concerns the content of view places). The corresponding snapshot is then simply the pair <I, m>. Tokens in m have to carry data compatible with the color of the places and the marking of a view place $P_v$ must correspond to the associated queries over the underlying database instance.

Similar to CPNs, the firing of a transition t in a snapshot is defined by a binding that maps the value domains of the different layers, if several properties are guaranteed, e.g., the guard attached to t is satisfied.

More specifically, a definition of transition enablement may let B be an eip-net $<\mathcal{D}, \mathcal{P}, \mathcal{L}, \mathcal{N}>$, and t a transition in $\mathcal{N}$. Let σ be a binding for t, i.e., a substitution σ: Vars(t)→ΔD. Note that σ may be assumed to be naturally extended to arc inscriptions. In a case when an arc inscription contains an expression, σ will be applied to its variables. A transition t∈T is enabled in a B-snapshot <I, m> with binding σ, if:

For every place p∈$\mathcal{P}$, m(p) provides enough tokens matching those required by inscription w=$F_{in}$<p, t>, once w is grounded by σ, i.e., σ(w) m(p);

the guard guard(t)σ evaluates to true;

σ is injective over FreshVars(t), thus guaranteeing that fresh variables are assigned to pairwise distinct values of σ, and for every fresh variable v∈FreshVars(t), σ(1)∉(Adom$_{type(v)}$(I)∪Adom$_{type(v)}$(m)). Adom$_D$(X) is the set of values of type D explicitly contained in X Firing an enabled transition has the following effects: (i) all matching tokens in control places $P_c$ are consumed; (ii) the action instance action—induced by the firing—is applied on the current database instance in an atomic transaction (and rolled back, if not successful); (iii) accordingly, tokens on output places $F_{out}$ or rollback places $F_{rb}$ (i.e., those connected via rollback flow) are produced.

A definition of transition firing may let B be an eip-net $<\mathcal{D}, \mathcal{P}, \mathcal{L}, \mathcal{N}>$, and $s_1=(I_1, m_1)$, $s_2=(I_2, m_2)$ are two B-snapshots. Fix a transition t of N and a binding σ such that t is enabled in $s_1$ with σ. Let $I_3$=apply(action$_\sigma$(t), $I_1$) be the database instance resulting from the application of the action attached to t on database instance $I_1$ with binding σ for the action parameters. For a control place p, let $w_{in}$(p, t)=$F_{in}$((p, t)), and $w_{out}$(p, t)=$F_{out}$((p, t)) if $I_3$ is compliant with P, or $w_{out}$(p, t)=$F_{rb}$((p, t)) otherwise. It may be said that t fires in $s_1$ with binding σ producing $s_2$, written $s_1$[t, σ)$s_2$, if:

if $I_3$ is compliant with P, then $I_2$=$I_3$, otherwise $I_2$=$I_1$;

for each control place p, $m_2$ corresponds to $m_1$ with the following changes: σ($w_{in}$(p, t)) tokens are removed from p, and σ($w_{out}$(p, t)) are added to p. In formulae: $m_2(p_c)=(\underline{m}_1(p_c)\ \sigma(w_{in}(p, t)))+\sigma(w_{out}(p, t))$.

All in all, the complete execution semantics of an eip-net may be captured by a possibly infinite-state transition system where each transition represents the firing of an enabled transition in the control layer of the net with a given binding, and each state is a snapshot. The infinity comes from the presence of external inputs, and the fact that domains/colors may have an infinite domain. It is important to notice that the resulting transition system may be infinite even if the control layer is bounded in the classical Petri net sense.

The aggregator 400 in FIG. 4 requires a view place $ch_p$ for storing and updating the message sequences as well as rollback arc ($T_2$, $ch_{in}$) to manage compensation tasks (represented as ↪). Now extend the eip-net model to account for an explicit notion of time. While the implicit temporal support in PNs (i.e., adding places representing the current time) is rather counterintuitive, the temporal semantics of adding timestamps to tokens, timed places, arcs and transitions are well studied and natural extensions to PNs, one may extend the eip-net control layer with a temporal semantics that achieves a suitable trade-off: it is expressive enough to capture the requirements in REQ-3, and at the same time it allows one to transfer the existing technical results on the verification of eip-nets to the timed extension.

Assume that there is a global, continuous notion of time. The firing of a transition is instantaneous, but can only occur in certain moments of time, while it is inhibited in others, even in presence of the required input tokens. Every control token, that is, token assigned to a control place, carries a (local) age, indicating how much time the token is spending in that control place. This means that when a token enters into a place, it is assigned an age of 0. The age then increments as the time flows and the token stays put in the same place. View places continuously access the underlying persistence layer, and consequently their (virtual) tokens do not age. Each transition is assigned to a pair of non-negative (possibly identical) rational numbers, respectively describing the minimum and maximum age that input tokens should have when they are selected for firing the transition. Thus, such numbers identify a relative time window that expresses a delay and a deadline on the possibility of firing.

A timed eip-net is a tuple $<\mathcal{D}, \mathcal{P}, \mathcal{L}, \mathcal{N}, \tau>$ where $<\mathcal{D}, \mathcal{P}, \mathcal{L}, \mathcal{N}>$ is an eip-net with the control layer $\mathcal{N}$, and $\tau: T \rightarrow \mathbb{Q}^{\geq 0} \times (\mathbb{Q}^{\geq 0} \cup \{\infty\})$ is a timed transition guard mapping each transition t∈T to a pair of values $\tau(t)=<v_1, v_2>$, such that: (i) $v_1$ is a non-negative rational number; (ii) $v_2$ is either a non-negative rational number equal or greater than $v_1$, or the special constant ∞.

The default choice for τ is to map transitions to the pair <0, ∞>, which corresponds to a standard eip-net transition.

Given a transition t, the following graphical conventions may be adopted: (i) if τ(t)=<0, ∞>, then no temporal label is shown for t; (ii) if τ(t) is of the form (v, v), one may attach label "@<v>" to t; (iii) if τ(t) is of the form <$v_1$, $v_2$>, with $v_1 \neq v_2$, attach label "@<$v_1$, $v_2$>" to t.

The aggregator 400 in FIG. 4 defines a timed transition $T_3$, that can be fired precisely after 30 time units (here seconds) from the moment when a new sequence seq has been created. Upon firing, $T_3$ enables the Aggregate transition, by updating the sequence's status on the database to expired using the TimeoutSeq action.

The execution semantics of timed eip-net builds on the one for standard eip-nets, extended with additional conditions on the flow of time and the temporal enablement of transitions. The management of bindings, guards, and database updates via actions, is kept unaltered. What changes is that, in a snapshot, each token now comes with a corresponding age, represented as a number in $\mathbb{Q}^{\geq 0}$.

As customary in several temporal extensions of Petri nets, consider two types of evolution step. The first type deals with time lapses: it indicates that a certain amount of time has elapsed with the net being quiescent, i.e., not firing any transition. This results in incrementing the age of all tokens according to the specified amount of time.

The second type deals with transition firing, which refines that of eip-nets by checking that the chosen binding selects tokens whose corresponding ages are within the delay window attached to the transition. Specifically, let B be a timed eip-net $<\mathcal{D}, \mathcal{P}, \mathcal{L}, \mathcal{N}, \tau>$, t a transition in $\mathcal{N}$ with $\tau t=<v_1, v_2>$, and σ a binding for t. One may say that t is enabled in a given B snapshot with binding σ if it is so according to the transition enablement definition and, in addition, all the tokens selected by σ have an age that is between $v_1$ and $v_2$. Firing an enabled transition is identical to the case of standard eip-nets (the transition firing definition), with the only addition that for each produced token, its age is set to 0 (properly reconstructing the fact that it is entering into the corresponding place).

The execution semantics of a timed eip-net then follows the standard construction (using the refined notions of enablement and firing), with the addition that each snapshot may be subject to an arbitrary time lapse. This is done by imposing that every B-snapshot <I, m> is connected to every B-snapshot of the form (I',m') where:
I'=I (i.e., the database instances are identical);
m' is identical to m except for the ages of tokens, which all get incremented by the same, fixed amount $x \in \mathbb{Q}$ of time.

Given two B-snapshots s and s', one may say that s directly leads to s', written s→s', if there exists a direct transition from s to s' in the transition system that captures the execution semantics of B. This means that s' results from s because of a transition firing or a certain time lapse. One may extend this notion to finite execution traces $s_0 \to \ldots \to s_n$. One may also write $s \overset{*}{\to} s'$ is s directly or indirectly leads to s'. If this is the case, one may say that s' reachable from s.

To complete the aggregator 500, when the persisted sequence in the aggregator 500 is complete or the sequence times out, then the enabled Aggregate transition fires by reading the sequence number seq and snapshot of the sequence messages and moving an aggregate msg' to $ch_{out}$. Notably, the Aggregate transition is invariant to which of the two causes led to the completion of the sequence.

Checking fundamental correctness properties such as safety/reachability is of particular importance for timed eip-nets, in the light of reachable goal states. Consider here, in particular, the following relevant reach-template problem:
Input: (i) a timed eip-net B with set $P_c$ of control places, (ii) an initial B-snapshot $s_0$, (iii) a set $P_{empty} \subset P_c$ of empty control places, (iv) a set $P_{filled} \subset P_c$ of nonempty control places such that $P_{empty} \cap P_{filled} = \emptyset$.
Output: yes if and only if there exists a finite sequence of B-snapshots of the form $s_0 \to \ldots \to s_n = <I_n, m_n>$ such that for every place $p_e \in P_{empty}$, and the system has $|m_n(p_e)|=0$, and for every place $p_f \in P$ filled, then $m_n(p_f) > 0$.

Checking the emptiness of places in the target snapshot is especially relevant in the presence of timed transitions, so as to predicate over runs of the systems were tokens are consumed within the corresponding temporal guards. For example, by considering transition $T_3$ in FIG. 4, asking for the $ch_{timer}$ place to be empty guarantees that $T_3$ indeed triggered whenever enabled.

Since timed eip-nets build on eip-nets, reachability is highly undecidable, even for nets that do not employ timed transitions, have empty data logic and persistence layers, and only employ simple string colors. This setting is in fact already expressive enough to capture v-nets, for which reachability is undecidable. Similar undecidability results can be obtained by restricting even more the control layer, but allowing for the insertion and deletion of arbitrarily many tuples in the underlying persistence layer.

However, when controlling the size of information maintained by the control and persistence layers in each single snapshot, reachability and also more sophisticated forms of temporal model checking become decidable for eip-nets using string and real data types (without arithmetic).

In particular, decidability has been shown for bounded, plain eip-nets. Technically, an eip-net B with initial snapshot $s_0$ is:
"width-bounded" if there is $b \in \mathbb{N}$ s.t., for every B-snapshot <I, m>, if $s_0 \overset{*}{\to} <I, m>$, then the number of distinct data values assigned by m to the tokens residing in the places of B is bounded by b;
"depth-bounded" if there is $b \in \mathbb{N}$ s.t., for every B-snapshot <I, m>, if $s_0 \overset{*}{\to} <I, m>$, then the number of appearances of each distinct token assigned by m to the places of B is bounded by b;
"state-bounded" if there is $b \in \mathbb{N}$ s.t., for every B-snapshot <I, m>, if $s_0 \overset{*}{\to} <I, m>$, then $|\cup_{D \in \mathcal{D}} Adom_D(I)| \leq b$.

As used herein, an eip-net is "bounded" if it is at once width-, depth-, and state-bounded. Intuitively, an eip-net is bounded if it does not accumulate unboundedly many tokens in a place and guarantees that the number of data objects used in each database instance does not exceed a pre-defined bound.

The decidability of reachability for bounded eip-nets does not imply decidability of reachability for bounded timed eip-nets. In fact, ages in timed eip-nets are subject to comparison and (global) increment operations that are not expressible in eip-nets. However, one can prove decidability by resorting to a separation argument: the two dimensions of infinity respectively related to the infinity of the data domains and of the flow of time can in fact be tamed orthogonally to each other. In particular, the following theorem may be obtained: "The reach-template problem is decidable for bounded and plain timed eip-nets with initial snapshot."

Consider a bounded timed eip-net B with initial snapshot so, empty control places $P_{empty}$, and filled control places $P_{filled}$. Using faithful data abstraction techniques, one obtains a corresponding timed eip-net B' enjoying two key properties. First, B' is bi-similar to B, with a data-aware notion of bi-simulation that takes into account both the dynamics induced by the net, as well as the correspondence between data elements. Such a notion of bisimulation captures reachability as defined above, and consequently each template(B, $s_0$, $P_{empty}$, $P_{filled}$) returns yes if and the queries tackled by reach-template. In particular, notice that reach-template does not explicitly express constraints on the expected token ages when reaching the final state.

It is interesting to note that Timed-Arc Petri Nets ("TAPNs") have a more expressive mechanism to specify temporal guards in the net. In fact, TAPNs attach temporal guards to arcs, not transitions, and can therefore express different age requirements for different places, as well as produce tokens with an age non-deterministically picked from a specified interval. Hence, this more refined temporal semantics can be seamlessly introduced in a timed eip-net model without compromising the theorem. To demonstrate the control flow only pattern (REQ-0 in Table 1), chose the load balancer 600 pattern illustrated in FIG. 6. Interestingly, this pattern also covers the message channel distribution requirement (REQ-1(b) in Table 1) and thus can be considered as a relevant candidate of this category as well.

Figure 6:
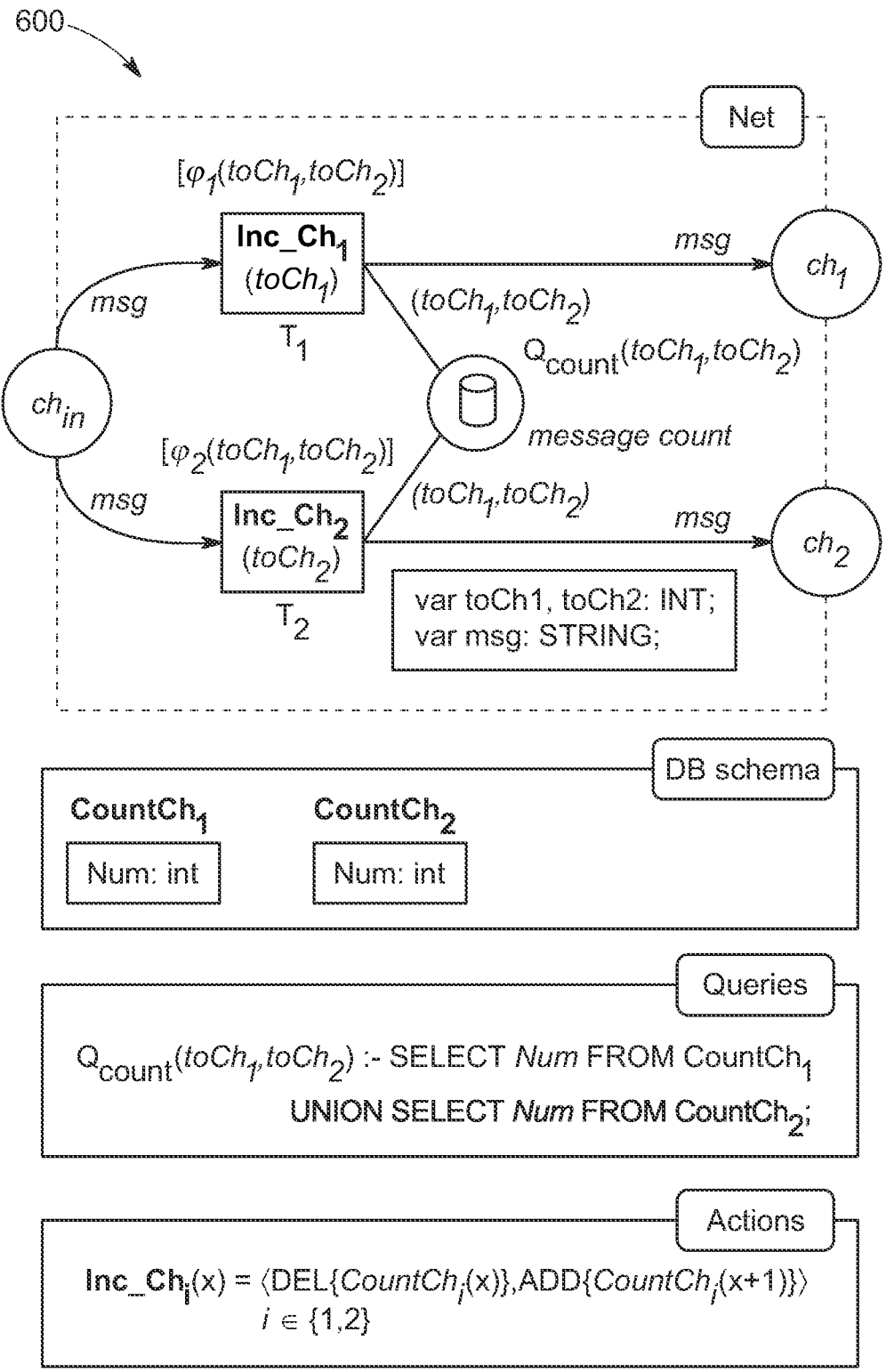
FIG. 6 illustrates a load balancer realization in a timed eip-net in accordance with some embodiments.

In a nutshell, the balancer 600 distributes the incoming messages to a number of receivers based on a criterion that uses some probability distribution or ratio defined on the sent messages. To realize the former, one could resort to stochastic PNs or extend the eip-net transition guards definition with an ability to sample probability values from a probability distribution. While the latter would extend the eip-net persistence layer, it is unclear whether the decidability results discussed in the previous section will still hold. Hence, one may opt for the ratio criterion that, as shown in FIG. 6, is realized using a persistence storage and transition guards with a simple balancing scheme. Specifically, a message msg in channel chin leads to a lookup of the current ratio by accessing the current message counts per output channel in the database and evaluating guards assigned to one of the two transitions based on the extracted values. The ratio criterion is set up with two (generic) guards $\phi_1$(toCh$_1$, toCh$_2$) and $\phi_2$(toCh$_1$, toCh$_2$) respectively assigned to $T_1$ and $T_2$. If one of the guards holds, the corresponding transition fires by moving the message to its output place as well as updating the table by incrementing the corresponding channel count. The latter is done by consecutively performing Inc_Ch$_i$·del={CountCh$_i$(x)} and Inc_Ch$_i$·add={NumberCh$_i$(x+1)} (for i∈{1, 2}).

Figure 7:
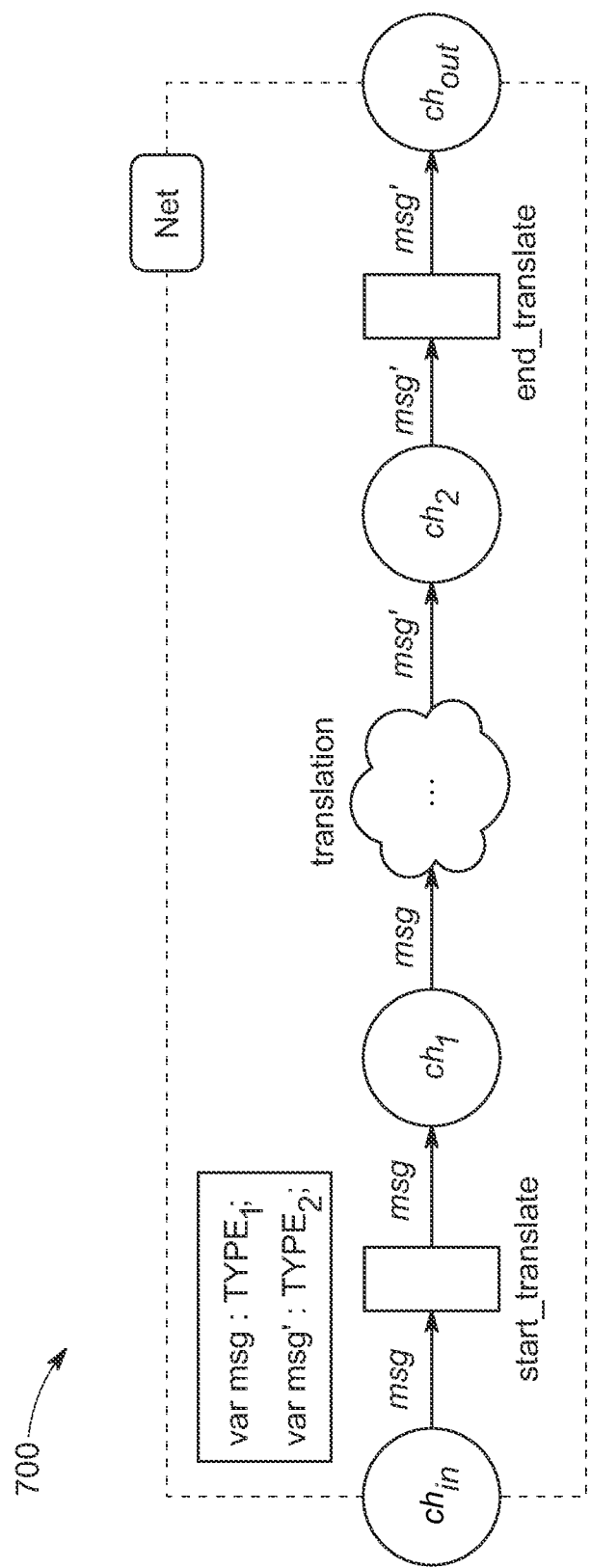
FIG. 7 is a message translator realization in a timed eip-net according to some embodiments.

A stateless message translator 700, shown in FIG. 7, is the canonical example of a data flow only pattern. The translator 700 works on the data representation level, by transforming an incoming message of type TYPE$_1$ from ch$_{in}$ using a subnet that starts by firing start_translate and finishes by firing end_translate, and that produces a new message of type TYPE$_2$ into the receiver place ch$_{out}$.

Figure 8:
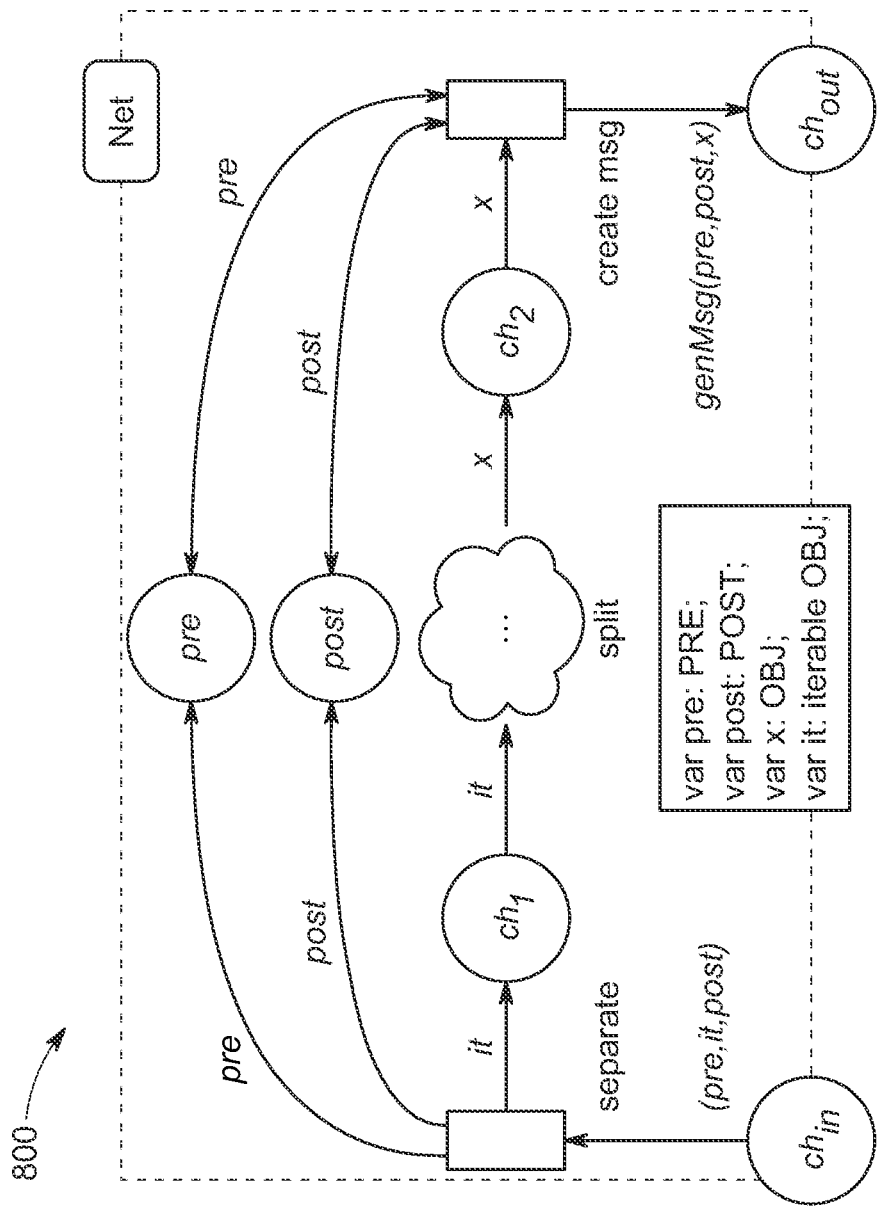
FIG. 8 is splitter realization in a timed eip-net in accordance with some embodiments.

The (iterative) splitter 800 of FIG. 8 is an example of a non-message transformation "data flow only pattern," which is also required for a case study scenario. The pattern itself represents a complex routing mechanism that, given an iterable collection of input messages it together with two objects pre and post, is able to construct for each of its elements a new message of the form [<pre>]it:msg$_i$[<post>] with optional pre and post parts. As shown in FIG. 8, the splitter 800 can be fully realized in CPN under certain restrictions assumed for the type of the iterable collection at hand. The entering message payloads in ch$_0$ are separated into its parts: pre, post and it. While the first two are remembered during the processing, the iterable it is iteratively split into parts according to some criterion realized in the split subnet, which represents a custom split logic and thus is intentionally left unspecified (in FIG. 8 it is marked with a cloud symbol).

Figure 9:
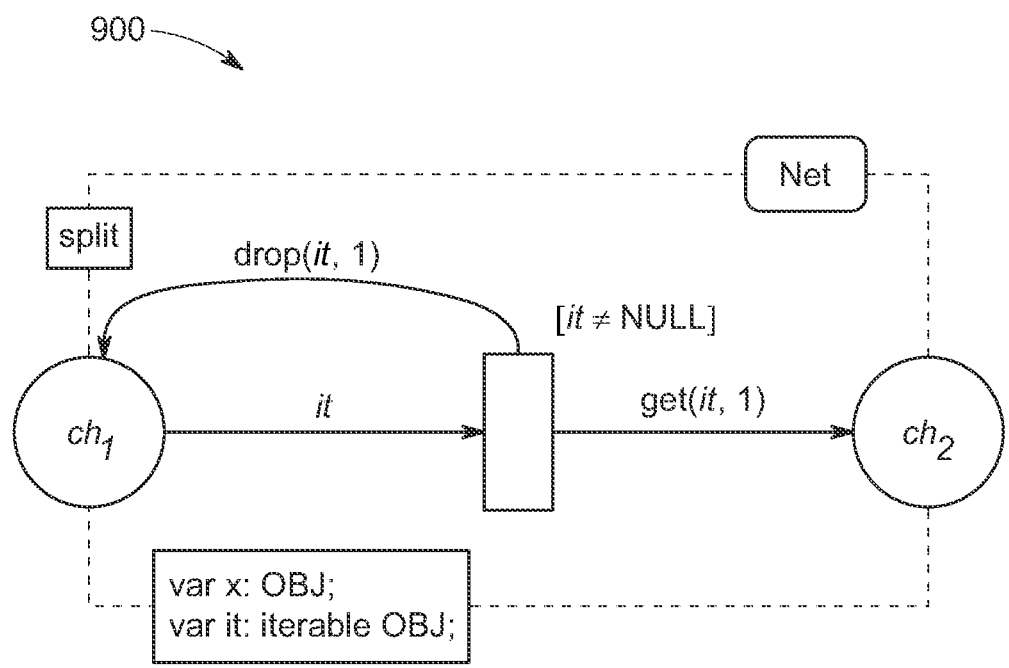
FIG. 9 is a sample split subnet realization according to some embodiments.

The split subnet can be adapted to the message format and the requirements of a specific scenario. FIG. 9 demonstrates a possible implementation 900 of the subnet. Here, functions get and drop are used to read and remove the n-th element of an iterable object. In this case, one may alternate their applications to the iterable object it from place ch$_1$ in order to extract and delete its first element that is then placed into ch$_2$. Such a procedure is repeated until it is empty (i.e., it is NULL). Each of extracted elements from it, together with the information about pre and post, is then used to create a new message (by calling function genMsg) that is passed to the output channel ch$_{out}$ (FIG. 9).

Figure 10:
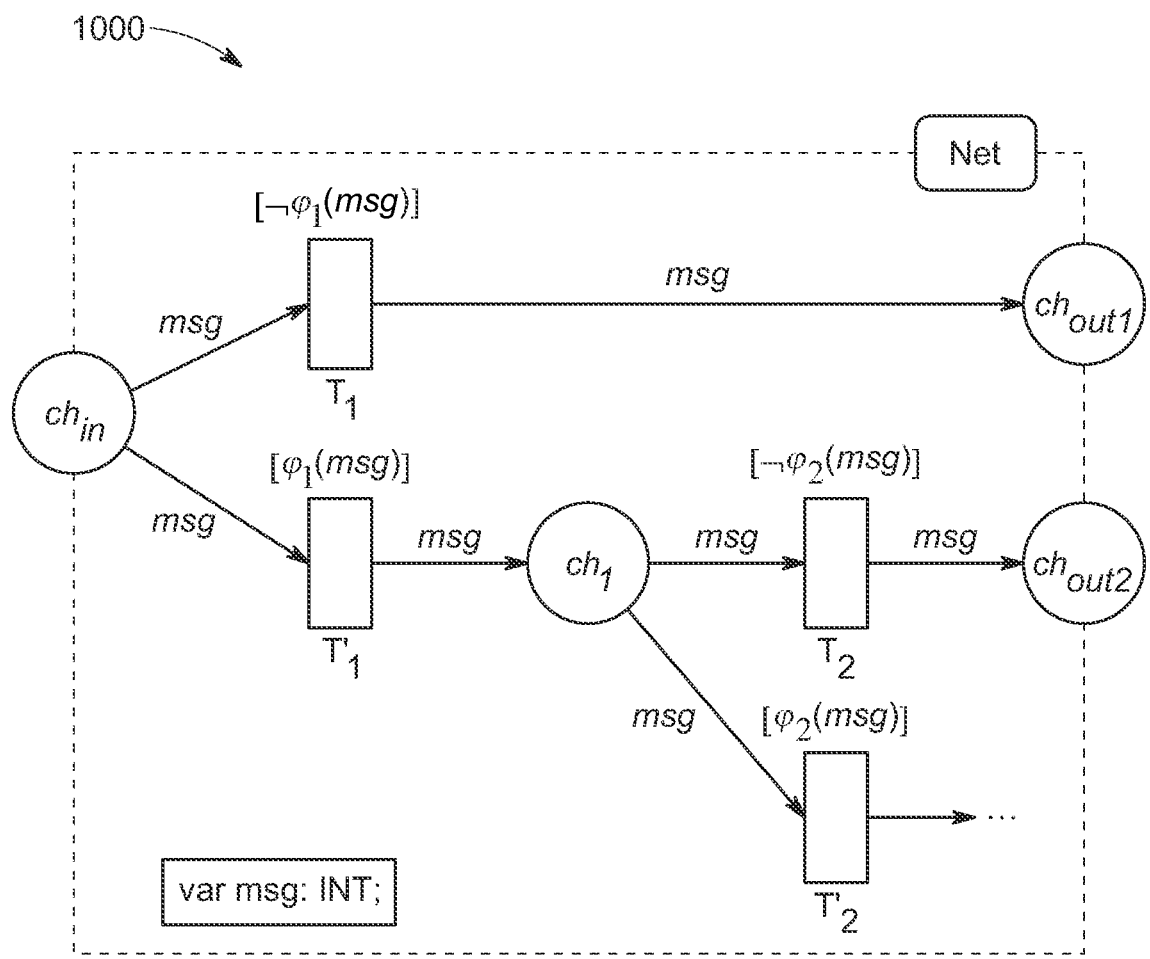
FIG. 10 illustrates a content-based router realization in a timed eip-net in accordance with some embodiments.

The content-based router pattern 1000 of FIG. 10 is the canonical candidate for data and control flow patterns. The realization of the router 1000 with conditions $\phi_1$, $\phi_y$ that have to be evaluated strictly in-order (REQ-1(a)) is shown in FIG. 10. Although the router 1000 could be realized more elegantly by using priority functions, one may instead explicitly realize them with pair-wise negated timed eip-net transition guards. A message from incoming channel chin is first evaluated against condition $\phi_1$. Based on the evaluation result, the message is moved either to ch$_1$ or ch$_2$. In case it has been moved to ch$_2$, the net proceeds with the subsequent evaluation of other conditions using the same pattern. When none of the guards can be evaluated, a non-guarded, low priority default transition fires (not shown in FIG. 10). This explicit realization covers the router's semantics, however, requires (k×2)+1 transitions (i.e., condition, negation, and only one default), with the number of conditions k.

Figure 11:
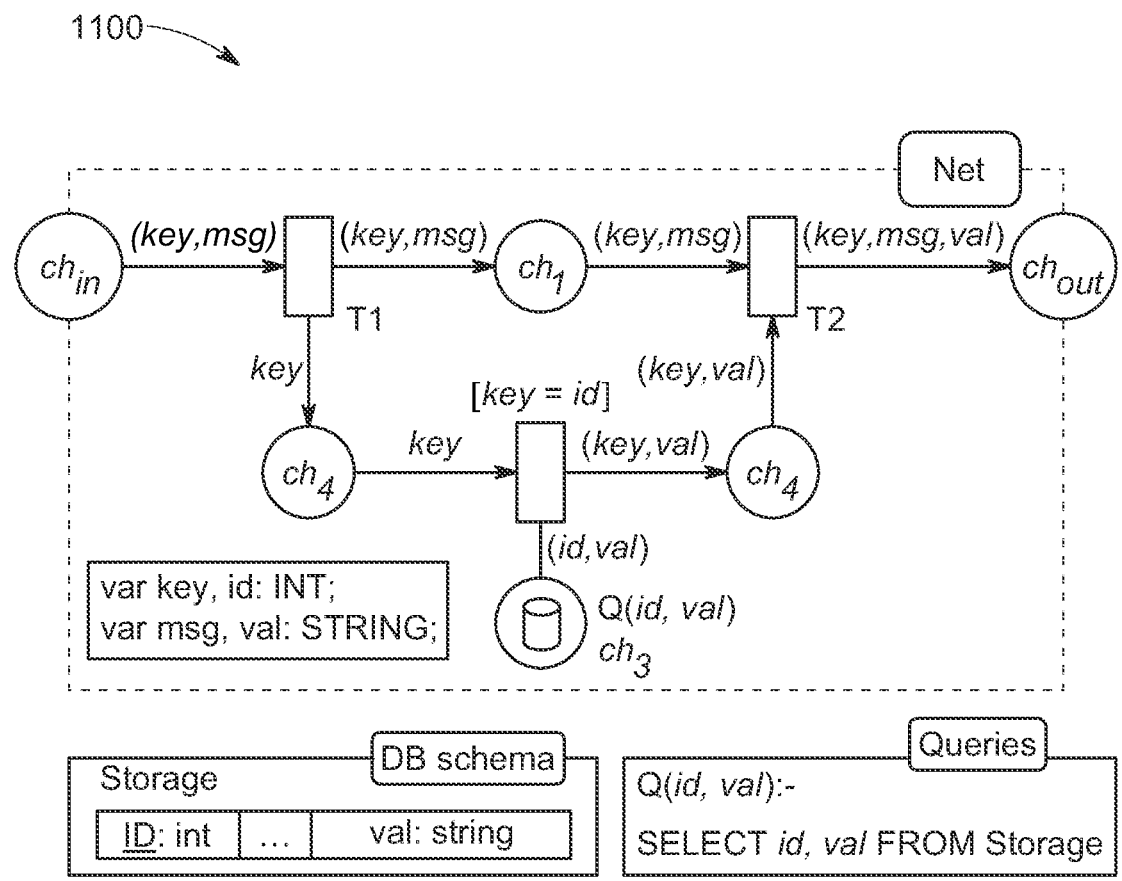
FIG. 11 illustrates a content enricher realization in a timed eip-net according to some embodiments.

The first pattern chosen for such that it includes a data flow with transacted resources is a content enricher 1100 as shown in FIG. 11. It requires accessing external resources (e.g., relational database) based on data from an incoming message. Such data are then used to enrich the content of the message. As one can see in FIG. 11, the pattern uses request-reply transitions $T_1$ and $T_2$ to direct the net flow towards extracting message-relevant data from an external resource. The extraction is performed by matching a message identifier key with the one in the storage.

While the stateless enriching part is essentially a colored Petri net, in order to access a stateful resource in ch$_3$ one needs to use eip-nets so as to specify and perform queries on the external storage (REQ-4(a,b)). In addition to the specific pattern requirements, the message processing semantics of the EIPs describes one message (or token) at a time. Thus, one may assume that the represented net model always deals with a single as well.

Figure 12:
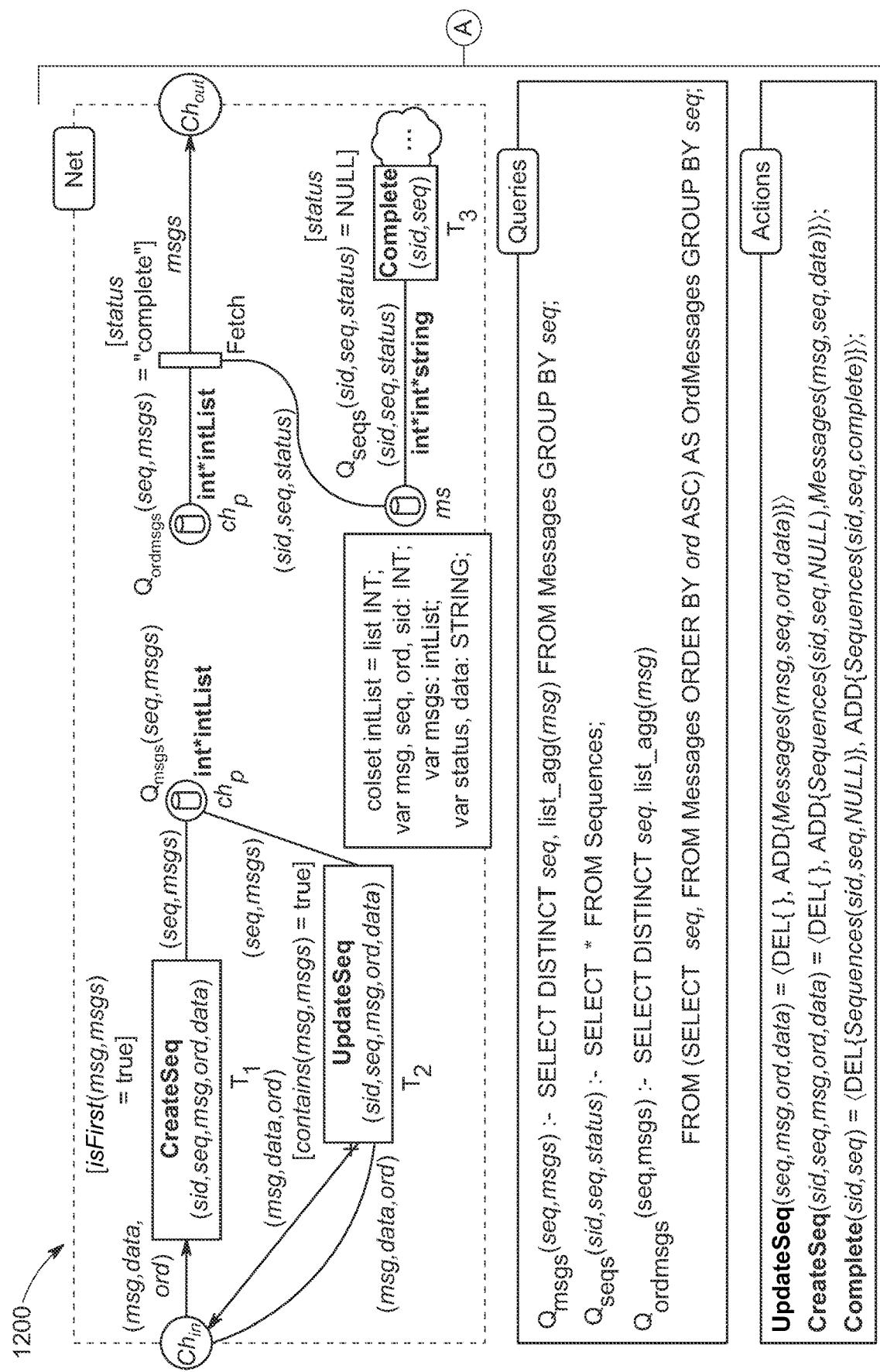
FIG. 12 illustrates a re-sequencer realization in a timed eip-net in accordance with some embodiments.

The stateful re-sequencer is a pattern that ensures a certain order imposed on messages in (asynchronous) communication. FIG. 12 shows how the re-sequencer 1200 can be represented in eip-nets. The incoming message msg contains information about its sequence seq, some order information ord and is persisted in the database. The information about stored messages can be accessed through the view place ch$_p$. For the first incoming message in a sequence, a corresponding sequence entry with a unique identifier value bound to sid will be created in the persistent storage (sequences can be accessed in the view place ms), whereas for all subsequent messages of the same sequence, the messages are simply stored. Note that since sid is not bound to variables in the input for $T_i$(i∈{1, 2, 3}), it can be treated as a fresh variable that, whenever the transition is executed, gets a unique value of a corresponding type assigned to it. As soon as the sequence is complete, i.e., all messages of that sequence have arrived, the messages of this sequence are queried from the database in ascending order of their ord component (see the view place ch$_{pt}$ and its corresponding query). The query result is represented as a list that is forwarded to ch$_{out}$. Note that the completion condition can be extended by a custom logic, indicated by a subnet connected to $T_3$.

Figure 13:
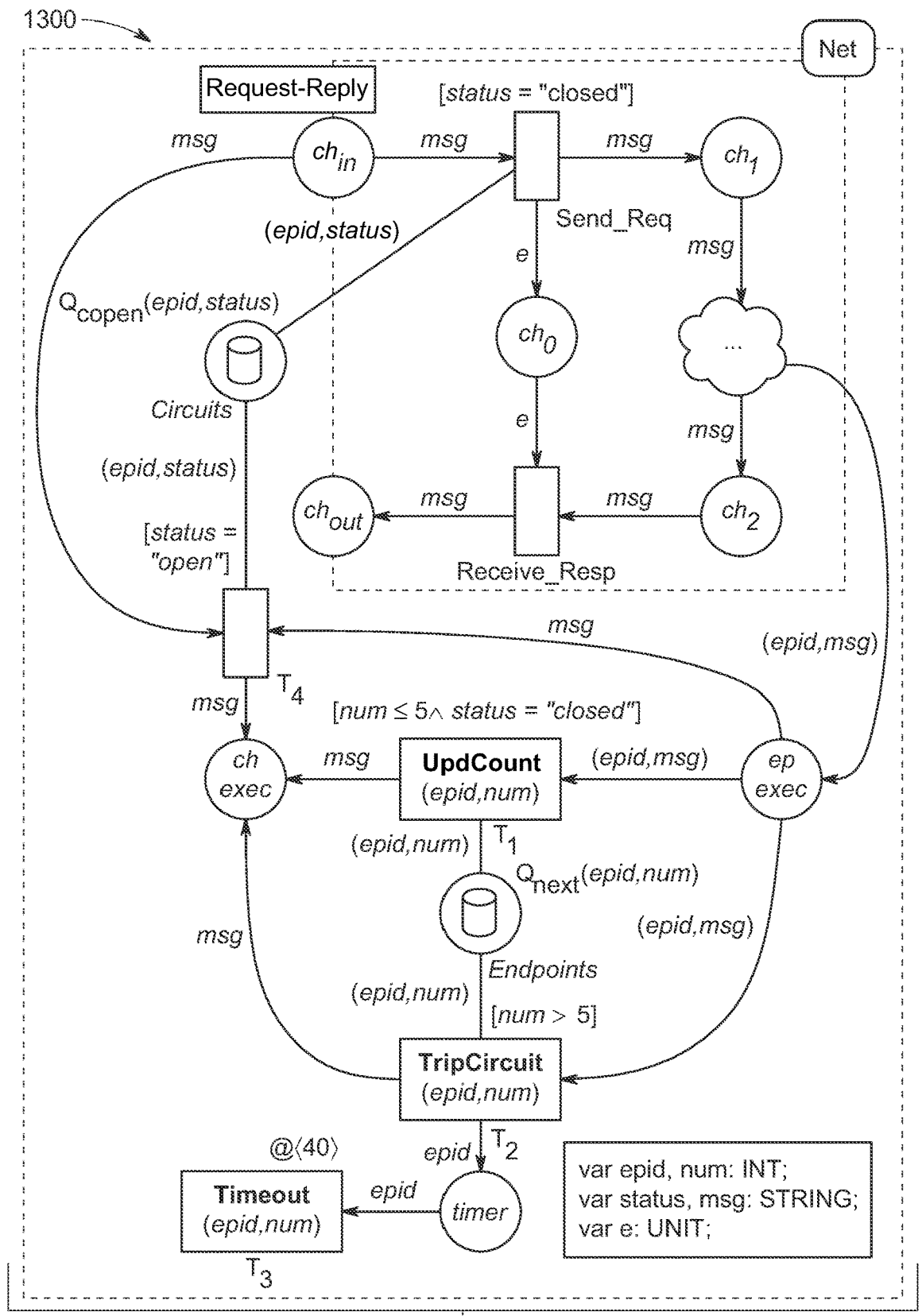
FIG. 13 illustrates a circuit breaker realization in a timed eip-net according to some embodiments.

To demonstrate a family of patterns that are based on a control flow with transacted resources and time, one may select as its representative a circuit breaker pattern 1300 as illustrated in FIG. 13. It addresses failing or hang up remote communication, which impacts the control flow of the request-reply pattern by using transacted access to external resources. FIG. 13 shows a representation of the request-reply pattern in timed eip-nets, extended by a circuit breaker "wrapper" that protects the remote call. At the beginning, every (endpoint-dedicated) circuit in the circuit breaker is closed (that is, its status in table circuit is initially set to closed), thus allowing for the communication via the request-reply pattern part. Note that for simplicity, every endpoint is identified with a unique number EPID. If the request-reply pattern executes normally, the resulting message is placed in ch$_{out}$. Otherwise, in the case when an exception has been raised, the information about the failed endpoint is stored both in the endpoints table of the persistent storage and a special place ch exec. Such a table contains all endpoints together with the number of failures that happened at them. If the number of failures reaches a certain limit (e.g., num>5), the circuit trips and updates its status in the corresponding entry of the circuit relation to open. This in turn immediately blocks the communication process that, however, can be resumed (i.e., the circuit is again set to open and the failure count is set to 0) after 40 time units have been passed. Note that whenever at least one circuit remains closed, the messages from chin will be immediately redirected to ch exec.

Figure 14:
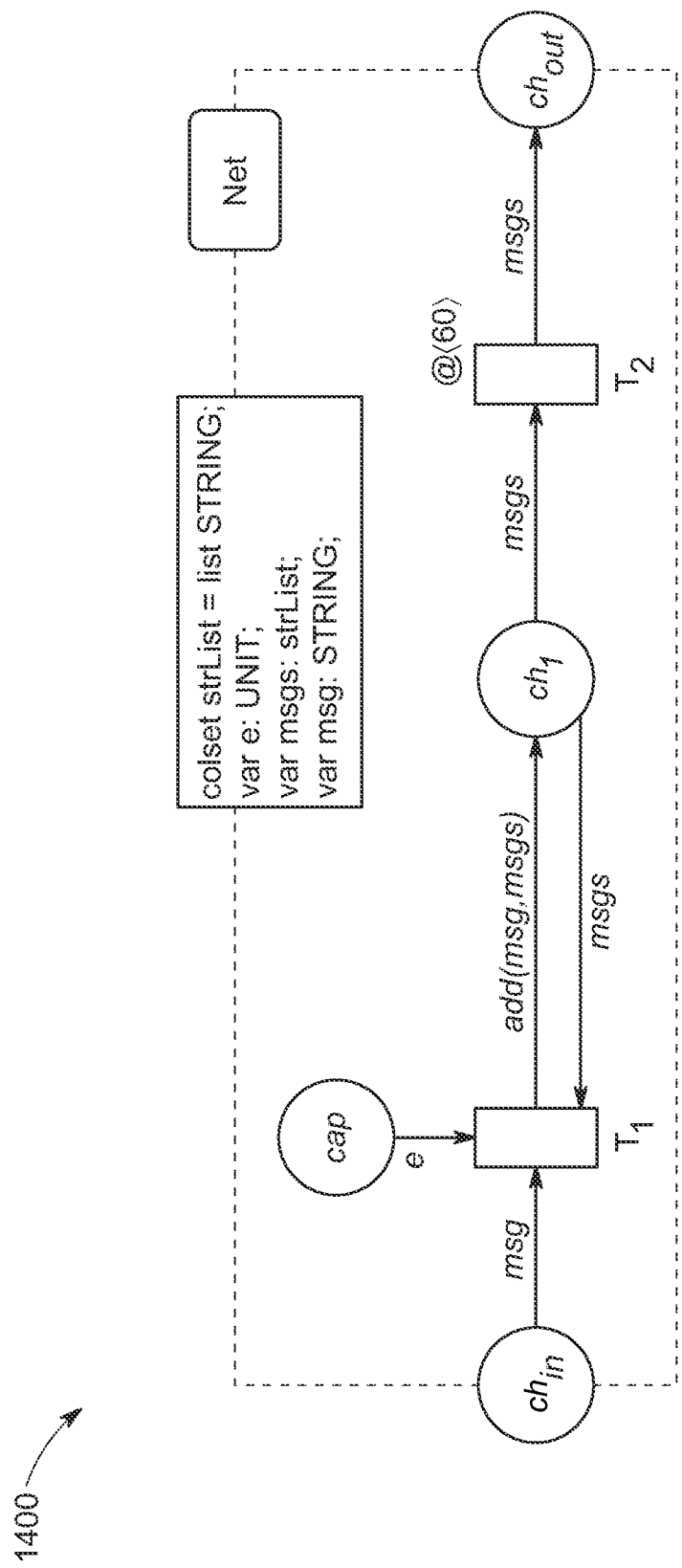
FIG. 14 illustrates a throttle realization in a timed eip-net in accordance with some embodiments.
Figure 15:
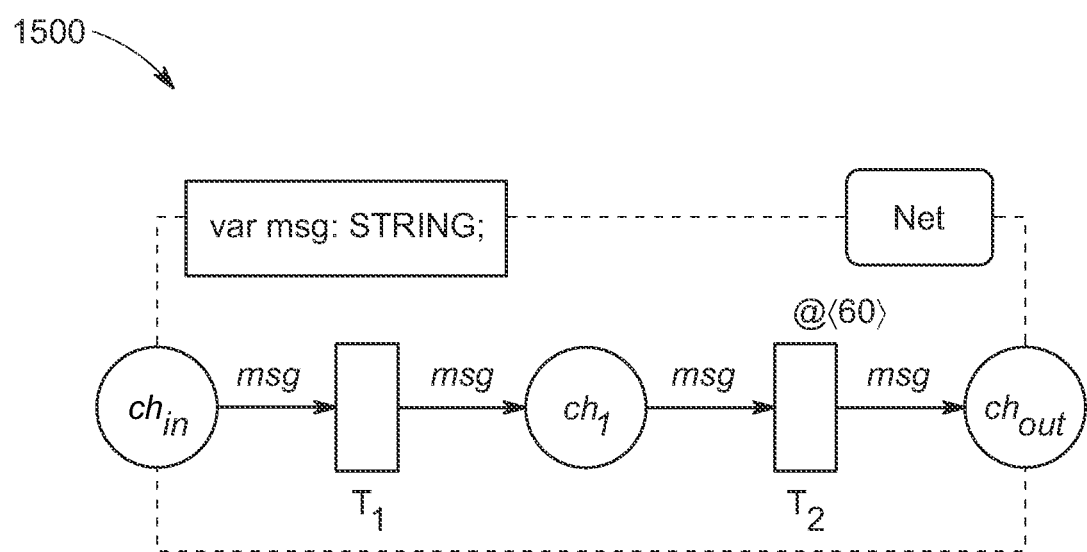
FIG. 15 illustrates a delayer realization in a timed eip-net according to some embodiments.

The representative patterns of a control flow with time group (e.g., throttler, delayer) mostly require control flow and time aspects, and thus can be represented using timed CPNs. The first pattern is the throttler. It helps to ensure that a specific receiver does not get overloaded by regulating the number of transferred messages. FIG. 14 shows the realization of a throttle 1400 that emits at most n messages (here n is the number of "simple", black tokens assigned with an initial marking to place cap) per 60 time units to the receiving place $ch_{out}$. A slightly different pattern of this category is the delayer 1500 that uses a timer to reduce the frequency of messages sent to the receiving place $ch_{out}$. As shown in FIG. 15, the sent message is delayed by 60 time units. Note that the pattern realizations described herein are only representative examples of each a category of more than 150 integration patterns (i.e., any of those patterns can be represented using the timed eip-net formalism).

The combination of data, transacted resources and time aspects in patterns makes them the semantically most complex ones. For example, FIG. 4 specifies the semantics of a commonly used stateful aggregator 400 pattern. The aggregator 400 persistently collects messages, that can be seen in a dedicated view place $ch_p$, and aggregates them using the aggregate transition based on a completion condition (i.e., a sequence that the message is related to is complete) or on a sequence completion timeout. For this an incoming message msg is correlated to an existing sequence based on a sequence label seq attached to it. If the message is first in a sequence, a new sequence is created in the sequences table and the message together with a reference to this sequence is recorded in the persistent storage using the messages table. If a message correlates to an existing sequence seq, which has been aggregated due to a timeout, the update fails. This results in the roll-back behavior: the database instance is restored to the previous, while the net uses the rollback arc to put the message back to the message channel $ch_{in}$. This message can be then added as the first one to another newly created sequence seq.

The eip-net foundation implicitly covers REQs-2,4 in form of a relational formalization with database transactions. Together with the realizations of the content-based router 1000, load balancer 600 (REQ-01(a), (b)) and aggregator 400 of FIG. 4 (REQ-3(a), REQ-4, and REQ-5) realizations for all of the requirements may be shown. The expiry of tokens, depending on time information within the message, can be represented using CPNs and eip-nets by modelling it as part of the token's color set and transition guards. Nevertheless, to model the transition timeouts (REQ-3(a)) and delays (REQ-3(c)) one needs to resort to more refined functionality realized in timed transitions provided by the timed extension of CPN. Similarly, the msg/time ratio (REQ-3(d)) can be represented (see throttle 1400 pattern in FIG. 14).

The categorization of patterns according to their characteristics allows for an instructive formalization based on candidates of these categories and shows that even complex patterns can be defined in timed eip-nets. This, in turn, allows for discussion of candidates of many different categories, since they can be seamlessly derived by the introduced patterns from other categories. For example, control and data with resource patterns do not require transacted resources and can thus be realized similar to their transacted resource cases by substituting view places with normal ones. The building blocks for the realization of transacted resource as well as data flow with time patterns can be derived from, e.g., the re-sequencer 1200 or aggregator 400 patterns. Finally, the data flow with format patterns can be represented using CPNs (and thus are not further discussed).

According to some embodiments, the model checking results described herein allow for the formal verification of the correctness of the realization of each pattern. However, due to the absence of a model checker for (timed) eip-nets, the formal analysis of such cannot be automatically performed. Nevertheless, as an alternative to the model checking approach, it is possible to perform the correctness testing using the experimental validation via (repeated) simulation of eip-net models.

The correctness of an integration pattern realization represented in timed eip-nets can be validated by evaluating the execution traces of such models (e.g., similar to a state-oriented testing scheme), where at each step, an execution trace contains a B-snapshot representing a current state of the persistence layer together with a control layer marking. According to the timed eip-net execution semantics, a consecutive, finite enactment of a pattern model starting from an initial B-snapshot $s_1 = <I_1, m_1>$ produces several B-snapshots $s = <I, m>$ that, depending on the number of enactment steps, generates a finite execution trace $s_1 \rightarrow \ldots \rightarrow s_{n+1}$ for some $n \in \mathbb{N}$.

Figure 16:
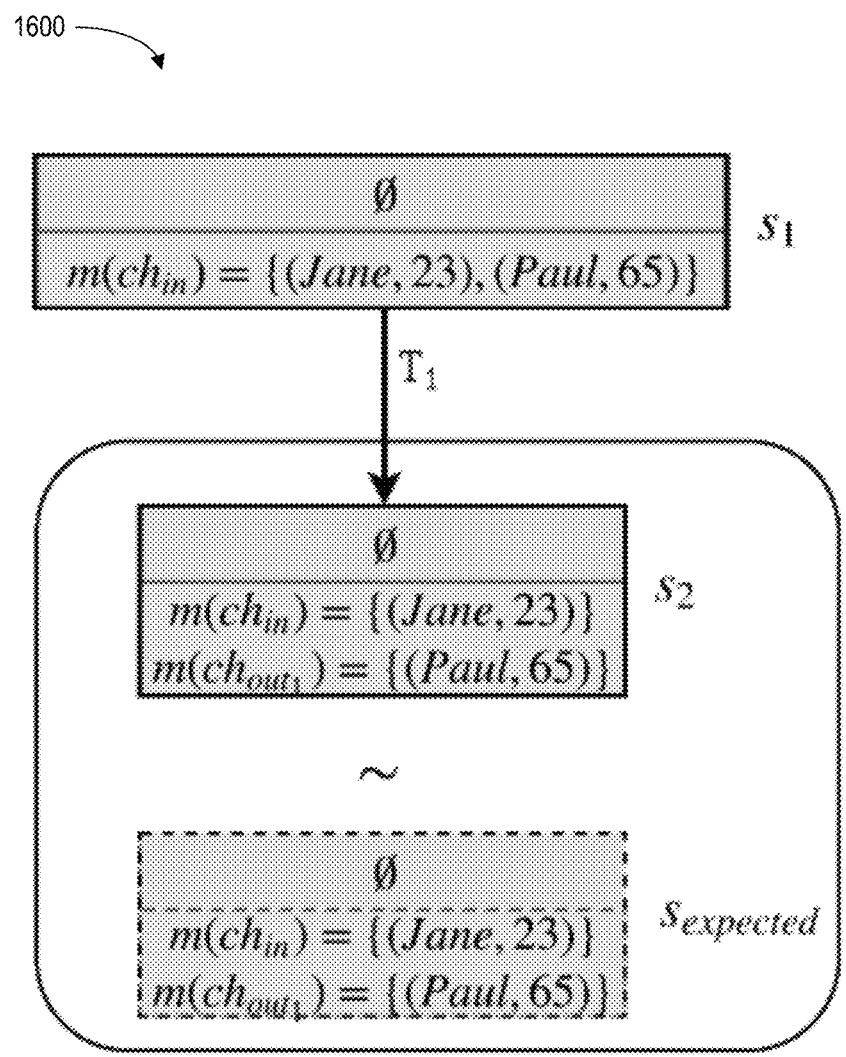
FIG. 16 illustrates finite eip-net execution of a content-based router in accordance with some embodiments.

Consider a content-based router 1000 model B from FIG. 10 with an initial B-snapshot s1 containing markings for messages of two employees with their age (Jane, 23), and (Paul, 65). Since the router 1000 has no persistence, the database snapshot is empty. FIG. 16 shows a possible, finite execution of B 1600 starting from s1. In order to reach $s_2$ from $s_1$, transition $T_1$ with routing condition [age 25] has to be fired. The resulting marking only contains the message of Jane that has satisfied the condition, while the message of Paul has not been forwarded.

In the router example, given the initial marking {(Jane, 23), (Paul, 65)} analyzed against the guard of $T_1$, the marking $s_{expected}$ (cf. (Jane, 23) in FIG. 16) denotes the only allowed final state $s_2$ for a properly working router. More generally this is defined in a way that allows for a configurable, correctness criterion definition over finite traces induced by pattern models. Let $s_1 \rightarrow \ldots \rightarrow s_{n+1}$ be a finite execution trace of some pattern model M and C be a set of reference B-snapshots that define a set of correct, desired states. As used herein, a pattern execution is "correct" if, for all $c \in C$ it holds that $c \sim s_i$, for $i \in \{1, n+1\}$. The operator ~ typically denotes equality but can also correspond to more sophisticated comparison operators for relating reached and desired snapshots.

Note that the definition still captures the situation where target snapshots are enumerated explicitly. Other forms of validation (e.g., based on statistical goals formulated over the exhibited behaviors of the system) would require a more fine-grained approach able to aggregate snapshots and traces.

Also consider this correctness criterion for three different requirement categories: control flow, data flow together with format and (transacted) resource, and timed patterns. To test control flow patterns for correctness, the operator ~ can be defined so as to compare the number of tokens in the correct, final snapshot. Nevertheless, there are control flow patterns whose correctness testing puts additional requirements on ~.

For example, the load balancer 600 pattern (REQ-1) denotes a special case, since it requires a sequence of input tokens, which then have to produce data entries in the output instances that fit the probability values and distribution of the balancer (e.g., Kolmogorov-Smirnov test). Therefore, the ~ operator has to check whether the number of tokens in the desirable states follows a probability distribution.

Figure 17:
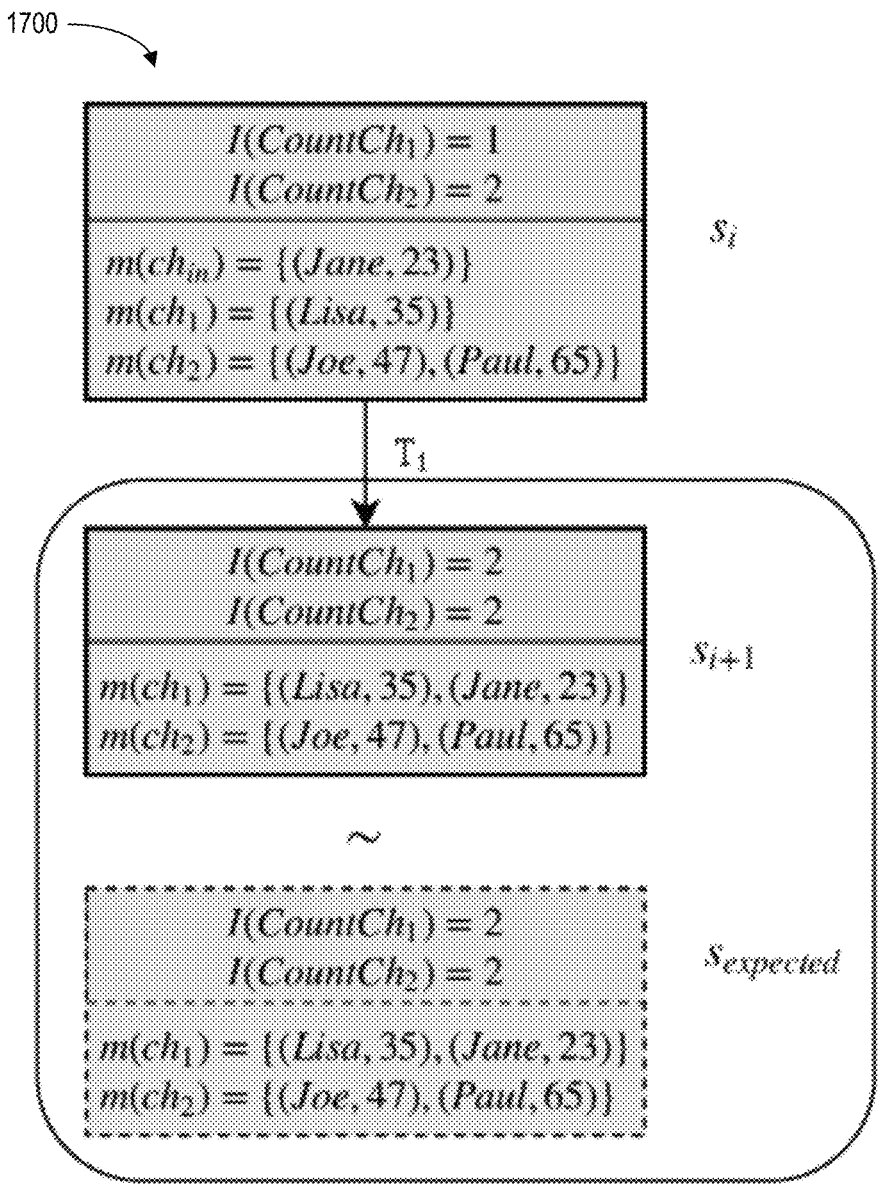
FIG. 17 is a finite execution trace of a load balancer in a timed eip-net according to some embodiments.

Consider the load balancer 600 in a timed eip-net B from FIG. 6 with an initial B-snapshot s1 containing a marking m with several messages composed of employee names and ages m=(Jane, 23), (Lisa, 35), (Joe, 47), (Paul, 65). In the example shown in FIG. 17, three of the tokens have been already distributed. This means that the current, observable snapshot si has a database instance with two tuples CountCh1(1) and CountCh2(2), and a marking with one token in the input state $m(ch_{in})=\{(Jane, 23)\}$, one token in the first channel $m(ch_1)=\{(Lisa, 35)\}$ and two tokens in the second channel $m(ch_2)=\{(Joe, 47), (Paul, 65)\}$. Assuming that in the current state $\varphi_1$ holds, the system can can fire transition $T_1$. This, in turn, generates a new state $s_{i+1}$. In order to check whether $s_{i+1}$ is an expected state, the system may run a correctness test that is performed on the number of messages sent to the channels. Such a test allows us to see whether a final, desired message ratio is produced by the model. For example, knowing that the bandwidth of the second channel is considerably greater than the one of the first channel, one may expect that the final ratio of $ch_1/ch_2$ is not greater than 0.7. The ~ $ch_2$ operator can be accordingly adopted to perform such a test.

The example shows that, even though the correctness testing of control flow patterns is feasible, there are cases in which such tasks may require extra workload in form of input data, mainly on the configuration of the testing setup.

In order to test the correctness of patterns that meet requirements REQ-2 and REQ-4, one needs to consider testing not only the marking, as it is done in the case of control flow patterns, but also to compare states of the persistent storage. Specifically, for a given initial snapshot $s_1$ with an instance $I_1$, either an expected state $s_n$ with an instance $I_n$ or an expected error state $s_j$ must be produced by the pattern. Otherwise the pattern is considered incorrect.

Figure 18:
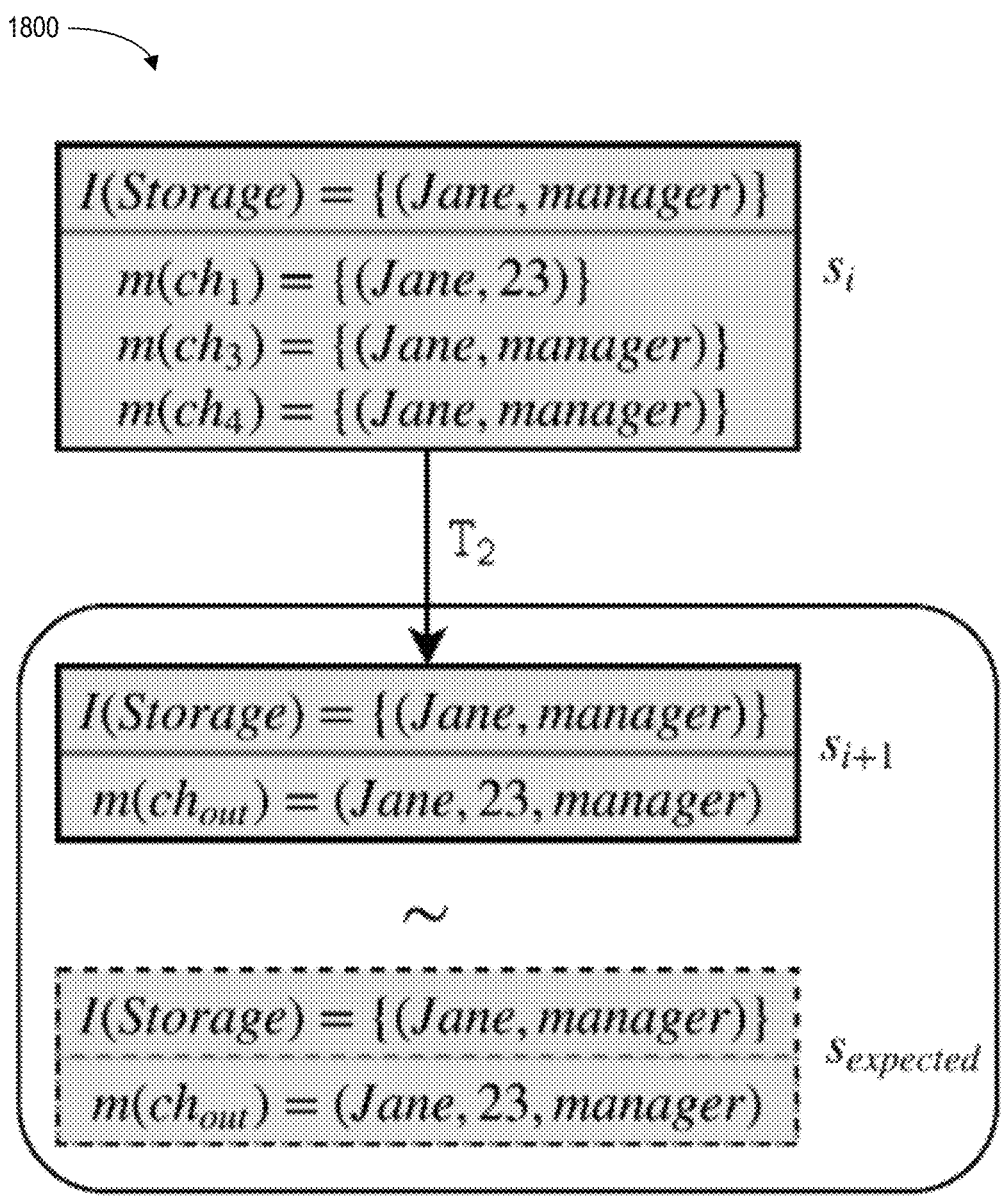
FIG. 18 is a partial execution of a content enricher timed eip-net in accordance with some embodiments.

Consider a timed eip-net B for the content enricher 1100 in FIG. 11 with an initial B-snapshot $s_1$ that contains a marking m with a message composed of an employee name and age such that $m(ch_{in})=(Jane, 23)$. In the example 1800 of FIG. 18, the database of the content enricher 1100 model stores information about employees and their positions in a relation called Empl. To reach the final state $s_{i+1}$ from $s_i$, the system needs to fire $T_2$. The fact that $s_i$ has a marking containing two tokens (one with the employee's name and age, and another one with the same name and position) shows that, a few steps before, the employee token (Jane, 23) was matched to the corresponding entry in the persistent storage and extra information about her position was extracted. If it was not the case, the execution trace, which is partially represented 1700 in FIG. 18, would not contain such two tokens that, in turn, would mean that the transition used for accessing the view-place could not fire since no matches were found. Thus, $T_2$ does not fire and the final state does not fulfill the correctness criterion for the given initial snapshot.

Note that, however, in this example the internal database state does not play the main role when testing the correctness. The correctness checking is done on the markings which are populated from the database based on the matching condition assigned to the transition inspecting the view place.

Finally, a timed pattern can be validated by extending database schemas with extra attributes for storing timestamps (as "on-insert timestamps" in actual databases) or by adding such timestamps to tokens, indicating the token creation time. This allows for checking delays, e.g., by comparing the insert timestamps $time(I_1)$, $time(I_n)$ of data to instance I1 and those of the final instance $I_n$, or the timestamps in the tokens, respectively. With this, a numeric delay interval $d=(d_1, d_2]$ can be checked, with $d_1=\tau$ being the delay configured in the pattern and $d_2=\tau+avg(t_p)+var(t_p)$, the average time $t_p$ and the variance the pattern requires for the internal transition firings without the configured delay plus. Since the delay $\tau$ is an interval itself, its upper value is taken for the application of the correctness criterion.

Figure 19:
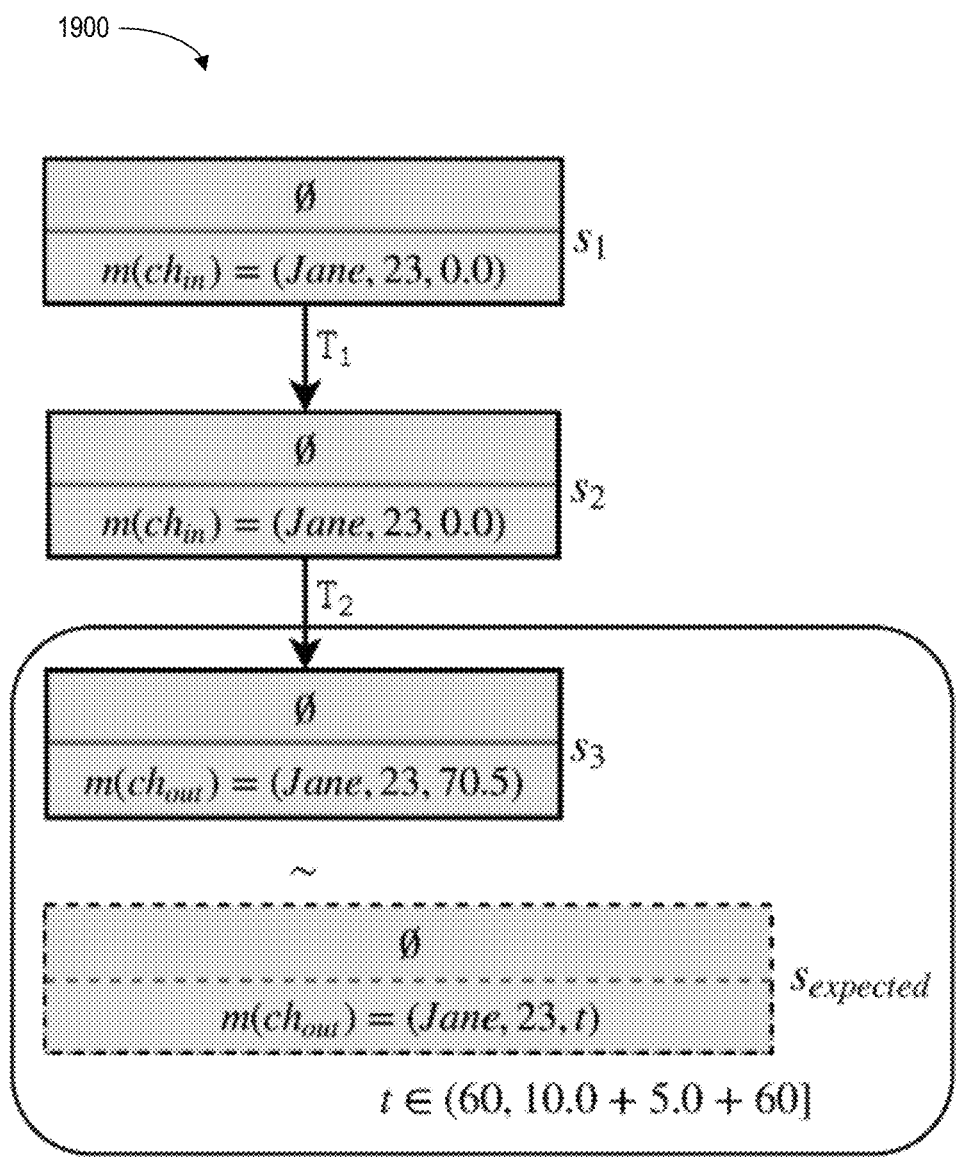
FIG. 19 is a partial execution of a delayer timed eip-net according to some embodiments.

Consider a timed eip-net B for the delayer 1500 in FIG. 15 with an initial B-snapshot $s_1$ that has a marking m with a message composed of an employee's name and age $m(ch_{in})=(Jane, 23)$. In the example 1900 of FIG. 19, transition $T_2$ fires with a time delay of 60 time units. Since the delayer 1500 does not require a database state, the correctness of the timestamps is checked on the markings. In this example, assume the average time $avg(t_{delayer})$ is 10.0 and the variance $var(t_{delayer})$ is 5.0 without the delay. This results in a desirable marking (Jane, 23, t) in $s_{expected}$ with $t \in (60, 75]$ that, in turn, can be checked against the one in s3 using ~ that, on top of comparing the states by equality, also compares whether the time stamp belongs to a desired time interval. Note that the token ages cannot be used for checking delays, since they are reset, when inserted into a timed eip-net place.

The main sources of error during the responsible pattern formalization process 100 in FIG. 1 are the conceptual work on defining the formal representation of a pattern, as well as the model to implementation step, in which the formal model is implemented and configured.

For pattern description to model errors, the formal representation of a pattern depends on different challenging factors concerning the quality and comprehensiveness of the pattern description as well as the clarity of its variations, and the complexity of the formalism. Consequently, the process of formalizing a pattern can introduce flaws prone due to understanding of the complex task at hand. For example, while the content-based router 1000 in FIG. 10 represents the pattern correctly, one could go wrong with the ordered execution (cf. REQ-1(a)), e.g., through transition guards at $T_1$ and $T'_1$. If these guards were set with overlapping conditions, then several tokens are produced in different output places, i.e., $m(chout1=\{(Paul, 65)\})$, $m(chout2=(Paul, 65))$, which does not match the desired state in the example in FIG. 16.

Figure 20:
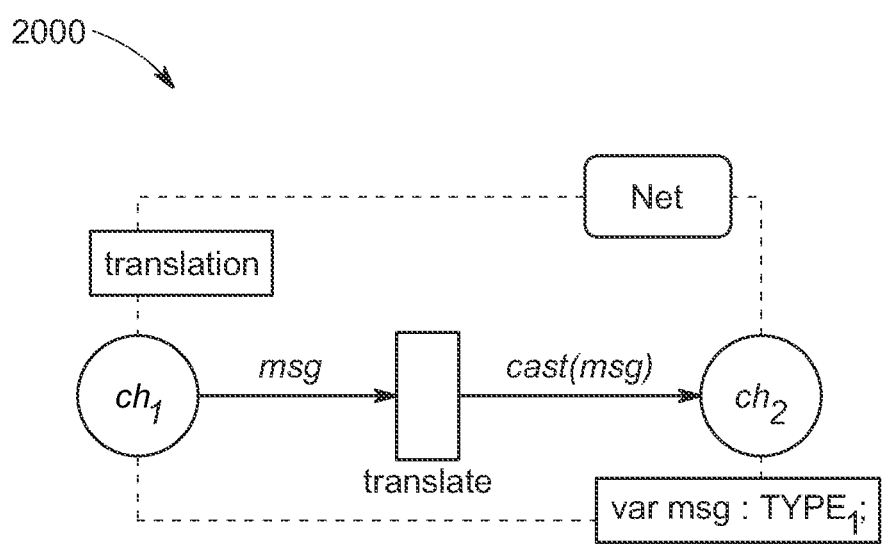
FIG. 20 is sample translation subnet realization in accordance with some embodiments.

For pattern model to implementation Errors, the model to implementation gap specifies the difficulties that can arise during the implementation of a formalize pattern. With the model on one side and the tool-specificities on the other, errors can occur during the translation and configuration. While translation-related errors target particularities of the chosen tool or language, configuration errors can occur in user-defined subnets. For example, the message translator 700 in FIG. 7 allows for the configuration of a user-defined subnet that translates an input message msg of type $TYPE_1$ an output message of $TYPE_2$ using a special casting function cast. In case of an expected final state $m(ch_{out}=\{(Paul, 65, London)\})$ for an input state $m(ch_{out}=\{(Paul, 65, EC4M\})$, a configuration 2000 of the subnet as shown in FIG. 20 would not suffice, due to the resulting final state $m(ch_{out}=\{(Paul, EC4M)\})$.

The comprehensiveness of timed eip-nets might be evaluated with respect to coverage of the patterns in various catalogs to compare the applicability of the existing CPN-based formalization, colored Petri nets in general, and/or timed eip-nets. While some formalizations cover only some of the EIP, many more EIPs as well as the recently extended patterns can be represented by colored Petri nets. Note that one can formalize nearly all of the EIPs using timed eip-nets. The only exception is one pattern, namely dynamic router, whose requirements cannot be represented using Petri net classes. In fact, in order to represent such a pattern one would need to employ a formalism that, on the one hand, subsumes eip-nets and thus covers all the requirements discussed in Table 1 and, on the other hand, supports extra requirements (i.e., dynamically added or removed channels during runtime) that, in turn, extend the expressiveness of the formalism with the ability to generate arbitrary topologies. To allow for such a functionality one may enrich classical Petri nets with tokens carrying linear logic formulas.

After having analyzed the pattern coverage per formalism, now consider the relevance of such formalisms against real-world integration scenarios. For this, one might implement a content monitor pattern, which allows for the analysis of the actually deployed integration scenarios that are, for example, running on cloud platforms. The results show that current approaches are only partially sufficient to cover various scenarios. With a more general CPN approach, more than 70% of more conventional communication patterns can be covered. The more recent and complex cloud, business network, and device integration requires timed eip-nets to a larger extent, which covers all analyzed scenarios. Note that the dynamic router with arbitrary topologies may not be practically required for these scenarios, and thus seems to of only theoretical relevance.

In conclusion: (1) timed eip-nets are sufficient to represent most of the EIPs; (2) EIPs that are generating arbitrary topologies are not covered by considered PN classes; (3) hybrid integration requires less complex semantics and thus is largely in CPN; and (4) timed eip-nets cover all of the current integration scenarios in cloud platforms.

One may prototypically implement the eip-net formalism to experimentally test the correctness of the pattern realizations via simulation. In order to test the correctness, one may simply generate a finite execution trace, starting in an initial B-snapshot $s_1$ and finishing in $s_n$, using the prototype and inspect the generated marking together with the database instance. If $s_n$ corresponds to an expected state, then the test is considered to be successful. Since the inner workings of a pattern can differ between various pattern implementations (e.g., the implementation generates some intermediate states, which are not related to the actual pattern model, but are used, for example, for collecting statistics), the correctness can be also checked at any step of such pattern's finite execution trace.

For example, one may select CPN Tools v4.0 ("CPN Tools") for the modeling and simulation. As compared to other PN tools like Renew v2.5 ("Renew"), CPN tools supports third-party extensions that can address the persistence and data logic layers of eip-nets. Moreover, CPN Tools handles sophisticated simulation tasks over models that use the deployed extensions. To support eip-nets, an extension may add support for defining view places together with corresponding SQL queries as well as actions and realizes the full execution semantics of eip-nets using Java and a PostgreSQL database.

One may illustrate the correctness for the majority of the formalized patterns using the simulation an a CPN Tool extension. One may focus on the following case studies: message translator, splitter, content enricher, and aggregator. Together, these patterns denote the most frequently used patterns in practice and cover patterns from five out of seven categories discussed herein (excluding "control flow only" and "control flow with transacted resources").

Figure 21:
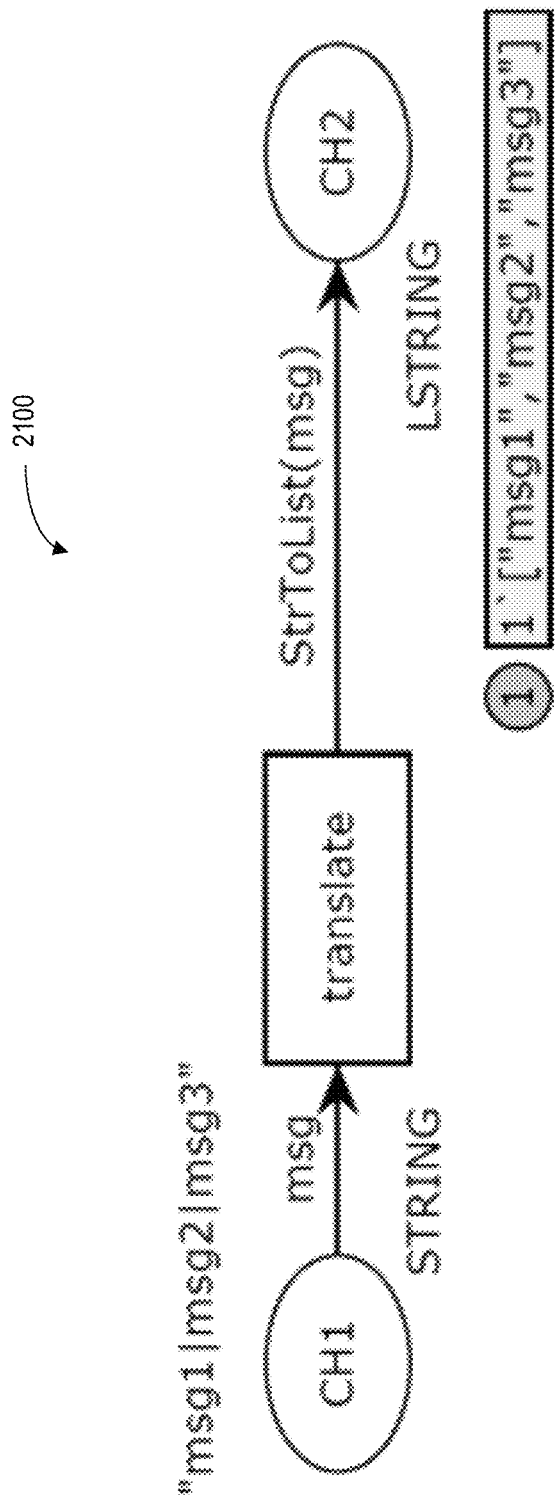
FIG. 21 illustrates a message translator in CPN tools according to some embodiments.

The realization of a variant of the message translator 700 from FIG. 7 is shown 2100 in FIG. 21. Here, as input, the pattern receives a delimiter-separated string and translates it into a list of strings using a special function StrToList defined in CPN Tools. The final marking of the net shows the expected state sexpected=$<J_{exp}, m_{exp}>$ in which the database instance is empty (thus not shown) and the net is having only CH2 marked such that mexp(CH2)={("msg1"), ("msg2"), ("msg3")}.

Figure 22:
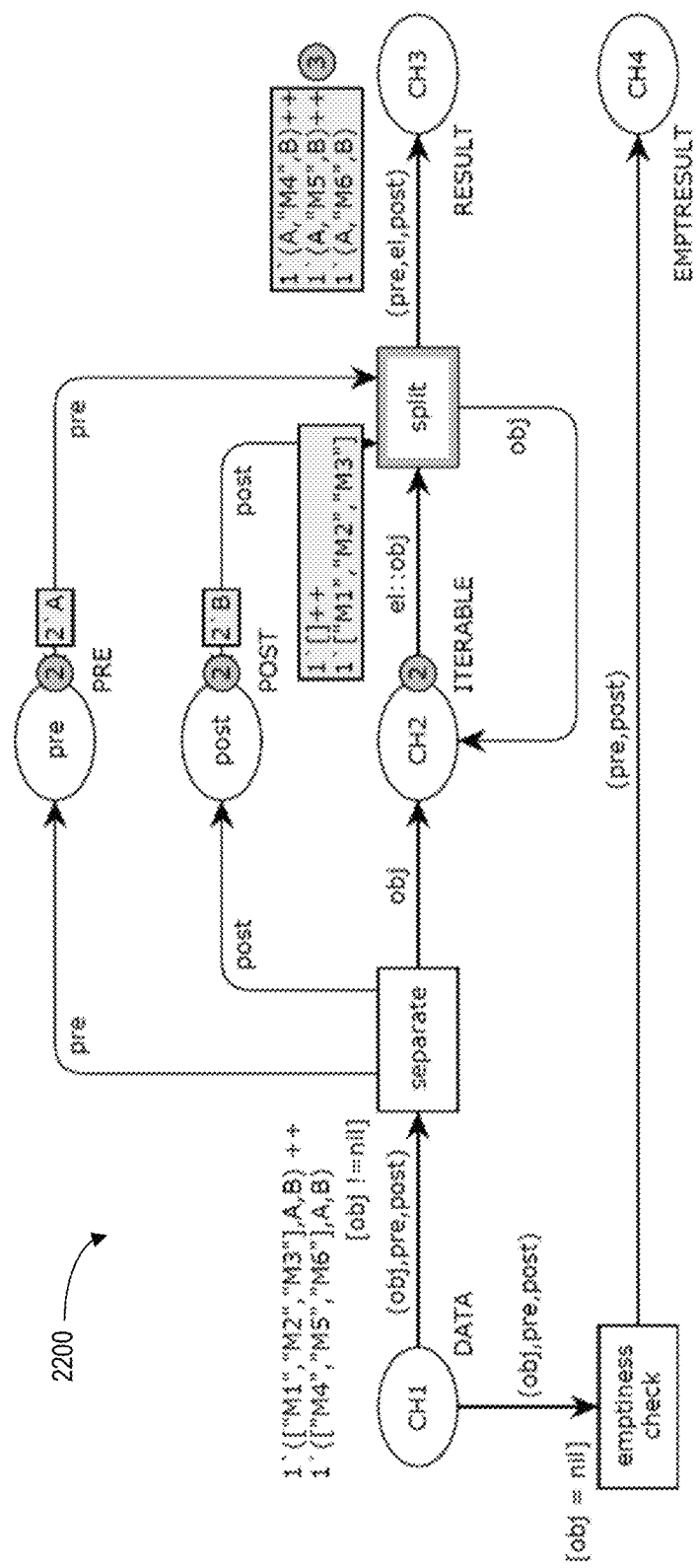
FIG. 22 is a splitter in CPN tools in accordance with some embodiments.

The splitter 800 from FIG. 8 is implemented as shown 2200 in FIG. 22. In this model, there may be two input messages (["M1", "M2", "M3"], A, B) and (["M4", "M5", "M6" ], A, B) consisting of iterable objects of size three each as well as pre and post data values A and B. These two messages are then split into six single objects of a shape (A, "Mi", B), for i∈1, . . . , 6. The partial execution of the splitter 2200 in FIG. 22 demonstrates the second message to be already split (see the three output messages in place CH3), whereas the first message is ready to be split (i.e., the split transition is enabled). Note that the current marking of the net can be already intermediately tested against the expected state $s_{expected}=<J_{exp}, mex_p>$ in which the database instance is empty and the marking is having only CH3 marked such that $m_{exp}$(CH3)=
{(A, "M1", B), (A, "M2", B), (A, "M3", B),
(A, "M4", B), (A, "M5", B), (A, "M6", B)}.

Indeed, it is easy to see that m(CH3)~$m_{exp}$(A, "M1", B), (A, "M2", B), (A, "M3", B), indicating that elements of the second message have been correctly processed, by duly adding pre and post data values. The correctness of the splitter 2200 implementation naturally follows.

Figure 23:
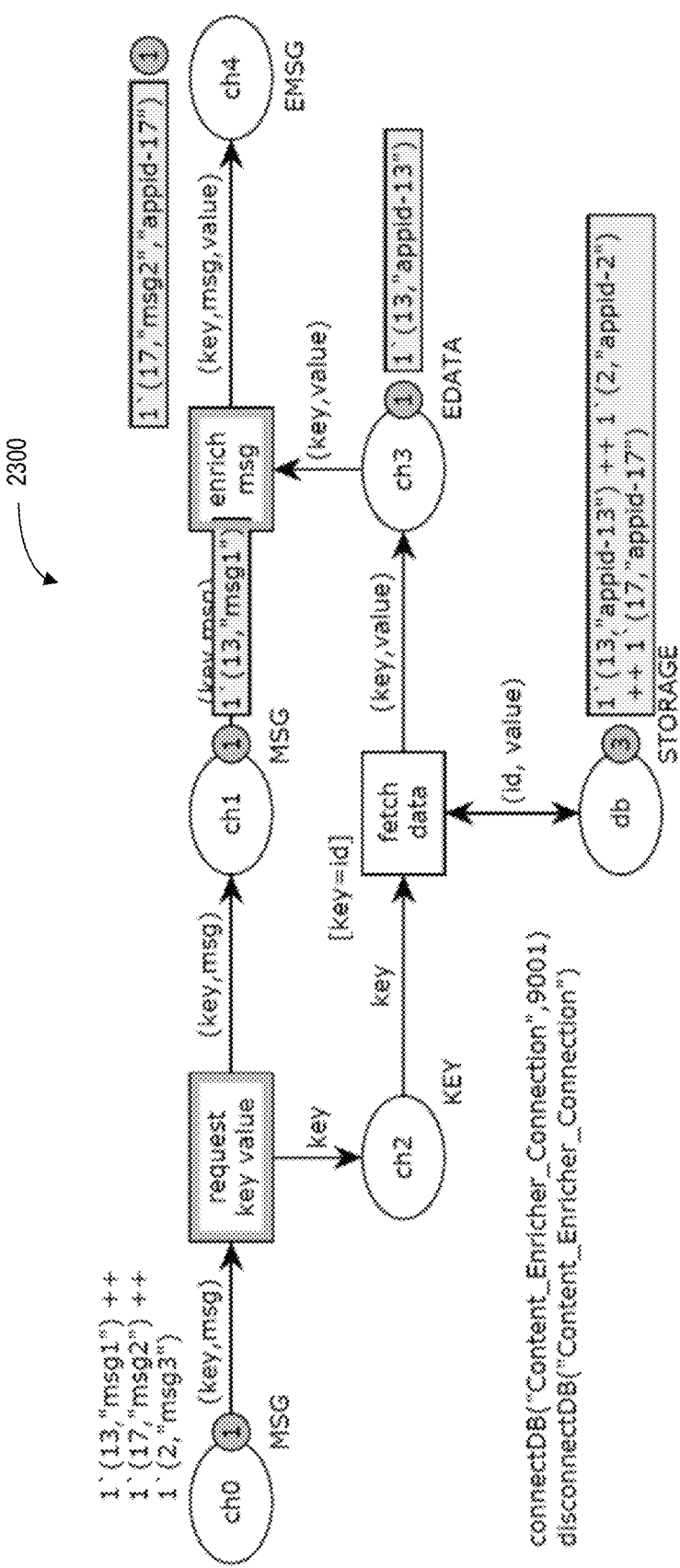
FIG. 23 is a content enricher in CPN tools according to some embodiments.

The content enricher from FIG. 11 can be realized as shown 2300 in FIG. 23. The demonstrated net has three messages (namely, (13, "msg1"), (17, "msg2") and (2, "msg3")) in its initial marking and in its current state has already enriched message msg2 by adding to a corresponding token an extra data value "appid-17" from the storage (see place ch4), that is accessed through the view place called db. The data in db is stored in a shape of key-value pairs which are then matched with messages by their keys (that is, first components of the pairs). One can see that the net is ready to enrich msg1: the enrich msg transition is already enabled and the data from the storage that match the key of the token carrying msg1 had been fetched from db and placed in ch3. While the type of data used in different applications may require to reconfigure the query on the storage as well as to use a different enrichment function, the topology of the net representing the enricher remains the same. To test the correctness, assume an expected state with a partial marking only. Specifically of interest in $m_{exp}$(ch4)=
{(13, "msg1", "appid-13"),
(17, "msg2", "appid-17"),
(2, "msg3", "appid-2")}.

Given that the current net demonstrates the enricher being in its intermediate state and having processed only message one out of three, with its current marking in ch4 note that m(ch4)~$m_{exp}$ \ (13, "msg1", "appid-13"), (2, "msg3", "appid-2"), and thus can conjecture that the given pattern realization works as expected.

Figure 24:
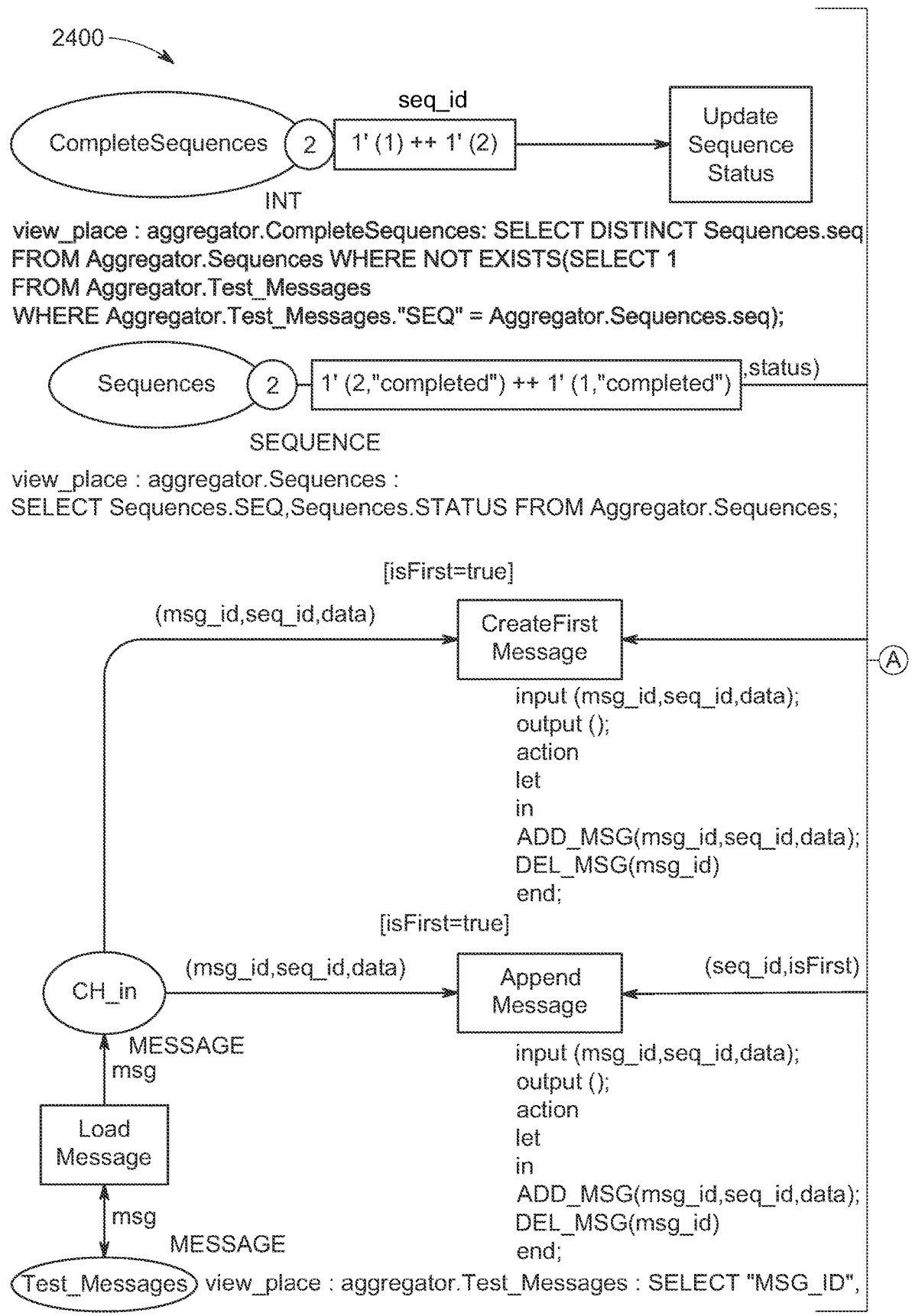
FIG. 24 illustrates an aggregator in CPN tools in accordance with some embodiments.

The aggregator pattern 400 in FIG. 4 can be realized using a CPN Tool extension as it is shown 2400 in FIG. 24. Here, one may neglect the timed completion condition due to the differing temporal semantics in the tool. For the ease of simulation, add a table test)_messages containing four test messages (1, 1, "text-1! !), (2, 2, "text-2!!), (3, 1, "text-3!!), (4, 2, "text-4)", with ids from $\{1, \ldots, 4\}$, two sequences $\{1, 2\}$ and a textual payload. The completion condition is configured to aggregate after two messages of the same sequence and the aggregation function concatenates the message payloads separated by "|". The expected result in the output place CH_out for the first sequence is one message with both payloads aggregated (1, "text-3-text-1").

Now, when establishing a connection to the database and to the CPN Tools extension server, the data from the connected database tables are queried and the net is initialized with the data from the database in place CH_in. Simulate the aggregator realization 2400 in FIG. 24 for the two test sequences, until one sequence is complete. The intermediate marking in m(CH_out)~$m_{exp}$ \{("text-4"|"text-2")\}, for $m_{exp}$(CH_out)=\{("text-3"|"text-1"), ("text-4"|"text-2")\}, will eventually result to the expected outcome in CH_out and the database.

Figure 25:
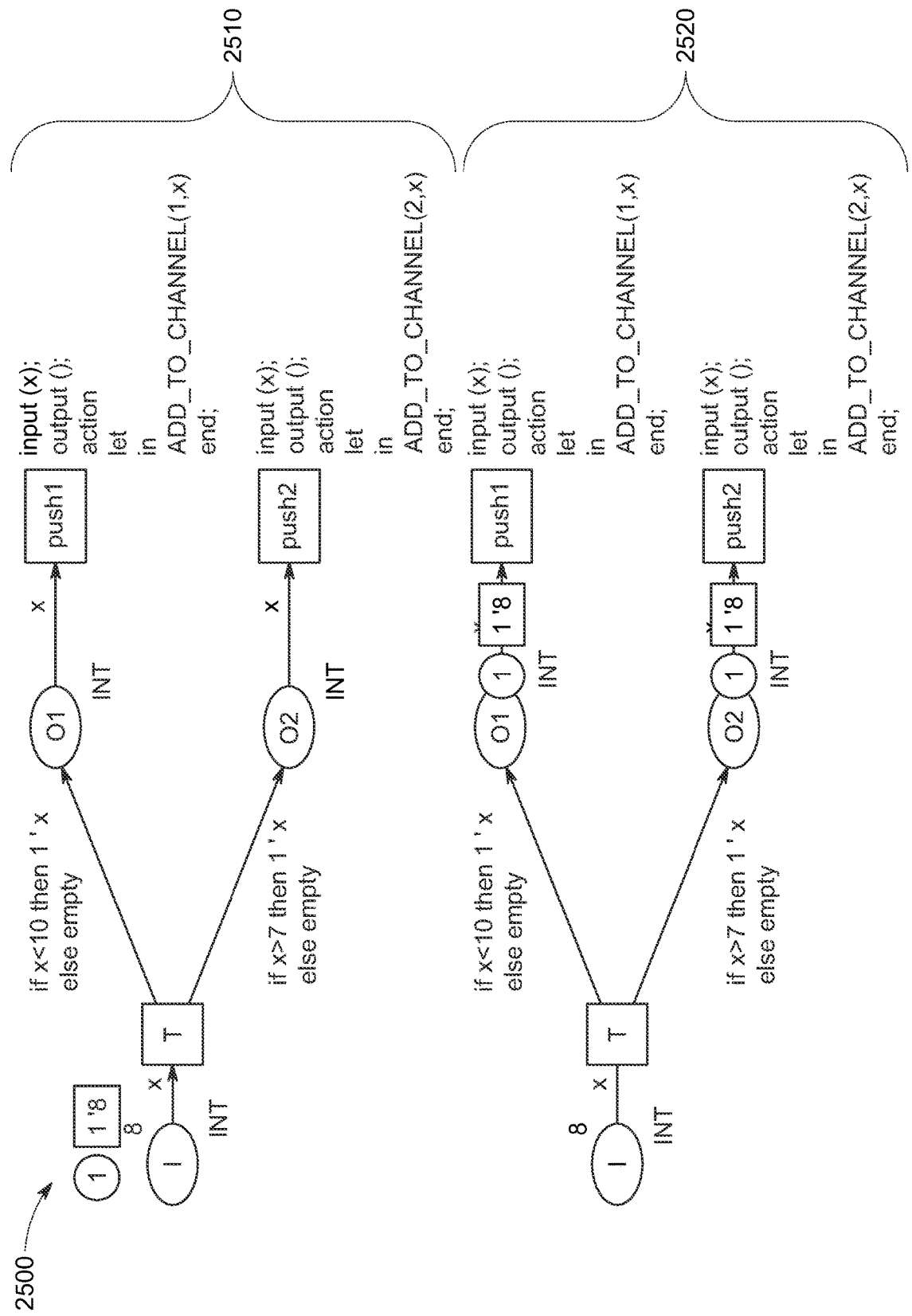
FIG. 25 illustrates examples where transition T is enabled and messages are duplicated according to conditions of arc inspection according to some embodiments.

While the previously discussed pattern implementations are correct, one may add a flawed implementation of a content-based router, which is not required for the subsequent case studies, so as to demonstrate how the simulation could be used to detect an erroneous design. A content-based router, is a pattern that takes one input message and passes it to exactly one receiver without changing its content. This is done by evaluating a condition per recipient on the content of the message. FIG. 25 shows 2500 one 2510 out of many router implementations, which may look correct, but, however, its process layer violates the correct design.

Figure 26:
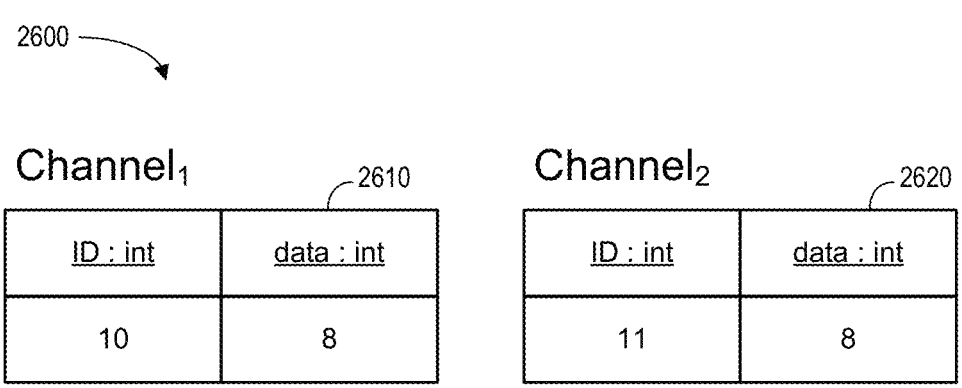
FIG. 26 illustrates a database instance after a flawed content-based router PN was executed "successfully" in accordance with some embodiments.

For the evaluation, use the aforementioned method for "data and (transacted) resource-bound patterns," which is based on the reachability of a correct database state. Such a correct state would be a database instance with one entry in table Channel$_1$ and an empty table Channel$_2$. This should happen due to the fact that the logical expressions on the arcs outgoing from T are expected to be disjoint. Now, explore the inner workings of the flawed pattern realization. In 2510, transition T reads the token in place I and then conditionally inserts it to the two subsequent places. Since the value of the token matches all conditions, both output places O$_1$ and O$_2$ receive a copy of the token as it is shown in 2520. In terms of application integration, this could mean that two companies receive a payment request or a sales order that was actually meant for only one of them. In the net, the two subsequent transitions push$_1$ and push$_2$ are enabled and fire by executing the database inserts defined in the ADD_TO_CHANNEL(i, x) function, where i is an index of one of the Channel tables and x is a data value to be inserted. From the net alone (i.e., in the initial state in 2510), the pattern realization seems to be correct. However, after its execution, one can see that no correct state has been reached. Indeed, after the tokens have been processed on the control layer, the database instance contains two entries (as shown 2600 in FIG. 26), one in each table 2610, 2620, that, in turn, would mean that the logical expressions that are meant to guard two different outputs are not disjoint, and by executing T the system populated both O$_1$ and O$_2$ (instead of generating a token in only one of them).

Note that, when assuming one input token in I and a precedence of push1 over push2, and considering that $I_{exp}$=\{channel$_1$(8), the final database instance I(Channel$_1$) comes out to be as expected (that is, I(Channel$_1$)~I(Channel$_1$)$_{exp}$), whereas I(Channel$_2$)≁Iexp(Channel$_2$). It is easy to see that knowing the control-flow and data aspects a given timed eip-net allows for detecting flaws in a pattern realizations as well as provide richer information for fixing them.

In conclusion: (5) The CPN Tools extension allows for EIP simulation and correctness testing; and (6) model checking implementations beyond correctness testing are desirable.

Figure 27:
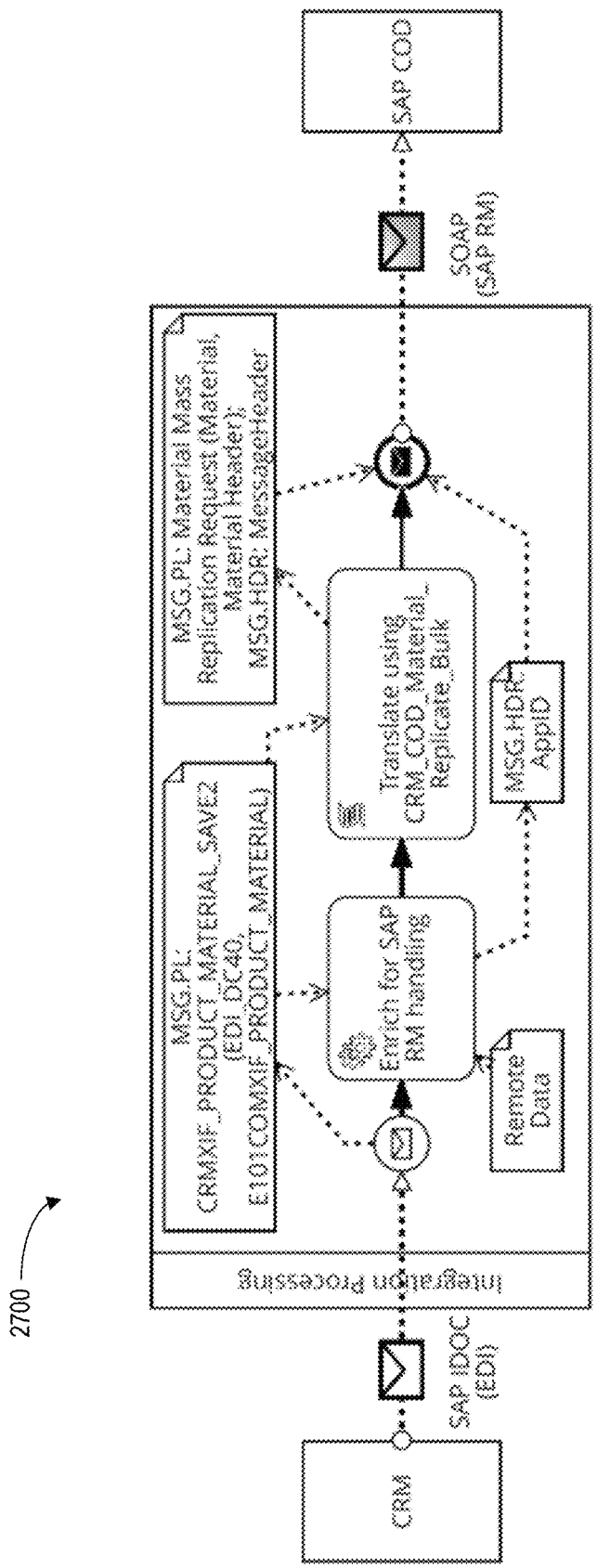
FIG. 27 illustrates hybrid cloud replicate material from a business suite according to some embodiments.

The single patterns can be composed to represent integration scenarios, for which one may study the formalism with respect to its applicability to two scenarios from the analysis: one hybrid On Premises to Cloud ("OP2C" and one Device to Cloud ("D2C") scenario. Many organizations have started to connect their on-premise applications such as Customer Relationship Management ("CRM") systems with cloud applications using integration processes similar to the one shown 2700 in FIG. 27. A CRM Material is sent from the CRM system via EDI (e.g., an IDOC transport protocol) to an integration process running on a cloud platform integration. The integration process enriches the message header (MSG.HDR) with additional information based on a document number for reliable messaging (i.e., AppID), which allows redelivery of the message in an exactly-once service quality. The IDOC structure is then mapped to the COD service description and sent to the COD receiver.

Figure 28:
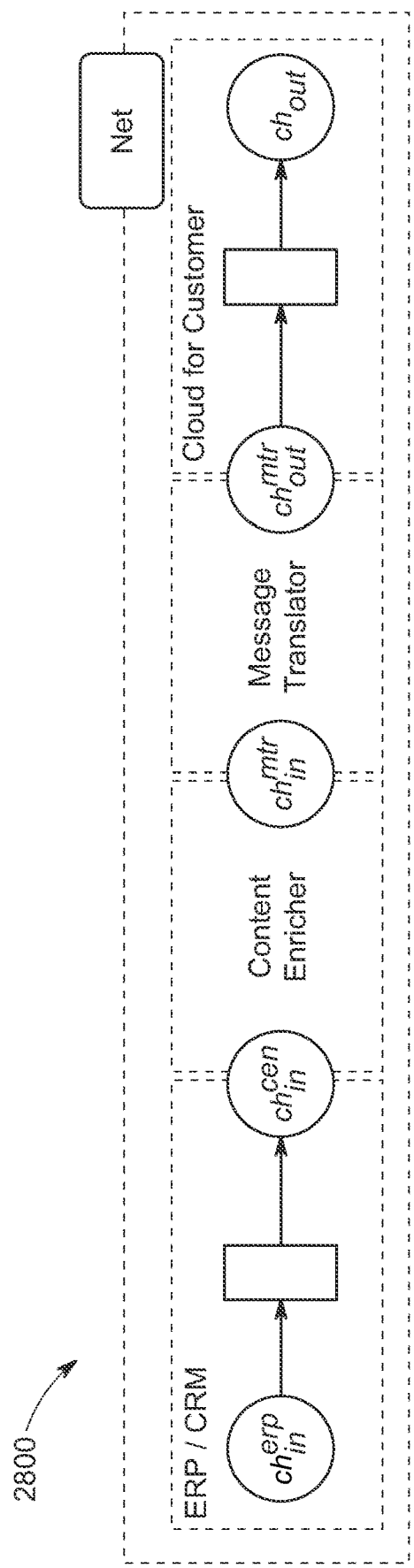
FIG. 28 illustrates a replicated scenario translated into a timed eip-net representation in accordance with some embodiments.

One may manually encode a Business Process Model and Notation ("BPMN") scenario into a timed eip-net as shown 2800 in FIG. 28. Since the obtained timed eip-net is mainly a composition of two patterns, namely the content enricher 1100 of FIG. 11 and the message translator 700 of FIG. 7, one may just represent an abstract net topology, indicating with places connecting input and output channels of the patterns and leaving nets representing patterns as white boxes. The database schema together with queries from the data logic layer are omitted since they are identical to those used for the content enricher 1100. Note that, while the message translator 700 is close to a currently existing CPN solution, the content enricher 1100 (including the need of querying the persistent storage) should be represented in timed eip-nets. Consequently, the enricher is a pattern not covered before, for which neither soundness nor correctness could be checked. It is also noteworthy that, given that hybrid integration usually denotes data movement between on-premise and cloud applications, which do not require complex integration logic, the timed eip-net representation for such rather straightforward hybrid integration scenarios gives richer insight into the data stored in the database as well as their manipulation (as opposed to, for example, BPMN), while the models remain still intuitively understandable.

Figure 29:
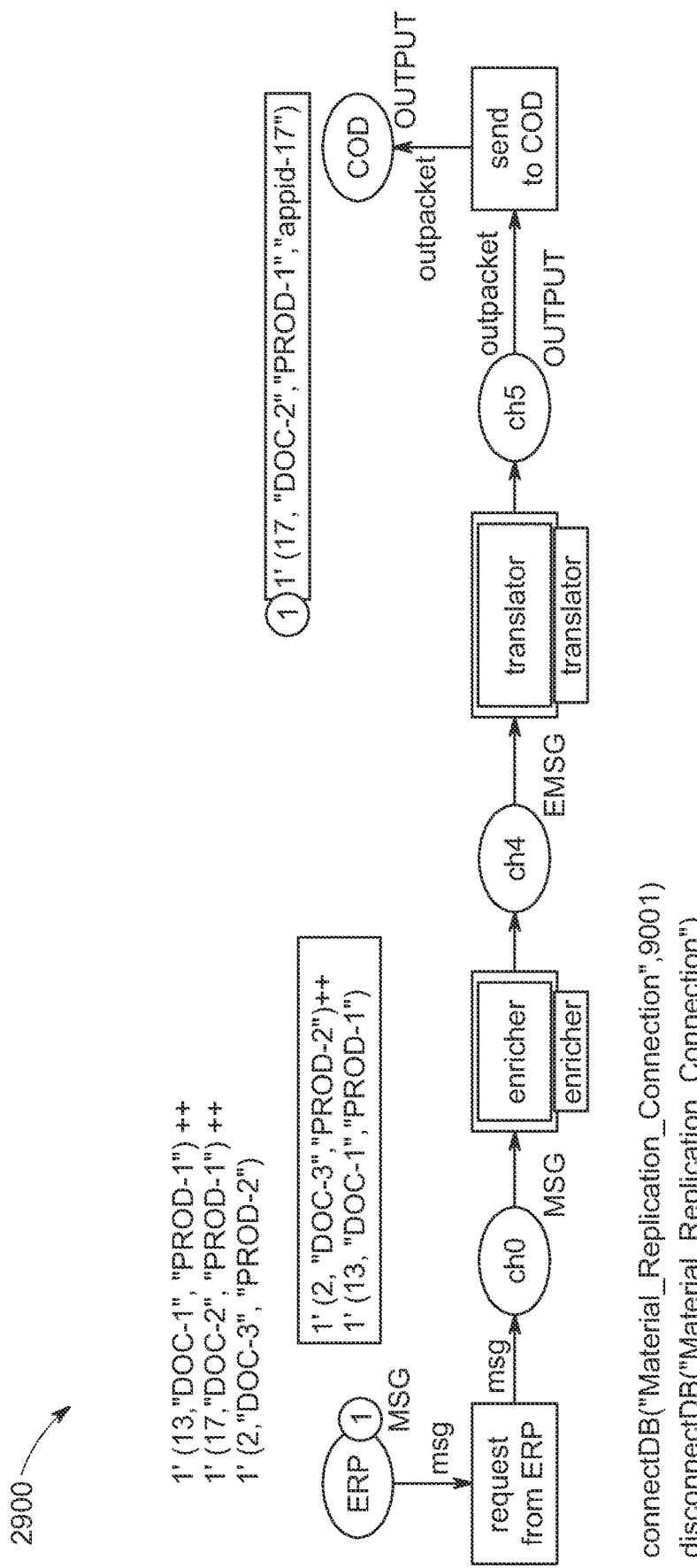
FIG. 29 illustrates a pattern composition for a replicate scenario as a hierarchical net in CPN tools according to some embodiments.

The replicate material scenario in a timed eip-net as shown in FIG. 28 is implemented 2900 as hierarchical net with a CPN Tools extension in FIG. 29, which references the pattern implementations of the enricher 2300 from FIG. 23 and translator 2100 from FIG. 21, annotated with enricher and translator, respectively. In the hierarchical model representing this scenario, the MSG message from the ERP system is enriched with master data. The derived enriched message of type EMSG is then sent to the translator that maps the intermediate message format to the one understood by the COD system, thus generating a new message of type OUTPUT. Note that here the arc inscriptions abstractly account for messages without revealing their concrete structure.

In order to check the correctness of the given scenario, one has to keep in mind that, in general, the composition of the single patterns in timed eip-nets requires a careful, manual alignment of the "shared" control places (e.g., ch0, ch4 and ch5) with respect to the exchanged data and the characteristics of the neighboring patterns. Thus, embodiments may be required to carefully consider various pattern characteristics together with input and output message types to ensure its correctness. Assume that that the expected marking in out case is $m_{exp}(COD)=$ {(13, "DOC-1", "PROD-1", "appid-13"),
(17, "DOC-2", "PROD-1", "appid-17"),
(2, "DOC-3", "PROD-2", "appid-2")}.

Then, given the intermediate marking in COD, one can see that $m(COD) \sim m_{exp} \backslash \{(13, "DOC-1", "PROD-1", "appid-13")\}$ (2, "DOC-3", "PROD-2", "appid-2") and thus conjecture that the scenario is correct. Note that, while the composition in FIG. 29 denotes a correct implementation of the replicate material scenario, the general question of composition correctness remains open.

Conclusions: (7) timed eip-net representations allow for an understandable, sound and comprehensive representation of single patterns and their compositions; and (8) the correctness of the compositions requires further considerations.

Now consider, an Internet of Things ("IoT"): Predictive Maintenance and Service ("PDMS") scenario. In the context of digital transformation, an automated maintenance of industrial machinery is imperative and requires the communication between the machines, the machine controller and ERP systems that orchestrate maintenance and service tasks. Integrated maintenance is realized by one of the analyzed D2C scenarios, which helps to avoid production outages and to track the maintenance progress. Thereby, notifications are usually issued in a PDMS solution as shown 3000 in FIG. 30 from a cloud platform, represented in BPMN.

Although one may simplify the scenario, the relevant aspects are preserved. Industrial manufacturing machines, denoted by Machine, measure their own states and observe their environment with sensors in a high frequency. When they detect an unexpected situation (e.g., parameter crosses threshold), they send an incident to a local endpoint (e.g., IoT edge system), the PDMS, indicating that a follow-on action is required. The PDMS system creates alerts for the different machines and forwards them to a mediator, connecting the PDMS to the ERP system. To throttle the possibly high frequent alerts, several incidents are collected (not shown) and sent as list of alerts. Before the ERP notification can be created, additional data from the machines are queried based on the split and single alerts, and then enriched with information that adds the feature type. The information of the single alerts is used to predict the impact by value and machine type, and then gets aggregated to be sent to ERP. In case the notification has been created successfully in ERP, the PDMS gets notified including the service task identifier and thus stops sending the alert (not shown).

Figure 30:
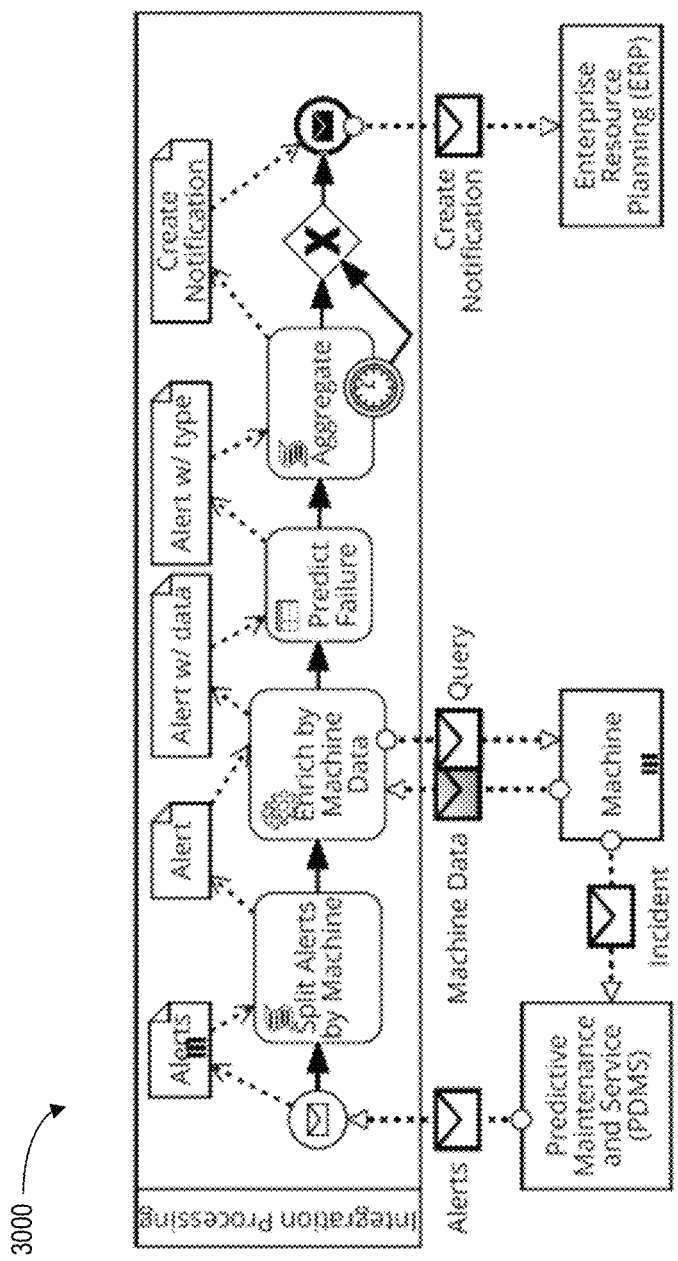
FIG. 30 illustrates private maintenance in accordance with some embodiments.
Figure 31:
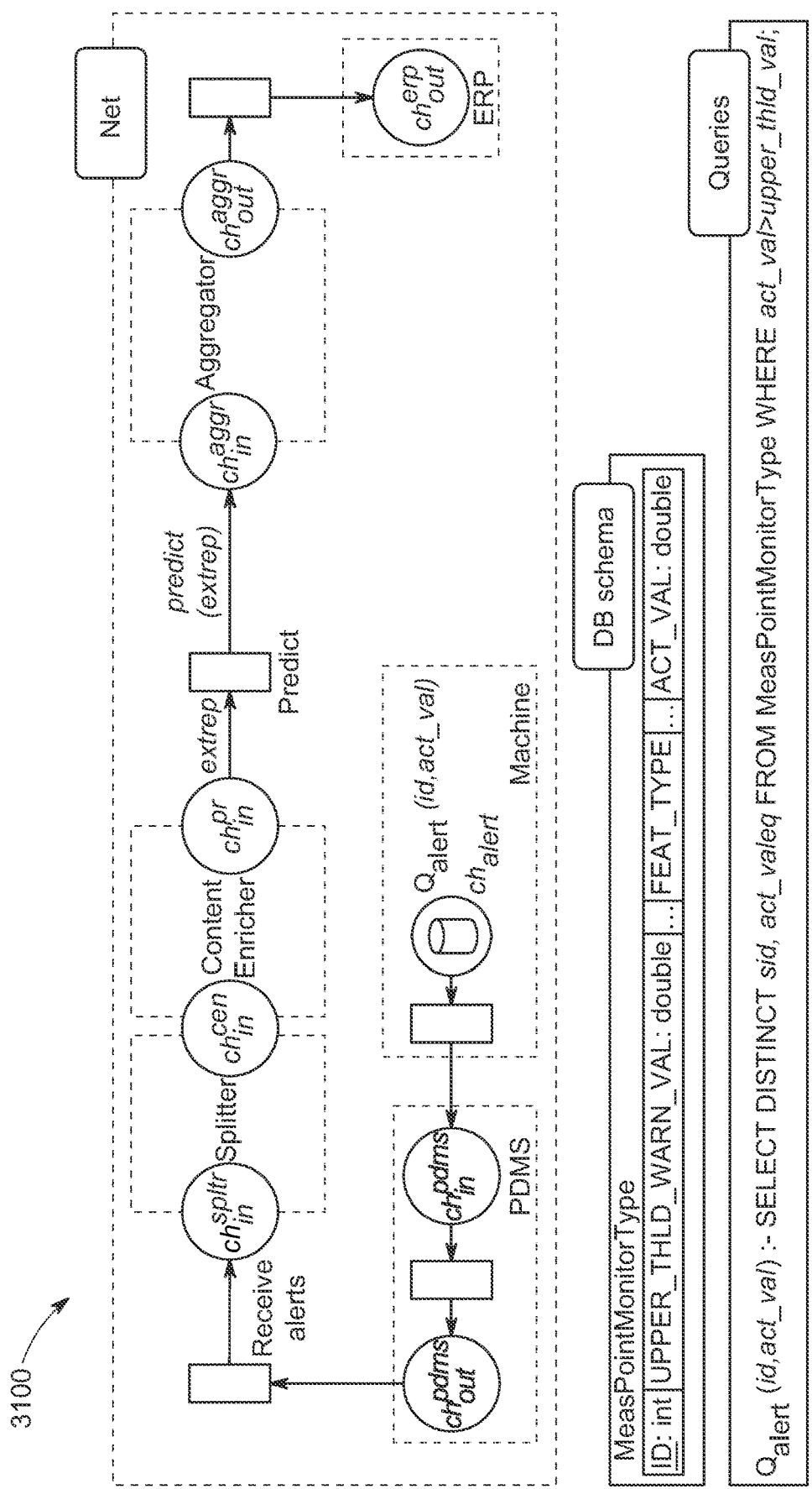
FIG. 31 illustrates a create notification scenario translated into a timed eip-net representation according to some embodiments.

The BPMN scenario from FIG. 30 has been manually translated into a (schematically represented) timed eip-net 3100 in FIG. 31. Since the scenario mainly relies on the patterns previously discussed in the paper, their explicit representation is omitted and replaced instead white boxes (surrounded with input and output channel places of such patterns to indicate the connection points between them). In this way, one may hide the splitter 800 (FIG. 8), content enricher 1100 (FIG. 11) and aggregator 400 (FIG. 4) proviso that that the queries defined on top of the persistent storage are changed according to the database schema adopted in this scenario. Namely, the content enricher 1100 will need to query machine states in order to get data (more precisely, additional information about feature types) for enriching the messages, whereas the aggregator 400 will deal with sequences based on the machine identifiers and as the result will produce messages of concatenated machine names. Embodiments may reveal the only query, namely $Q_{alert}$, that is used to create alerts in the PDMS system and populates the view place it is assigned to ($ch_{alert}$) with pairs containing device identifiers (ID) and corresponding critical values (ACT_VAL). One may also also add a part representing the predictor pattern. With transition predict, the system consumes messages (extrep) produced by the enricher and generate new ones together with the prediction by calling a function predict.

Figure 32:
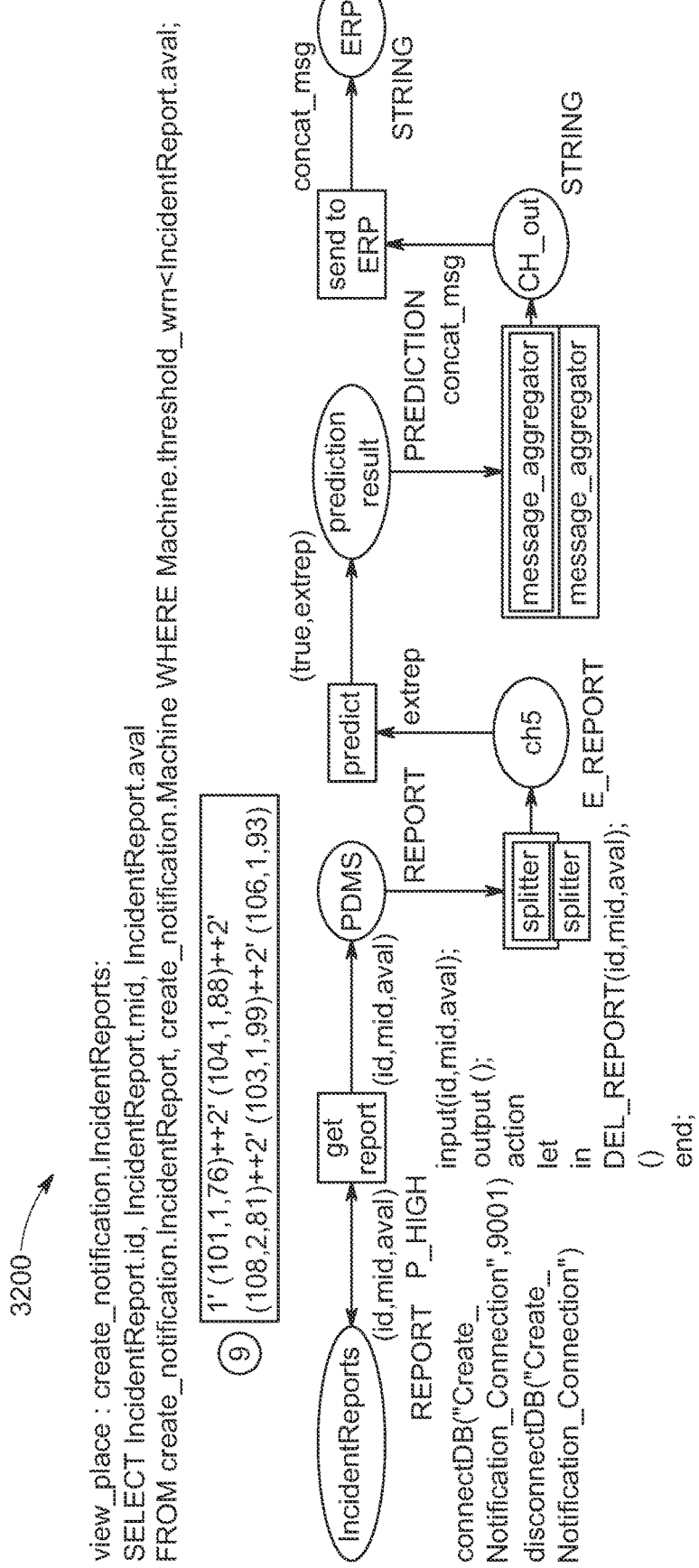
FIG. 32 illustrates a create notification pattern (initial state) in accordance with some embodiments.
Figure 33:
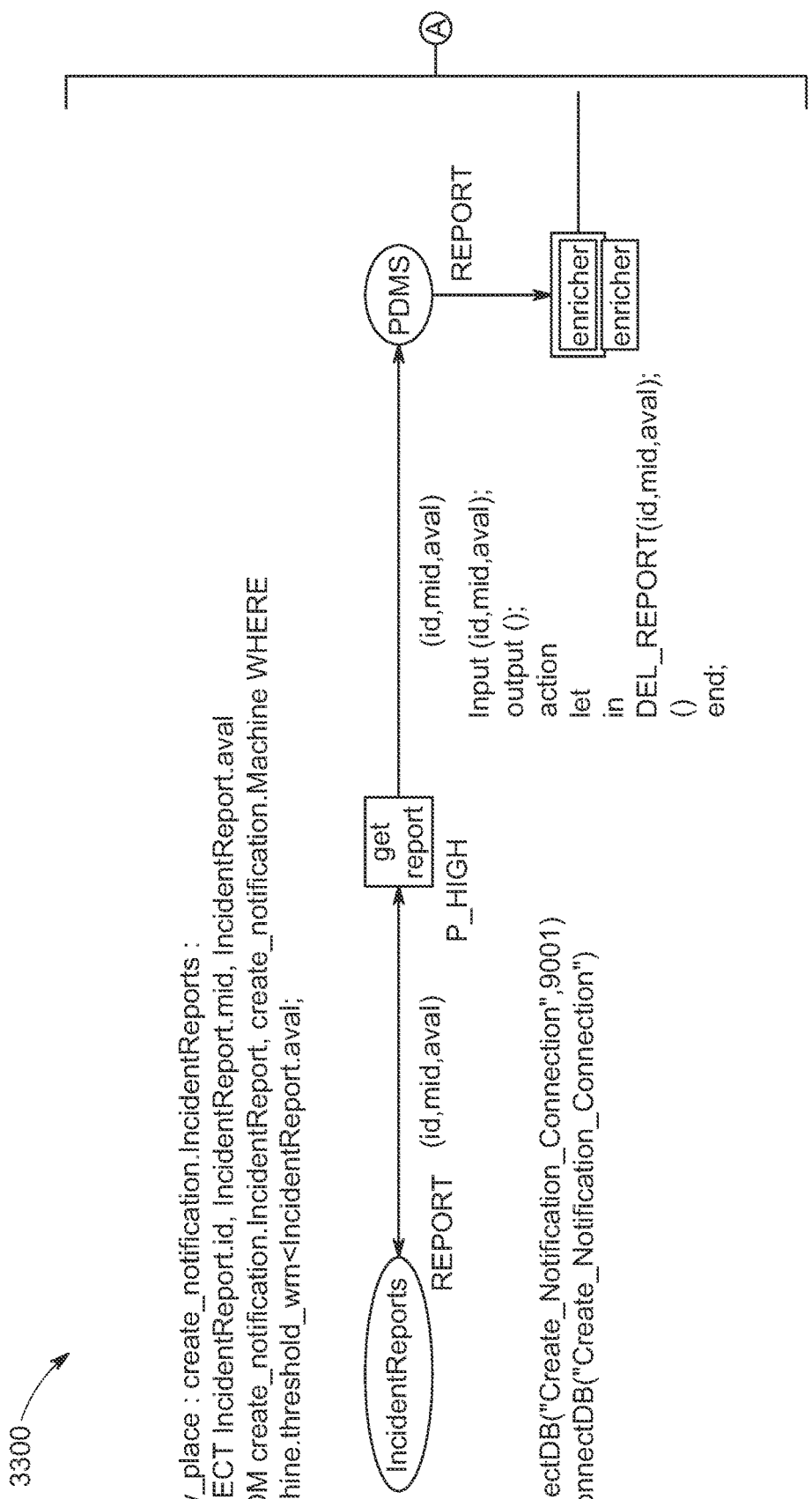
FIG. 33 illustrates a create notification pattern (final state) according to some embodiments.

The predictive maintenance scenario in timed eip-nets (FIG. 30) is implemented as hierarchical net 3300 with a CPN Tools extension in FIG. 33, which references the pattern implementations of the enricher 2300 from FIG. 23 and translator 2400 from FIG. 24, annotated with enricher, aggregator, respectively. In the original scenario, the PDMS sends lists of incidents to the integration system to reduce the number of requests as shown 3200 in FIG. 32. The incidents have an incident ID, a machine ID, and the actual critical incident value (e.g., (101, 1, 76)). Unfortunately, due to the fact that CPN Tools does not support third party extensions with complex data types like lists, it was decided to make the PDMS component emit single messages using the get report transition together with its outgoing place PDMS (see FIG. 32). Consequently, the splitter is not required for separating the single incidents, but the incident messages of type REPORT are immediately enriched by the enricher. After master data has been added to the message, a new one of type E REPORT has been produced. The net then immediately proceeds with predicting the impact using transition predict, which usually assesses the probability of a timely machine error based on previous experiences with the particular machine type. Here, for simplicity, the prediction is always set to true and the results are placed into prediction result. Tokens in this place are then used to aggregate several incidents by machine, where, for simplicity, one may use machine identifiers to identify aggregator's sequences. The aggregated incident messages are then sent to the ERP system. With the final marking in m(ERP) and $m_{exp}(ERP)=\{$"Assembly Robot", "Engine Robot"|"Engine Robot"|"Engine Robot"$\}$, for the three incidents from machine Engine Robot and one from Assembly Robot, one can see that $m(ERP) \sim m_{exp}$ and thus conjecture that the scenario is correct.

Although the resulting timed eip-net provides so far unmatched insights into the different aspects of integration scenarios, the complexity of the composed patterns increased even when using hierarchical nets.

Conclusions: (9) timed eip-net representations allow for an explicit modeling of all data aspects in complex data-aware scenarios (e.g., roll-back, queries); and (10) the formalism's technical complexity might prevent non-technical users from using it on a regular basis.

With the timed eip-net formalization, it is possible to model and reason about EAI requirements like data, transacted resources and time (conclusions (1), (5)), going beyond the simple hybrid integration scenarios (conclusion (3)). Thereby the pattern realizations are self-contained, can be composed into complex integration scenarios (e.g., FIG. 31; conclusion (7)) and analyzed (conclusions (4)), while leaving the extension of the tool prototype to model checking as well as a formal treatment of pattern compositions as future work (conclusions (6), (8), respectively). The composition is facilitated through "sharing" control places, preventing unwanted side-effects between patterns (however, there are some limitations). PN classes considered in this work fall short when it comes to generation of places, transitions or arcs (conclusion (2)). For example, dynamic router requires a proper representation of dynamically added or removed channels. Further, the deep insights into data-aware patterns and scenarios lead to the trade-off between sufficient information and model complexity (conclusion (9)). The complexity of PN models compared to their BPMN counterparts in FIG. 30 might not allow for modeling by non-technical users (conclusion (10)). Hence, one may propose modeling in a less technical modeling notation, which can be then encoded into PN models, e.g., for verification. Further, while the PN formalism closes the conceptual vs. implementation gap by simulation, a translation of existing EIP implementations to timed eip-nets for verification may be left as future work.

In summary, timed eip-nets allow one to represent patterns not covered before (e.g., the stateful aggregator with a timeout or the content enricher with external resources) and check their soundness and correctness. Note that for more complex scenarios, the timed eip-net representation might become very complex, e.g., compared to a BPMN representation, and thus might be more suitable as formalism and not as modeling language for the average user (e.g., integration developer).

Thus, embodiments may provide the formal underpinning for responsible EAI along research questions Q1 through Q4. Responsible EAI means to ground EIPs as basic building blocks on a formalization that meets relevant EAI requirements with respect to control flow, data, time, and transactional properties (Q1). Q1 could be sufficiently addressed by a thorough analysis of EAI requirements in comparison with existing formalisms and the development of the timed eip-net formalism that adds the crucial, yet missing time requirement to existing formalism of eip-nets. Moreover, the formalism is supposed to be equipped with full execution semantics which was achieved for timed eip-net (Q2). With this, the formalization and execution of EIPs becomes possible. In order to bridge the EIP formalization to EIP realizations, an instructive catalog of realizations of EIPs as timed eip-net may be provided (Q3). With the verification results and the possibility of correctness testing based on execution traces validation of EIPs realizations is enabled (Q4). This is complemented with the possibility to simulate EIP realizations through a prototypical implementation (Q4).

Embodiments may focus on the formalization and realization of EIPs in an isolated manner. EAI solutions, however, often require the composition of EIPs. Such EIP composition necessitate formal treatment as well. Putting the responsible design of EIPs at stake through their informal compositions is counterproductive. Hence, embodiments may also address the formalization and realization of EIP compositions in interplay with the formalization and realization of EIPs.

In this way, embodiments may provide for the responsible development of integration solution that requires an approach for a process or programming model, which in some embodiments are solved in three steps: pattern formalization, pattern implementation, and pattern correctness.

While the process may be a necessary solution itself, embodiments also propose a solution for the process steps. First, collect and classify the requirements for a formalization. Then show how to specify such a formalism on top of a well-known Petri net approach, while not limiting our contribution to it. Finally, give well-defined execution semantics for the known integration patterns (shown for representatives from each pattern requirement category). The applicability of embodiments is shown for verification, validation, and simulation. It is not only comprehensive in terms of integration pattern coverage, but also widely applicable to real-world integration solutions. This is illustrated by a running prototype of the approach.

Figure 34:
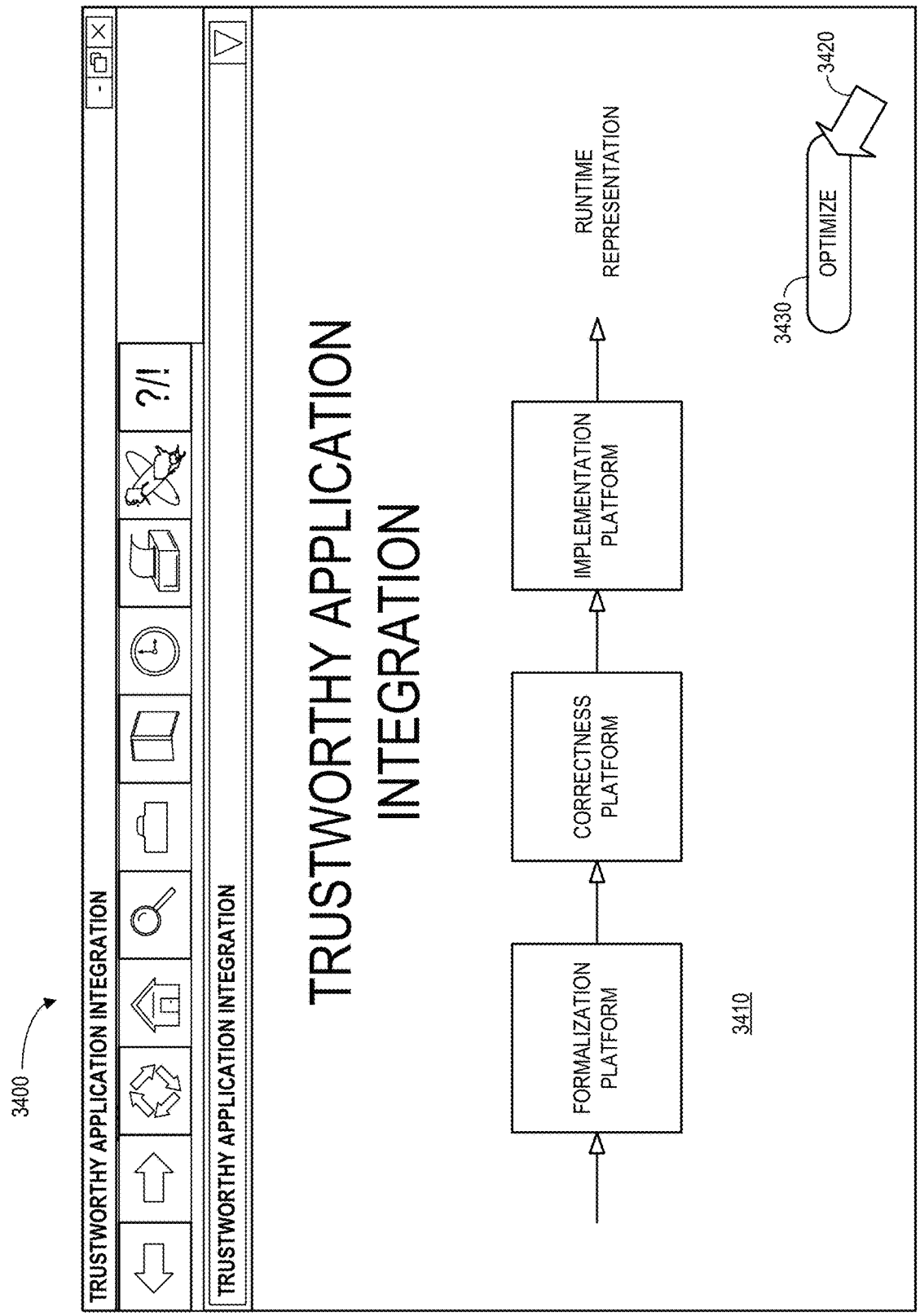
FIG. 34 is a human machine interface display according to some embodiments.

FIG. 34 is a human machine interface display 3400 in accordance with some embodiments. The display 3400 includes a graphical representation 3410 of a trustworthy application integration system in accordance with any of the embodiments described herein. Selection of an element on the display 3400 (e.g., via a touchscreen or a computer pointer 3420) may result in display of a pop-up window containing more detailed information about that element and/or various options (e.g., to add adjust optimization strategies, select formalization parameters, etc.). Selection of an "Optimize" icon 3430 may also let an operator or administrator initiate or finalize operation of the application integration system.

Figure 35:
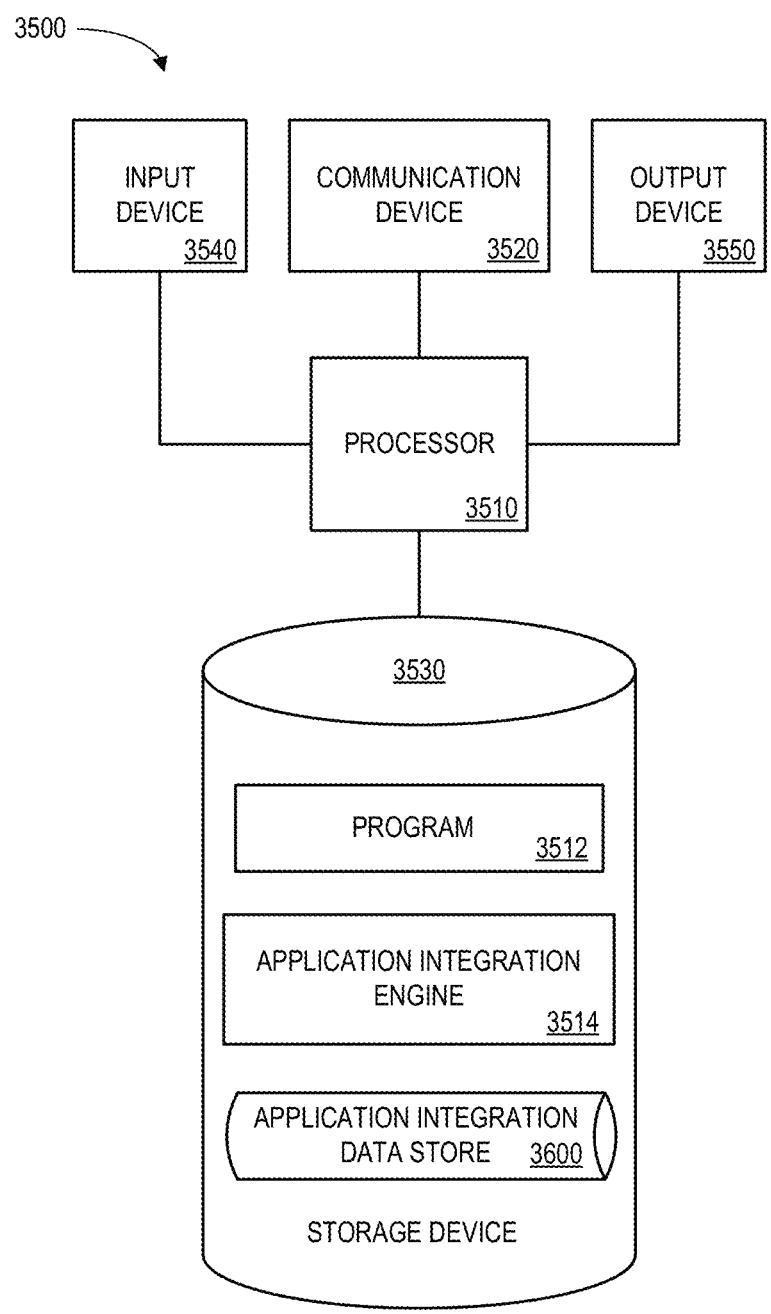
FIG. 35 is an apparatus or platform according to some embodiments.

Note that the embodiments described herein may be implemented using any number of different hardware configurations. For example, FIG. 35 is a block diagram of an apparatus or platform 3500 that may be, for example, associated with the system 200 of FIG. 2 (and/or any other system described herein). The platform 3500 comprises a processor 3510, such as one or more commercially available Central Processing Units ("CPUs") in the form of one-chip microprocessors, coupled to a communication device 3520 configured to communicate via a communication network (not shown in FIG. 35). The communication device 3520 may be used to communicate, for example, with one or more remote designer platforms, administrator platforms, etc. The platform 3500 further includes an input device 3540 (e.g., a computer mouse and/or keyboard to input formalization and optimization information) and/an output device 3550 (e.g., a computer monitor to render a display, transmit optimization recommendations, and/or create reports about application integration, benchmark results, etc.). According to some embodiments, a mobile device, monitoring physical system, and/or PC may be used to exchange information with the platform 3500.

The processor 3510 also communicates with a storage device 3530. The storage device 3530 may comprise any appropriate information storage device, including combinations of magnetic storage devices (e.g., a hard disk drive), optical storage devices, mobile telephones, and/or semiconductor memory devices. The storage device 3530 stores a program 3512 and/or an application integration engine 3514 for controlling the processor 3510. The processor 3510 performs instructions of the programs 3512, 3514, and thereby operates in accordance with any of the embodiments described herein. For example, the processor 3510 might be associated with a formalization platform and facilitate definition of pattern requirements by an integration developer (and formalize singles pattern compositions to compose single patterns to template-based formalized compositions). The processor 3510 might also be associated with a correctness platform that checks for structural correctness of the formalized compositions and executes a semantic transformation or binding to pattern characteristics and associated interactions. Such a processor 3510 may also check composition semantics and generate a formal model. In some embodiments, the processor 3510 is associated with an implementation platform that translates the formal model generated by the correctness platform and configures implementation parameters of the translated formal model. In this case, the processor 3510 may then execute the translated formal model in accordance with the configured implementation parameters.

The programs 3512, 3514 may be stored in a compressed, uncompiled and/or encrypted format. The programs 3512, 3514 may furthermore include other program elements, such as an operating system, clipboard application, a database management system, and/or device drivers used by the processor 3510 to interface with peripheral devices.

As used herein, information may be "received" by or "transmitted" to, for example: (i) the platform 3500 from another device; or (ii) a software application or module within the platform 3500 from another software application, module, or any other source.

In some embodiments (such as the one shown in FIG. 35), the storage device 3530 further stores an application integration data store 3600. An example of a database that may be used in connection with the platform 3500 will now be described in detail with respect to FIG. 36. Note that the database described herein is only one example, and additional and/or different information may be stored therein. Moreover, various databases might be split or combined in accordance with any of the embodiments described herein.

Referring to FIG. 36, a table is shown that represents the application integration data store 3600 that may be stored at the platform 3500 according to some embodiments. The table may include, for example, entries associated with an application implemented via a cloud computing environment. The table may also define fields 3602, 3604, 3606, 3608, 3610 for each of the entries. The fields 3602, 3604, 3606, 3608, 3610 may, according to some embodiments, specify: an IPCG identifier 3602, data specifications 3604, runtime benchmarks 3606, optimizations 3608, and a status 3610. The application integration data store 3600 might be created and updated, for example, a designer creates a new system, additional application integrations are modified or deployed, etc.

The IPCG identifier 3602 might be a unique alphanumeric label that is associated with a contract graph and/or integration designer in accordance with any of the embodiments described herein. The data specifications 3604 might define source materials used to create the contract graph (e.g., schema, mapping, configuration data, etc.). The runtime benchmarks 3606 might include measurements that might be used to improve contract graphs (e.g., latency, throughput, etc.). The optimizations 3608 might indicate one or more types of strategies that were used to improve the contract graph. The status 3610 might include the current state of the contract graph (e.g., in process, halted, completed on a certain date and/or time, etc.).

Thus, embodiments may provide trustworthy application integration in a secure, automatic, and efficient manner. Some embodiments may provide a responsible pattern formalization process (for the responsible development of integration patterns) and formalism for defining integration pattern semantics (first description of a suitable formalism for integration patterns that should also be applicable to other domains like workflows, data or machine learning pipelines, etc.). Some embodiments may also provide a concrete definition of application integration semantics that are formally verifiable (e.g., model checking) and can be seamlessly validated (e.g., through simulation). Together these contributions allow for a responsible development of integration solutions and give formally verifiable execution semantics.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 37:
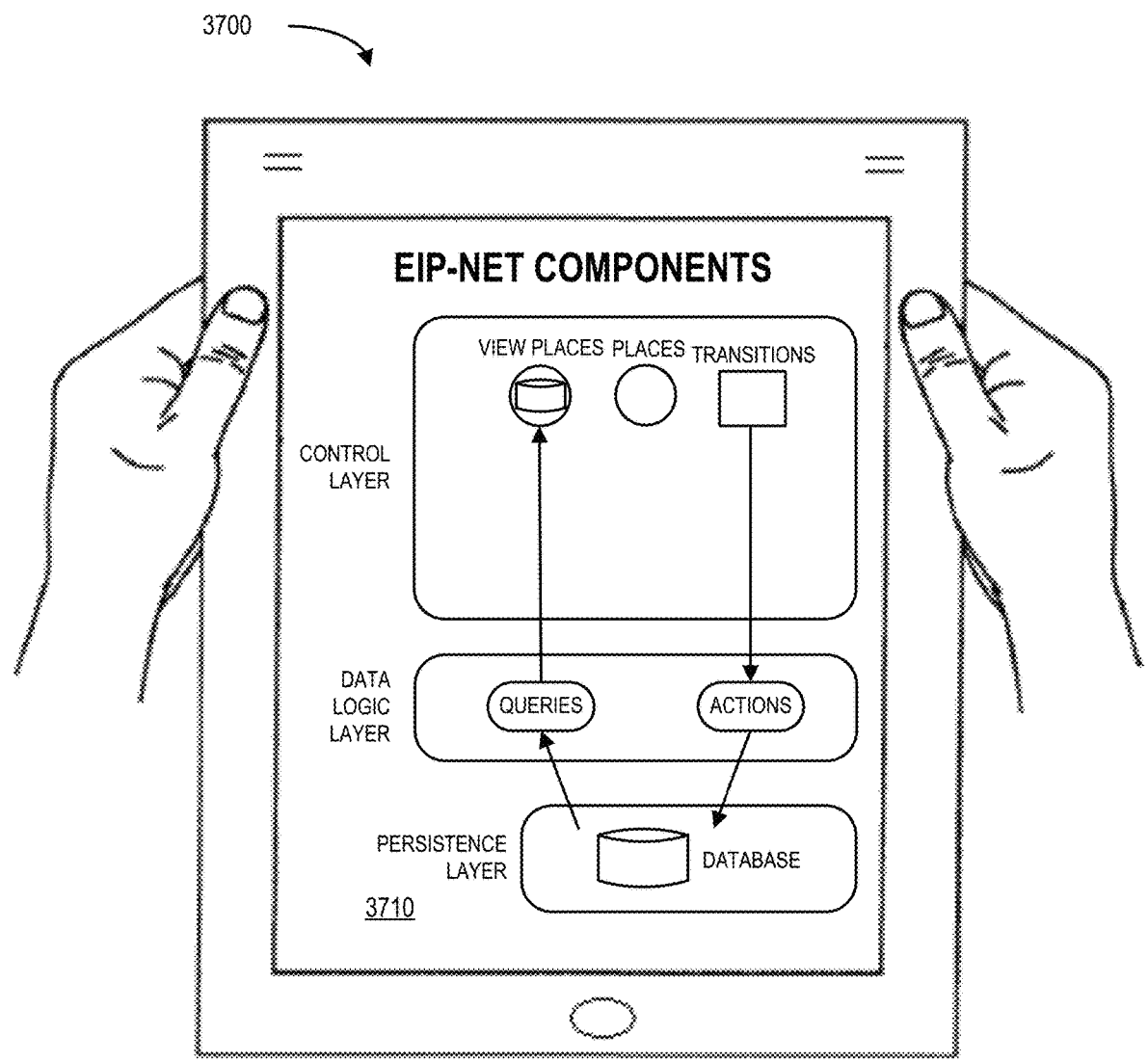
FIG. 37 is a tablet computer providing a trustworthy application integration display according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of application integrations and microservices, any of the embodiments described herein could be applied to other types of applications. Moreover, the displays shown herein are provided only as examples, and any other type of user interface could be implemented. For example, FIG. 37 illustrates a tablet computer 3700 with an eip-net components display 3710. The display 3710 might be used, for example, by an operator or administration to configure an eip-net (e.g., by modifying parameters for the control layer, data logic layer, persistence layer, etc.).

Any of the embodiments described herein might incorporate dynamic aspects into the formalization of patterns for a more precise cost semantics. In addition, purely data related techniques (e.g., message indexing, fork path re-ordering, and/or merging of conditions) may be analyzed for their effects. Moreover, multi-objective optimizations and heuristics for graph rewriting on the process level may be implemented in connection with any of these embodiments. Further note that embodiments may utilize other types of optimization, such as pattern placement optimizations (pushing patterns to message endpoints, i.e., sender and receiver applications), optimizations that reduce interactions (helping to stabilize the process), etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with enterprise application integration, comprising:
   a formalization platform, including:
   a computer processor, and
   computer memory, coupled to the computer processor, storing instructions that, when executed by the computer processor, cause the formalization platform to:
   (i) facilitate definition of Enterprise Integration Patterns ("EIP") using a formal representation, defined execution semantics, and timed eip-nets, each eip-net having a control layer, a data logic layer, and a persistence layer, and
   (ii) execute model checking to find errors in the formal representation;
   an implementation platform that receives information from a correctness platform, to:
   (i) translate, by an implementation platform application integration engine, the formal representation generated by the correctness platform,
   (ii) configure, by the implementation platform application integration engine, implementation parameters of the translated formal representation, and (iii) simulate, via a simulation engine of the implementation platform, the EIP patterns to provide experimental validation after executing a test simulation for each EIP pattern multiple times, producing multiple test results for each EIP pattern, using a variety of simulated EIP pattern input conditions; and the correctness platform to receive information from the formalization platform and evaluate correctness of the EIP patterns defined via the formalization platform, wherein dynamic, multi-objective optimization strategies, that preserve structural and semantic correctness, are executed in connection with the formal representation, including a pattern placement optimization and an optimization that reduces interactions, and further wherein at least one timed eip-net is associated with a circuit breaker wrapper that automatically trips from closed to open when more than a cumulative pre-determined number of exceptions occur among individual endpoints within the at least one timed eip-net to block communications.

2. The system of claim 1, wherein at least one timed eip-net is associated with that emits at most n messages per a pre-determined number of time units to a receiving channel.

3. The system of claim 2, wherein at least one erroneous EIP pattern is associated with at least one of: (i) a pattern description to model error, and (ii) a pattern model to implementation error.

4. A computer-implemented method associated with enterprise application integration, comprising:

facilitating, by a computer processor of a formalization platform, definition of Enterprise Integration Patterns ("EIP") using a formal representation, defined execution semantics, and timed eip-nets, each eip-net having a control layer, a data logic layer, and a persistence layer;

executing, by the formalization platform, model checking to find errors in the formal representation;

translating, by an implementation platform application integration engine, the formal representation generated by a correctness platform;

configuring, by the implementation platform application integration engine, implementation parameters of the translated formal representation;

simulating, via a simulation engine of the implementation platform, the EIP patterns to provide experimental validation after executing a test simulation for each EIP pattern multiple times, producing multiple test results for each EIP pattern, using a variety of simulated EIP pattern input conditions; and evaluating, by the correctness platform, correctness of the EIP patterns defined via the formalization platform, wherein dynamic, multi-objective optimization strategies, that preserve structural and semantic correctness, are executed in connection with the formal representation, including a pattern placement optimization and an optimization that reduces interactions, and further wherein at least one timed eip-net is associated with a circuit breaker wrapper that automatically trips from closed to open when more than a cumulative pre-determined number of exceptions occur among individual endpoints within the at least one timed eip-net to block communications.

5. The method of claim 4, wherein at least one timed eip-net is associated with a delayer that delays a message a pre-determined number of time units before emitting to a receiving channel.

6. The method of claim 5, wherein at least one erroneous EIP pattern is associated with at least one of: (i) a pattern description to model error, and (ii) a pattern model to implementation error.

7. A non-transitory, computer-readable medium storing instructions, that, when executed by a processor, cause the processor to perform a method associated with enterprise application integration, the method comprising:

facilitating, by a computer processor of a formalization platform, definition of Enterprise Integration Patterns ("EIP") using a formal representation, defined execution semantics, and timed eip-nets, each eip-net having a control layer, a data logic layer, and a persistence layer;

executing, by the formalization platform, model checking to find errors in the formal representation;

translating, by an implementation platform application integration engine, the formal representation generated by a correctness platform;

configuring, by the implementation platform application integration engine, implementation parameters of the translated formal representation;

simulating, via a simulation engine of the implementation platform, the EIP patterns to provide experimental validation after executing a test simulation for each EIP pattern multiple times, producing multiple test results for each EIP pattern, using a variety of simulated EIP pattern input conditions; and evaluating, by the correctness platform, correctness of the EIP patterns defined via the formalization platform, wherein dynamic, multi-objective optimization strategies, that preserve structural and semantic correctness, are executed in connection with the formal representation, including a pattern placement optimization and an optimization that reduces interactions, and further wherein at least one timed eip-net is associated with a circuit breaker wrapper that automatically trips from closed to open when more than a cumulative pre-determined number of exceptions occur among individual endpoints within the at least one timed eip-net to block communications.

8. The medium of claim 7, wherein at least one timed eip-net is associated with a throttler that emits at most n messages per a pre-determined number of time units to a receiving channel.

9. The medium of claim 8, wherein at least one erroneous EIP pattern is associated with both of: (i) a pattern description to model error, and (ii) a pattern model to implementation error.

* * * * *